United States Patent
Hosseini et al.

(10) Patent No.: US 12,000,059 B2
(45) Date of Patent: Jun. 4, 2024

(54) APPARATUS AND METHODS FOR CONTROLLED ELECTROCHEMICAL SURFACE MODIFICATION

(71) Applicant: Manufacturing Systems Limited, Auckland (NZ)

(72) Inventors: Ali Hosseini, Auckland (NZ); Ashton Partridge, Auckland (NZ)

(73) Assignee: Manufacturing Systems Limited, Auckland (NZ)

( * ) Notice: Subject to any disclaimer, the term of this patent is extended or adjusted under 35 U.S.C. 154(b) by 387 days.

(21) Appl. No.: 16/467,392

(22) PCT Filed: Dec. 11, 2017

(86) PCT No.: PCT/NZ2017/050160
§ 371 (c)(1),
(2) Date: Jun. 6, 2019

(87) PCT Pub. No.: WO2018/106128
PCT Pub. Date: Jun. 14, 2018

(65) Prior Publication Data
US 2020/0087810 A1 Mar. 19, 2020

Related U.S. Application Data

(60) Provisional application No. 62/565,377, filed on Sep. 29, 2017, provisional application No. 62/556,060, (Continued)

(51) Int. Cl.
*C25D 7/00* (2006.01)
*C25D 3/50* (2006.01)
(Continued)

(52) U.S. Cl.
CPC .............. *C25D 5/02* (2013.01); *C25D 3/50* (2013.01); *C25D 7/00* (2013.01); *G01N 27/30* (2013.01); *G01N 27/327* (2013.01)

(58) Field of Classification Search
None
See application file for complete search history.

(56) References Cited

U.S. PATENT DOCUMENTS 2,847,376 A   8/1958   Schofield
3,350,232 A   10/1967  Ryhiner et al.
(Continued)

FOREIGN PATENT DOCUMENTS

DE   44 22 049 A1    1/1996
JP   2014-530366 A   11/2014
(Continued)

OTHER PUBLICATIONS

Li et al., "Tailoring Hexagonally Packed Metal Hollow-Nanocones and Taper-Nanotubes by Template-Induced Preferential Electrodeposition", Applied Materials & Interfaces, 2013, 5, 10376-10380. (Year: 2013).*

(Continued)

*Primary Examiner* — Stefanie S Wittenberg
(74) *Attorney, Agent, or Firm* — Foley & Lardner LLP

(57) ABSTRACT

Disclosed are electrode arrays and methods of focusing charge density (voltage or current) at a functional surface on electrode arrays. An example method comprises: a. providing an electrode array comprising: i. a support substrate; ii. at least one surface structure protruding from an upper surface of the support substrate wherein the surface structure includes an electrode layer; iii. a functional surface on the electrode layer, wherein the functional surface is on an upper portion of the at least one surface structure and wherein the functional surface is adapted to contact an active species in (Continued)

a conductive solution; b. exposing the surface structure to the conductive solution comprising an active species, in which a counter electrode is positioned; c. establishing a current or voltage between the functional surface on the electrode layer and the counter electrode such that the charge density is focussed at the functional surface on the electrode layer.

40 Claims, 12 Drawing Sheets

Related U.S. Application Data filed on Sep. 8, 2017, provisional application No. 62/432,376, filed on Dec. 9, 2016.

(51) Int. Cl.
*C25D 5/02* (2006.01)
*G01N 27/30* (2006.01)
*G01N 27/327* (2006.01)

(56) References Cited

U.S. PATENT DOCUMENTS

| | | | |
|---|---|---|---|
| 6,036,827 | A | 3/2000 | Andrews et al. |
| 2006/0001012 | A1 | 1/2006 | Suzuki et al. |
| 2006/0091017 | A1 | 5/2006 | Lam |
| 2006/0102492 | A1 | 5/2006 | Corradi et al. |
| 2006/0180480 | A1 | 8/2006 | Zhang et al. |
| 2010/0048391 | A1* | 2/2010 | Kim ............... H01J 1/3044 977/932 |
| 2013/0213462 | A1 | 8/2013 | Lewis et al. |
| 2014/0262810 | A1 | 9/2014 | Rondinone et al. |
| 2014/0342128 | A1 | 11/2014 | Haynes et al. |
| 2015/0011421 | A1 | 1/2015 | Li et al. |
| 2015/0035640 | A1* | 2/2015 | Wang ............. H01F 41/042 336/200 |
| 2015/0270053 | A1* | 9/2015 | Cha ................ H01F 17/04 336/192 |
| 2015/0308003 | A1 | 10/2015 | Gulla |

FOREIGN PATENT DOCUMENTS

| | | |
|---|---|---|
| WO | WO-2011/129710 A1 | 10/2011 |
| WO | WO-2013/055234 A1 | 4/2013 |
| WO | WO-2018/106128 A1 | 6/2018 |

OTHER PUBLICATIONS

Lee et al. "A patch type non-enzymatic biosensor based on 3D SUS micro-needle electrode array for minimally invasive continuous glucose monitoring", Sensors and Actuators B 222, 2016, 1144-1151 (Year: 2016).*
Meng et al. "A flexible dry micro-dome electrode for ECG monitoring", Microsyst Technol, 2015, 21, 1241-1248 (Year: 2015).*
Fujishiro et al. In vivo neuronal action potential recordings via three-dimensional microscale needle-electrode arrays, Nature Scientific Reports, May 2014, 4, 4868 (Year: 2014).*
Sanyuan et al. "32-site microelectrode modified with Pt black for neural recording fabricated with thin-film silicon membrane", Science China, 2014, 57, 052401:1-052401:7 (Year: 2014).*
Extended European Search Report in EP Patent Application No. 17877470.9 dated Jun. 20, 2020 (18 pages).
Jiang, et al., "Gold Nanotip Array for Ultrasensitive Electrochemical Sensing and Spectroscopic Monitoring," Small Journal, 2013, vol. 9, No. 13, pp. 2260-2265.
Lee, et al., "Sensitive and Selective Detection of HIV-1 RRE RNA Using Vertical Silicone Nanowire Electrode Array," Nanoscale Research Letters, 2016, vol. 11, No. 241, pp. 1-7.
Supplementary European Search Report in EP Patent Application No. 17877470.9 dated Nov. 12, 2020 (20 pages).
Devaraj, N.K. et al. "Selective functionalization of Independently Addressed Microelectrodes by Electrochemical Activation and Deactivation of a Coupling Catalyst", Journal of the American Chemical Society. Published Jan. 25, 2006. 2 pages.
International Search Report and Written Opinion on International Application No. PCT/NZ2017/050160 dated May 21, 2018. 16 pages.

\* cited by examiner

A

B

A

B

400

A - Control no potential applied B - reductive potential applied

APPARATUS AND METHODS FOR CONTROLLED ELECTROCHEMICAL SURFACE MODIFICATION

CROSS-REFERENCE TO RELATED APPLICATIONS

This application is a U.S. national stage application under 35 U.S.C. § 371 of International Application No. PCT/NZ2017/050160, filed Dec. 11, 2017 with the same title, and published as WO 2018/106128, which in turn claims priority to U.S. Patent Application No. 62/565,377 filed Sep. 29, 2017, U.S. Patent Application No. 62/556,060 filed Sep. 8, 2017, and U.S. Patent Application No. 62/432,376 filed Dec. 9, 2016, the contents of all of which are incorporated herein by reference in their entireties for any and all purposes.

FIELD OF INVENTION

The invention relates to the use of focused charge density (voltage and/or current) to control the location or modification of active species on an electrode surface. More particularly, although not exclusively, the invention relates to attachment or removal of species at the tip of a surface structure to enable electrochemical sensing, catalysis, deposition or modification.

BACKGROUND OF THE INVENTION

Localisation of an active species (e.g. a sensory agent or catalyst) onto an electrode is important in number of applications. For example, sensors, catalysis for fuel cells, and hydrogen and oxygen production or storage.

In recent years, nanomaterials and nanotechnology have attracted great interest due to the intriguing properties at the nano-dimension differing from its macro-scale counterpart. The unusual electronic behaviours exhibited by these materials can be exploited for new technologies in advanced materials and device miniaturization, and opens a plethora of applications in medical diagnostics, environmental analysis, food industry and biochemical studies.

To produce sensors with high sensitivity and accuracy it is often desirable to deposit either covalently electrostatically or supramolecularly, an active species on a surface then expose the surface to a target analyte. For sensing purposes, a qualitative or quantitative modification of the active species is detected. Active species may include organic (e.g. DNA, antibodies, biomarkers, aptamers) or inorganic species (e.g. organometallics, metals, inorganic salts). However, the ability to achieve deposition of the active species on a surface is often limited when using mechanical fabrication methods. As such, a number of techniques have been developed to achieve deposition.

A technique employed to achieve deposition is application of a self-assembled mono-layer (SAM), which includes terminal reactive functional groups. Common reactive functional groups include amino, carboxyl, ethynyl or azide groups. SAMs are assembled on a surface, which itself may have been deposited onto a base substrate. SAMs are typically assembled on a conducting surface which has been deposited onto a base substrate (e.g. Si, glass or a polymer).

SAMs are applied or deposited in liquid form by contacting the substrate/electrode surface with a liquid containing the SAM components, or by vapour deposition, or by Langmuir blodget. These methods allow for average distances between adjacent functional groups to be adjusted by the addition of a diluent to the liquid. Furthermore, the conducting surface can act as an electrode to provide the option of electrochemically inducing attachment of the SAM and functionalisation.

The reaction used to deposit an active species onto a SAM functionalised electrode may be via either chemical or electrochemical attachment. Chemical immobilisation is typically achieved by chemical activation of either the reactive functional groups of the SAM (e.g., COOH activation with EDC/NHS) or the active species (e.g. or Cu(I) catalysed Azide Alkyne cycloaddition). However, chemical activation does not allow the position of immobilisation to be controlled, and instead results in coverage of the entire SAM surface. As such there is no selectivity in the attachment location or density of the active species.

In other electrochemical processes, it is desirable to attach functional groups to a surface where those functional groups interact with target analytes in a solution and mediate a detectable response. Functionalization of an electrode surface with an active species can be achieved by a chemical reaction between functional groups on an active species in solution and chemically compatible receptor groups on the electrode surface. However, precise spatial control of the location of attachment of functional groups on an electrode has not been possible to date with high precision.

Controlled deposition of metal, organometallic complexes or other ionic species is important in fields such as catalysis, photonic materials, microchip reactors and biosensors. Various methods are currently used for metal deposition. However, current methods lack selectivity in the attachment location.

It is therefore an object of the present invention to provide apparatus and methods for focussing charge density (voltage or current) electrochemical surface modification, deposition, sensing or catalysis that overcome or ameliorate at least one of the disadvantages of the prior art. It is a further or alternative object of the present invention to at least provide the public with a useful choice.

SUMMARY OF THE INVENTION

In a first aspect the invention provides a method of focussing charge density (voltage or current) at a functional surface on an electrode array, the method comprising the steps of:
  a. providing an electrode array comprising:
    i. a support substrate;
    ii. at least one surface structure protruding from an upper surface of the support substrate wherein the surface structure includes an electrode layer;
    iii. a functional surface on the electrode layer, wherein the functional surface is on an upper portion of the at least one surface structure and wherein the functional surface is adapted to contact an active species in a conductive solution;
  b. exposing the surface structure to a conductive solution in which a counter electrode is positioned; and
  c. establishing a current or voltage between the functional surface on the electrode layer and the counter electrode such that the charge density is focussed at the functional surface on the electrode layer.

Preferably the functional surface is at or about an apex of the surface structure.

Preferably the functional surface is at or about an apex of the surface structure and the surface structure is tapered to an apex and/or has a substantially triangular cross-section along a plane parallel to a top surface of the support substrate.

Preferably the functional surface is at or about an apex of the surface structure and wherein the width of the apex of each surface structure is between about 1 nm to about 5000 micron; about 1 nm to about 500 micron; about 1 nm to about 50 micron.

Preferably the functional surface is at or about an apex of the surface structure and wherein the width of the apex of each surface structure is between about 1 nm to about 50 micron and wherein the width of the surface structure where it joins the support substrate is between about 20 nm to about 5000 μm and wherein the width at the apex of the surface structure is less than the width of the surface structure where it joins the support substrate.

Preferably the functional surface is at or about an apex of the surface structure and wherein the apexes of the surface structures are separated from each other by about 50 nm to about 1000 μm apex to apex.

Preferably the surface structures are pyramidal, conical, ridges, or combinations thereof.

Preferably the counter electrode structure is flat, pyramidal, conical, or ridged.

Preferably the shape of the counter electrode reflects that of the surface structures.

Preferably the counter electrode is parallel to the surface structures.

Preferably the active species is electrochemically modified following contact with the functional surface.

Preferably the active species is electrochemically modified following contact with the functional surface and the thermodynamic efficiency and kinetic efficiency of the electrochemical modification in comparison to a flat electrode is improved compared to a corresponding flat electrode.

Preferably the functional surface comprises a catalyst capable of electrochemical activation.

Preferably the functional surface comprises a catalyst, wherein the catalyst is activated via application of a current or voltage to yield an activated catalyst and the catalytic turnover rates compared to the same material on a flat surface are improved.

Preferably the catalyst is selected from metallic and organometallic materials.

Preferably the metallic materials are selected from Pt, Au and Ni.

Preferably the organometallic material is selected from Ferrocene and Porphyrin, or Phenanthroline, Porphyrin Imidazole, tris pyridyl amine, and triazole, with a transition metal (Ferrocene already including a transition metal and Porphyrin may optionally include a transition metal).

Preferably the transition metal is selected from Ru, Fe, Mn, Mg, Cu, Ir, Co, Pt, Pd, Au, Ag, Mg Preferably the electrode array comprises a binding layer wherein the binding layer is either present on the functional surface at a significantly increased density than at a non-functional surface on the electrode array; or present on a non-functional surface of the electrode array at a significantly increased density than at a position on the functional surface on the surface structure.

Preferably the binding layer comprises a self-assembled monolayer (SAM).

Preferably the array includes a catalyst at the apex of the surface structure and a co-catalyst in the valleys between the surface structures, wherein the catalysts are selected as described above and the co-catalysts are selected from any one or more oxides of a metal (e.g. ruthenium, nickel, aluminum, calcium, cerium, gallium, hafnium, iron, lanthanum, magnesium, strontium, titanium, zirconium, or zinc).

Preferably, the method also achieves an increase in the rate of catalysis compared with a flat electrode (Kinetic efficiency—i.e. the speed at which catalysis occurs, and relating primarily to the speed at which the reactants and the products diffuse to and away from the catalytic surface.)

Preferably, the method achieves a decrease in the energy required to drive a redox catalytic reaction for both metallic and organometallic electrocatalysts (Thermodynamic efficiency—i.e. the energy required to drive the electrocatalytic reaction)

Preferably the method achieves increases in both Kinetic and Thermodynamic efficiency compared to an electrode with a flat surface.

In another aspect, the invention provides a method of focussing charge density (voltage or current) charge density (voltage or current) at a functional surface on an electrode array and electrochemically modifying an active species in a conductive solution exposed to the array, the method comprising the steps of:
 a) providing an electrode array comprising
  i) a support substrate;
  ii) at least one surface structure protruding from an upper surface of the support substrate wherein the surface structure includes an electrode layer;
  iii) a functional surface on the electrode layer, wherein the functional surface is on an upper portion of the at least one surface structure and wherein the functional surface is adapted to contact an active species in a conductive solution;
 b) exposing the surface structure to a solution comprising an active species and including a counter electrode therein; and
 c) establishing a current or voltage between the electrode layer and the counter electrode such that the charge density is focussed at the functional surface and the active species is electrochemically modified following contact with the functional surface.

The invention also provides a method of focussing charge density (voltage or current) at a functional surface on an electrode array, the method comprising the steps of:
 a. providing an electrode array comprising:
  i. a support substrate;
  ii. at least one surface structure protruding from an upper surface of the support substrate to create a 3 dimensional structure wherein the surface structure includes an electrode layer;
  iii. a functional surface on the electrode layer, wherein the functional surface is on an upper portion of the at least one surface structure and wherein the functional surface is adapted to contact an active species in a conductive solution;
 b. exposing the surface structure to a solution comprising an active species and including a counter electrode positioned therein; and
 c. establishing a current or voltage between the electrode layer and the counter electrode such that the charge density is focussed at the functional surface and the active species is electrochemically modified following contact with the functional surface; and
 wherein the functional surface and the upper surface of the support material are formed from the same material and, in use, electrochemical activity is focussed at the at the functional surface and is differentiated from the upper surface of the support substrate.

The invention also provides a method of focussing charge density (voltage or current) at a functional surface on an electrode array, the method comprising the steps of:
  a. providing an electrode array comprising:
    i. a support substrate;
    ii. at least one surface structure protruding from an upper surface of the support substrate to create a 3 dimensional structure wherein the surface structure includes an electrode layer;
    iii. a functional surface on the electrode layer, wherein the functional surface is on an upper portion of the at least one surface structure and wherein the functional surface is adapted to contact an active species in a conductive solution;
  b. exposing the surface structure to a solution comprising an active species and including a counter electrode positioned therein; and
  c. establishing a current or voltage between the electrode layer and the counter electrode such that the charge density is focussed at the functional surface and the active species is electrochemically modified following contact with the functional surface; and
wherein the functional surface and the upper surface of the support material are formed from the same material and, in use, electrochemical activity is focussed at the at the functional surface and is differentiated from the upper surface of the support substrate.

Preferably the functional surface is at or about an apex of the surface structure.

In a first embodiment of the first aspect, the active species comprises a catalyst, wherein the catalyst is activated via electrochemical modification following contact with the functional surface to yield an activated catalyst.

Preferably the functional surface is formed of a catalytic material which is activated via electrochemical modification via the current or voltage between the electrode layer and the counter electrode.

Preferably the catalyst is capable of reduction or oxidation to form an activated catalyst.

Preferably the catalyst comprises a redox active species.

Preferably the catalyst comprises copper, a transition metal, an organometallic complex, an organometallic complex including transition metal, an organic material that is able to be oxidised or reduced.

Preferably, electrochemical activation of the catalyst comprises oxidation or reduction of the catalyst at the functional surface.

Preferably the catalyst comprises two or more oxidation states.

Preferably the catalyst is inactive in at least one oxidation state, and catalyses the reaction between a solute reactant in another conductive solution (i.e. different to the conductive solution containing the active species) or the same conductive solution with a binding layer in at least one other oxidation state.

Preferably, electrochemical activation of the catalyst occurs at a substantially greater rate at the functional surface than activation would occur at another surface position on the electrode layer.

In one embodiment, the method further comprises the step of electrochemically activating the active species in the solution to yield an activated catalyst.

Preferably, the activated catalyst catalyses the reaction of a solute reactant in another conductive solution (i.e. different to the conductive solution containing the active species) or the same conductive solution with a binding layer and the method further comprises the step of attaching the solute reactant to the binding layer on the functional surface.

Preferably, the activated catalyst catalyses a reaction of a solute reactant with a binding layer to yield an attached product on the functional surface.

Preferably the active species comprises copper (II) and the electrochemically activated catalyst comprises copper (I).

Preferably initiation of the attachment of the solute reactant to the functionalised surface is achieved by a redox process, and could include for example tetrazines and quinones Preferably the reaction between the solute reactant and the binding layer is a copper (I) catalysed azide alkyne cycloaddition reaction.

Preferably the solution comprises a buffer solution with alkali metal chloride ions and copper$^{2+}$ ions.

Preferably the solute reactant comprises a compound with a functional group that when in the presence of the activated catalyst reacts with a functional group on the binding layer.

Preferably, the solute reactant is selected from the group consisting of but not limited to alkynes, tatrazines, quinones, azides, alkenes, carboxylic acids, esters, ketones, aldehydes, alcohols and amines.

Preferably the alkyne comprises acetylene.

Preferably the solute reactant further comprises a detection moiety adapted to attach to the functional surface following reaction of the solute reactant with the binding layer.

Preferably the detection moiety is capable of detection using protein detection, electrochemical detection, optical detection, colorimetric detection, chemiluminescence detection, fluorescence detection, bioluminescence, chemifluorescence or radiographic detection.

Preferably, the solute reactant with detection moiety comprises a fluorophore, an ethynyl functionalised fluorophore, a protein, organic catalyst, organometallic catalyst, an antibody, a nucleic acid, DNA, RNA, a small molecule, or a functional group, for example one selected from the group consisting of carboxylic acid, amine, alcohol, ester, ketone and aldehyde.

Preferably the binding layer comprises a self-assembled monolayer. Preferably the SAM is functionalised with a functional group. Preferably the functional group is selected from the group consisting of azide, carboxylic acid, amine, alcohol, ester, ketone, cyano and aldehyde.

Preferably, the active species comprises a solute reactant capable of attachment to the binding layer.

Preferably the binding layer is present on at least one of:
  the functional surface;
  the surface structures;
  the passivating layer; or
  the support substrate.

Preferably the method of the first embodiment of the first aspect further comprises depositing a SAM on at least one of:
  the functional surface;
  the surface structures;
  the passivating layer; or
  the support substrate.

Preferably, the method of the first embodiment does not include the step of depositing a SAM on the electrode array.

Preferably the step of depositing the SAM is carried out prior to electrochemically activating the active species following contact with the functional surface to yield an activated catalyst.

Preferably the step of depositing the SAM is carried out prior to attaching a solute reactant to a binding layer on the functional surface.

In a particular embodiment, the binding layer is selected from the group consisting of azides, tetrazines, quinones, carboxylic acid, amine, alcohol, ester, ketone, cyano and aldehyde.

Preferably the binding layer on the functional surface is substantially stable for the duration of the current flow between the electrode layer and the counter electrode.

Preferably the SAM comprises a carbon chain of C6 to C16, more preferably the SAM comprises a carbon chain of C11 to C16. Preferably the carbon chain can be any one or more of C6, 7, 8, 9, 10, 11, 12, 13, 14, 15, 16.

Preferably, the SAM may comprise a mixture of carbon chains of C6 to C16, more preferably C11 to C16.

Preferably the carbon chains are alkane, alkene, alkyne, or aromatic structures and mixtures thereof.

Preferably the attached product is selected from any one or more of the group consisting of:
  a. a functional group, for example one selected from the group consisting of carboxylic acid, amine, alcohol, aldehyde, biotin, avidin, azide and ethynyl;
  b. a binding agent adapted to bind to a target analyte in solution, for example one selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, atetylenic quinone, azides, tetrazine, large or small amine-containing molecules, sulfhydryl-containing molecules or proteins expressing glutathione S-transferase (GST), metals and metal salts (such as lead, lead phosphate, chromium, platinum, palladium, iridium, copper), ssDNA, ssRNA, miRNA, mRNA, aptamers, and small molecules with and without a spacer molecule;
  c. a catalytic species which catalyses a reaction in solution, for example a catalyst selected from the group consisting of copper, a transition metal, an organometallic complex, an organometallic complex including transition metal, or an organic material that is able to be oxidised or reduced; and
  d. a detection moiety, for example one selected from the group consisting of a fluorophore, an ethynyl functionalised fluorophore, a protein, an antibody, a nucleic acid, DNA, RNA, a small molecule, or a functional group, for example one selected from the group consisting of carboxylic acid, amine, alcohol, ester, ketone and aldehyde.

Preferably the attached product is selected from the group consisting of triazoles, amides, quinones and esters, or mixtures thereof. Alternatives as would be known to the skilled person could also be used.

In a second embodiment of the first aspect, the electrode array comprises a binding layer covering the functional surface and at least part of other surfaces of the array, wherein the step of establishing a current between the electrode layer and the counter electrode results in selective removal of the binding layer from the functional surface compared to other positions on the electrode array.

Preferably the method of the first aspect further comprises the step of selective removal of at least part of the binding layer from the functional surface as compared to other positions on the electrode array.

Preferably the method of the first aspect further comprises the step of selective deposition of a further binding layer on the functional surface which has undergone selective removal of the first binding layer.

Preferably the electrode array comprises a binding layer on a lower portion of the surface structure but absent from an upper portion of the surface structure, and the method further comprises the step of selective deposition of a further binding layer on the functional surface.

Preferably the active species is solvated within a charge carrying or ionic species, for example one selected from the group consisting of a buffer, a salt species, and NaCl.

Preferably the binding layer comprises a self-assembled monolayer (SAM).

Preferably the electrode array defined in the first aspect further comprises a self-assembled monolayer (SAM).

Preferably the SAM is present on an upper surface of the electrode layer.

Preferably the SAM is present on an upper surface of the support substrate.

Preferably the SAM is present around the surface structures such that the surface structure or a portion thereof protrudes with an exposed functional surface thereon.

Preferably the SAM comprises long-chain molecules comprising a carbon chain of C6 to C24 which may be alkane, alkene, alkyne or aromatic. Preferably, C6, 7, 8, 9, 10, 11, 12, 13, 14, 15, 16, 17, 18, 19, 20, 21, 22, 23, or 24 or mixtures of these.

Preferably the SAM comprises short-chain molecules comprising a carbon chain of C10 or less.

Preferably, C1, 2, 3, 4, 5, 6, 7, 8, 9, or 10 or mixtures of these.

Preferably the SAM is a mixed SAM comprising long (C10-C24 as above) and short chain (C1-C10 as above) molecules, which may be alkane, alkene, alkyne or aromatic.

Preferably the mixed SAM comprises long-chain molecules comprising a carbon chain of C6 to C24 (as above) and short-chain molecules of C5 to C1 (as above).

Preferably the long-chain SAM comprises molecules selected from the group consisting of azides, amines, carboxylates, aldehydes, ketones, esters or carboxylic acids or mixtures thereof. Such molecules being present within the backbone of the SAM.

Preferably the short-chain SAM comprises molecules selected from the group consisting of alkanes, azides, amines, hydroxyls, carboxylates or carboxylic acids or mixtures thereof. Such molecules being present within the backbone of the SAM.

In one particular embodiment, the SAM comprises a mixture of long chain molecules comprising carboxylic acid molecules of greater than C6 and short chain molecules comprising hydroxyl molecules. In the above embodiments, the SAM long chain molecules are preferably selected from C6 to C24 molecules Preferably the SAM is present on the electrode array but is absent at the upper portion of the surface structure as defined above.

Preferably the SAM comprises short-chain molecules comprising a carbon chain of C5 or less and wherein the upper portion of the surface structure(s) is either a. free of SAM, or b. wherein the SAM is adapted to be removed by establishing a current between the electrode layer and the counter electrode.

Preferably the SAM comprises with a long chain SAM having a carbon chain of C6 to C24, and wherein the upper portion of the surface structure(s) is either a. free of SAM, or b. comprises a SAM adapted to be removed by establishing a current between the electrode layer and the counter electrode.

In one particular embodiment, the electrode array comprises a SAM binding layer on an upper and lower portion of the surface structure and contact of the active species with the functional surface results in selective removal of the SAM binding layer from the upper portion of the surface structure where charge density (voltage or current) is focussed. In this embodiment, the method further comprises the step of selective deposition of a further binding layer on the now exposed portion of the electrode layer at the functional surface.

Preferably the SAM is selected from the group consisting of an alkane thiol with a terminal methyl, azide, thiol, aldehyde, cyano, diazonium, amines, alcohols, silanes, phosphonic acids and carboxylic acids.

In particular embodiments, the SAM comprises:
R-(aromatic)$_n$-SH, alkane, alkene, alkyne or aromatic. Plus the backbones (amide ester etc)
R—(CH$_2$)$_n$—SH, R—(CH$_2$)$_n$—NH$_2$, or
R—(CH$_2$)$_n$—Si(OR')$_3$
wherein R=alkyl, carboxylic acid, amine, aldehyde, alcohol, azide, quinone or tetrazine; and
R'=Me, MeOH, Cl, (Halide), Et, EtOH; and
wherein n=1 to 50

Preferably the SAM comprises a functional group which reacts with the solute reactant. Preferably the functional group is a terminal functional group.

Preferably the method of the first aspect further comprises selective deposition of a binding layer on the functional surface as compared to other positions on the array.

Preferably the further binding layer comprises a functional group selected from the group consisting of SAM-COOH, SAM-C—NH$_2$, SAM-N3, wherein SAM comprises a self-assembled monolayer.

Preferably the step of deposition of a further binding layer comprises coupling of an active species to the binding layer on the functional surface. Preferably the coupling comprises a 1-Ethyl-3-(3-dimethylaminopropyl)-carbodiimide/N-hydroxysuccinimide (EDC/NHS) coupling reaction.

Preferably the binding layer further comprises a binding agent selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, atetylenic quinone, azides, tetrazine, large or small amine-containing molecules, sulfhydryl-containing molecules or proteins expressing glutathione S-transferase (GST), metals and metal salts (such as lead, lead phosphate, chromium, platinum, palladium, iridium, copper).

Preferably, the active species comprises an entity with potential for electrochemical reduction or oxidation. Preferably the active species comprises a binding agent as described above or a functional group capable of attachment to the binding layer. Preferably the functional group is selected from the group consisting of COOH, NH$_2$, azide, ethynyl, bioactive biotin, avidin, cyano, aldehyde, ester, ketone, quinone and tetrazine.

Preferably the binding agent is capable of binding to a target analyte within a solution. Preferably the binding agent is selected from the group consisting of nucleic acids, ssDNA, ssRNA, miRNA, mRNA, Aptamers, Antibodies, small molecules with and without a spacer molecule.

Preferably the electrode array provided in step a) of the first aspects comprises a passivating layer deposited on the support substrate and covering the upper portion of the surface structure.

Preferably the step of applying a current or a voltage to focus charge density (voltage or current) results in removal of the passivating layer on the functional surface on the upper portion of the surface structures.

Preferably the passivating layer is removed by applying a reductive or oxidative potential between the counter electrode and the electrode surface. Preferably the potential is between, −2V and +2V, and preferably −200 mV and −1V, and preferably −400 mV relative to a silver/silver chloride reference electrode.

Preferably the passivating layer comprises a functional group to attach to the electrode surface. In one embodiment, the passivating layer comprises a binding layer as described and defined herein. In one embodiment, the passivating layer comprises a SAM. Preferably the SAM is attached to the electrode surface by a sulphur atom. Preferably the electrode surface is gold. Preferably the SAM further comprises a functional group, for example an alkyl chain, and preferably further comprises a carboxylic acid coupled to an amine on the functional group.

Preferably the passivating layer is a photoresist or a protein.

Preferably the electrode array comprises a passivating layer between the surface structures. Preferably the passivating layer is selected from the group consisting of a cross-linked polymer, a photo-resist, a self-assembled mono-layer (SAM), an epoxy-based negative photoresist and SU-8.

In a third embodiment of the first aspect, the active species comprises a charged particle wherein the charged particle is attached to the functional surface following the electrochemical modification.

Preferably the charged particle comprises a metal ion. Preferably the metal ion comprises an ionic form of platinum, gold, palladium, Iron, Iridium, silver, copper, an alloy or a transition metal.

Preferably the ionic form is an oxidised form of the metal ion.

Preferably the ionic form is selected from the group consisting of Cr$^{x+}$, Cu$^{2+}$, Cu$^+$, Ag$^+$, Pt$^{2+}$, Pd$^{2+}$, Fe$^{2+}$, Ir$^{2+}$ and a transition metal ion such as Ru, Sc, Ti, Vn, Cr, Mn, Co, Zn, Au, Tg, Yt, Mb.

Preferably, the charged particle comprises a binding agent for a biological sensor. Preferably the binding agent is selected from the group consisting of antigens, aptamers, antibodies, antibody fragments, single-chain variable fragments, biotinylated proteins, peptides, nucleic acids (DNA, RNA, miRNA), avidin, streptavidin, NeutrAvidin, recombinantly expressed proteins containing polyhistidine or glutathione S-transferase, large or small amine-containing molecules, sulfhydryl-containing molecules or proteins expressing glutathione S-transferase (GST), metals and metal salts (such as lead, lead phosphate, chromium, platinum, palladium, iridium, copper).

Preferably, the density of charged particle attached on the functional surface is greater than the density of charged particle attached on other exposed surfaces of the electrode layer.

Preferably the functional surface of any embodiment of the first aspect is on an upper surface of the electrode layer.

Preferably the functional surface of any embodiment of the first aspect is on an upper surface of an electrode layer on a surface structure protruding from the support substrate or the passivating layer.

Preferably the functional surface of any embodiment of the first aspect is on an upper portion of the surface structure.

Preferably the functional surface of any embodiment of the first aspect is non-planar.

Preferably the surface structure of any embodiment of the first aspect comprises a functional surface defined by the extent of the passivating layer.

Preferably the functional surface of any embodiment of the first aspect is separated from other functional surfaces on other surface structures by the passivating layer or the support substrate.

Preferably a functional surface of any embodiment of the first aspect on one electrode layer is electrically connected to at least one further functional surface on the same electrode layer. Preferably the electrical connection to the at least one further functional surface is under the passivating layer.

Preferably the electrode array of any embodiment of the first aspect comprises a plurality of surface structures each with a functional surface on the electrode layer.

Preferably the plurality of functional surfaces are electrically connected via the electrode layer to form a functional grouping. In one embodiment, the array comprises two or more functional groupings where each functional grouping is electrically isolated from other groupings.

Preferably the functional surface of any embodiment of the first aspect comprises a protective coating.

Preferably the protective coating comprises a SAM, a photoresist or a protein.

Preferably the extent of the functional surface of any embodiment of the first aspect is defined by the charge density (voltage or current) being greater than the charge density (voltage or current) measured on a flat surface of the electrode layer.

Preferably the charge density (voltage or current) is at least 2, 3, 4, 5, 10, 20, 50, 100 or 1000 times greater on the functional surface as compared to the flat surface.

Preferably the surface structure of any embodiment of the first aspect protrudes through the passivating layer.

Preferably the surface structure of any embodiment of the first aspect comprises an apex at the top of the surface structure.

Preferably the apex is on a surface structure that has an upper section with a contoured surface and at least one lower section with a differently contoured surface. In some embodiments, the surface structure or the upper section thereof is dome-shaped, cone-shaped, pyramid-shaped, papilliform, a ridge or polyhedron-shaped.

Preferably the surface structure of any embodiment of the first aspect comprises an upper section with a convex upper surface.

Preferably the surface of the upper section is tapered to an apex or rounded to an apex.

Preferably the surface structure of any embodiment of the first aspect has a triangular, convex, semi-circular or papilliform cross-section along a plane orthogonal to a top surface of the support substrate.

Preferably the surface structure of any embodiment of the first aspect has a substantially triangular, substantially circular or substantially square cross-section along a plane parallel to a top surface of the support substrate.

Preferably a cross-sectional area of the surface structure of any embodiment of the first aspect diminishes along an axis that is orthogonal to a top surface of the support substrate.

Preferably the surface structures of any embodiment of the first aspect are uniformly arranged on the support substrate. Preferably the surface structures are randomly arranged on the support substrate.

Preferably, the surface structures of any embodiment of the first aspect have at least one line of symmetry.

Preferably, the surface structures of any embodiment of the first aspect are uniformly separated from each other by about 5 nm to about 2000 µm. More preferably, about 15 nm to about 1500 µm; about nm to about 1000 µm; about 55 nm to about 750 µm; about 100 nm to about 1000 µm; about 250 nm to about 1500 µm about 5 nm to about 1500 µm; about 5 nm to about 1000 µm; about 5 nm to about 750 µm; about 15 nm to about 2000 µm; about 35 nm to about 2000 µm; about 55 nm to about 2000 µm.

Preferably, the width of the surface structure of any embodiment of the first aspect where it joins the support substrate is between about 20 nm to about 5000 µm. More preferably, about 40 nm to about 4000 µm; about 55 nm to about 3000 µm; about 75 nm to about 2500 µm; about 100 nm to about 4000 µm; about 250 nm to about 3500 µm about 20 nm to about 3500 µm; about 2 nm to about 4000 µm; about nm to about 2500 µm; about 20 nm to about 4000 µm; about 20 nm to about 3000 µm; about 20 nm to about 2000 µm.

Preferably, the apex of each surface structure of any embodiment of the first aspect is located at the top of the upper portion of each surface structure.

Preferably, the upper portion of the surface structure of any embodiment of the first aspect comprises a tip or a point, or is convex, papilliform, tapered, conical, hemispherical or polyhedral.

Preferably, the surface structure of any embodiment of the first aspect comprises a ridge with an apex extending along an axis generally parallel to a top surface of the support substrate.

Preferably the width of the apex of each surface structure is between about 1 nm to about 5000 micron, more preferably between about 10 nm to about 10 micron, or about 20 nm to about 2 micron, or about nm to about 1 micron. The width of the apex of each surface structure being less than where it joins the support substrate.

Preferably, the ridge has a convex, papilliform, tapered, triangular or polygonal cross-section along a plane orthogonal to a top surface of the support substrate.

Preferably the support substrate of any embodiment of the first aspect comprises a polymer, silicon or glass.

Preferably the support substrate of any embodiment of the first aspect comprises a single layer or multiple layers.

Preferably the support substrate of any embodiment of the first aspect is non-conductive, polymer, Glass silica.

Preferably the support substrate of any embodiment of the first aspect is conductive. Preferably the conductive material is a doped Si, metal, conductive polymer. Preferably the metal is Ni, Cu, Al.

Preferably the at least one surface structure of any embodiment of the first aspect is integral with the support substrate.

Preferably, the support substrate of any embodiment of the first aspect has a thickness of between about 50 µm to 5 mm. Preferably, the support substrate has a thickness between about 1 mm and 2 mm; about 85 µm and about 2 mm; about 85 µm and about 1 mm; about 1 mm and about 4 mm; about 1 mm and about 3 mm; about 85 µm and about 2 mm.

Preferably the electrode layer of any embodiment of the first aspect is deposited on an upper surface of the support substrate.

Preferably the electrode layer of any embodiment of the first aspect is deposited on an upper surface of the surface structure(s).

Preferably the electrode layer of any embodiment of the first aspect is deposited on the surface structure(s) and the support substrate.

Preferably the electrode layer of any embodiment of the first aspect comprises a layer of substantially constant thickness.

Preferably the thickness of the electrode layer of any embodiment of the first aspect is between about 1 nm and 5 µm, more preferably between about 20 nm and 500 nm or between about 50 nm and 100 nm; about 50 nm and 500 nm; about 50 nm and 300 nm; about 1 nm and about 3 µm; about 3 nm and about 5 µm; about 2 nm and about 4 µm.

Preferably the electrode layer of any embodiment of the first aspect on the upper surface of two or more surface structures are electrically connected within the array.

Preferably, the electrode layer of any embodiment of the first aspect is selected from the group consisting of a metal, a carbonaceous material, carbon nano-tubes, graphene, gold, silver, platinum, an alloy, conductive ink, loaded polymer, titanium dioxide, fluoride doped tinoxide (FTO), indium tinoxide (ITO) or doped silicon.

Preferably the electrode array of any embodiment of the first aspect comprises a passivating layer on the support substrate and a lower portion of the surface structure. Preferably the passivating layer is absent from the upper portion of the surface structure.

Preferably the support structure of any embodiment of the first aspect protrudes through the passivating layer such that the functional surface is exposed above the passivating layer.

Preferably the passivating layer of any embodiment of the first aspect is deposited on the support substrate and a lower portion of the surface structure(s) such that the passivating layer is absent from the upper portion of the surface structure including the functional surface.

Preferably the extent of the functional surface of any embodiment of the first aspect is defined by deposition of a passivating layer on the support substrate and a lower portion of the surface structure(s) such that the passivating layer is absent from the functional surface.

Preferably the passivating layer of any embodiment of the first aspect comprises a non-conductive layer.

Preferably the passivating layer of any embodiment of the first aspect comprises a cross-linked polymer, a photo-resist or a self-assembled mono-layer (SAM). Preferably the cross-linked polymer is an epoxy-based negative photoresist such as SU-8.

Preferably the solution of any embodiment of the first aspect comprises an electrolyte. Preferably the medium is water but can also be an organic solvent such as alcohol, ether, acetone and DMSO.

Preferably the electrolyte comprises a standard buffer(s) used in biology, including non-buffered salt solutions such as NaCl, or acid and base solutions $H_2SO_4$, $HNO_3$, NaOH.

Preferably the solution of any embodiment of the first aspect is selected from the group consisting of fresh water, sea water, blood, urine, milk or saliva.

In one embodiment, the solution of any embodiment of the first aspect further comprises a reference electrode.

Preferably the solution comprises a buffer solution with alkali metal chloride ions and copper$^{2+}$ ions.

The counter electrode that is present in the solution comprising the active species when the electrode array is positioned in that solution of any embodiment of the method of the first aspect preferably comprises an inert conductive material. Preferably the counter electrode is formed from a material selected from the group consisting of a metal, Pt, Gold, nickel, copper, iron, carbon, graphite, graphene, carbon fibre, carbon nano-tubes, Bucky Balls, conducting polymer PPy, PA, Polycetylene, stainless steel. The counter electrode may be made of a solid layer or the conducting layer deposited onto a suitable support e.g. polymer glass, metal.

Preferably the counter electrode is a bare metal (such as Au, Pt, Stainless steel, and/or copper), or an Au or Pt plated substrate (such as metal, polymer and/or glass).

Preferably the counter electrode has 3D surface features which are configured in such a way as to promote the location of the charge density (voltage or current) on the 3D working electrode. For example, the counter electrode may include a series of tips that reflect the tips of the working electrode.

Preferably the counter electrode of any embodiment of the first aspect is in a fixed orientation with respect to the surface structure.

Preferably the counter electrode of any embodiment of the first aspect is electrochemically associated with the electrode array.

Preferably the counter electrode is held in an orientation to minimise differential in distance between each of the surface structures of the array. Preferably the orientation of the counter electrode is above an upper surface of the array. Thus the solution that comprises both the active species and the counter electrode as referred to in the first aspect, simply has the counter electrode present in that solution as would be clear to the skilled person. The first aspect in an alternative version therefore reads:

The invention provides a method of focussing charge density (voltage or current) at a functional surface on an electrode array, the method comprising the steps of:
  a) providing an electrode array comprising
    i) a support substrate;
    ii) at least one surface structure protruding from an upper surface of the support substrate wherein the surface structure includes an electrode layer;
    iii) a functional surface on the electrode layer, wherein the functional surface is on an upper portion of the at least one surface structure and wherein the functional surface is adapted to contact an active species in a solution;
  b) exposing the surface structure to a solution comprising an active species and including a counter electrode; and
  c) establishing a current or voltage between the electrode layer and the counter electrode such that the charge density is focussed at the functional surface and the active species is electrochemically modified following contact with the functional surface.

Preferably the electrode array further comprises a reference electrode in contact with the solution.

Preferably the reference electrode comprises an electrode formed from Ag/AgCl, NHE (standard hydrogen electrode, calomel, Pt, Au, stainless steel.

Preferably, the current of any embodiment of the first aspect established between the electrode layer and the counter electrode as measured at the electrode layer is an oxidising or reducing current.

Preferably the potential difference established between the counter electrode and the electrode layer is between about −2V and +2V, between about −200 mV and −1V, or about −400 mV, 0 and −1 mV, relative to a silver/silver chloride reference electrode.

Preferably, the current of any embodiment of the first aspect is pulsed between an activating potential and an inactivating potential.

Preferably the activating potential comprises a reductive potential of between about 0 mV to −2V, more preferably about −400 mV to −600 mV. Preferably the inactivating potential comprises an oxidative potential of between about 0 mV and 2V, more preferably about 200 mV to 500 mV. In an alternative embodiment, the inactivating potential is open circuit or turned "off".

Preferably, the electrochemical modification of the active species of any embodiment of the first aspect results in the elicitation of a detectable response. Preferably the detectable response comprises a change in current, voltage, capacitance, resistance, conductance, impedance, magnetic flux or electric field.

Preferably the detectable response is measured at a measurement electrode. Preferably the measurement electrode is connected to a measuring means which measures a change in one or more of current, impedance, voltage, capacitance, resistance, conductance, magnetic flux or electric field.

In use, the array comprises a measurement electrode electrically connected to one or more functional surfaces or groups. Preferably the measurement electrode is connected to a measuring means which measures a change in one or more of current, impedance, voltage, capacitance, resistance, conductance, magnetic flux or electric field. Suitable measuring means will be known to those of skill in the art, however, by way of example, the measurement instrument comprises an Ivium Compactstat, Pine potentiostat or Palmsens MultiEmStat. In some embodiments, the measurement electrode is used to protect or deprotect the functional surface with a protective coating or inert layer.

In a second aspect, the invention provides an electrode array comprising:
a) a support substrate;
b) at least one surface structure protruding from an upper surface of the support substrate, wherein the surface structure includes an electrode layer;
c) a functional surface on the electrode layer, wherein the functional surface is on an upper portion of the at least one surface structure and wherein the functional surface is adapted to contact an active species in a solution;
d) a binding layer wherein the binding layer is either:
  i) present on the functional surface at a significantly increased density than at a non-functional surface on the electrode array; or
  ii) present on a non-functional surface of the electrode array at a significantly increased density than at a position on the functional surface on the surface structure,
wherein the functional surface is at or about an apex of the surface structure.

Preferably the functional surface comprises a portion of the electrode layer defined by the charge density (voltage or current) being at least two times greater than the charge density (voltage or current) measured under equivalent conditions on a flat surface of the electrode layer when a current is established between the electrode layer and a counter electrode in a solution contacting the electrode layer.

Preferably the binding layer comprises a self-assembled monolayer (SAM), or a charged particle as defined in the first aspect.

Preferably the features of the electrode array of the second aspect are as described in relation to the electrode array defined in the first aspect.

Preferably a non-functional surface comprises a flat surface of the electrode layer.

Preferably a non-functional surface comprises a surface on which charge density (voltage or current) is least two times less than the charge density (voltage or current) on the functional surface.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

Embodiments of the invention will now be described, by way of example only, with reference to the accompanying drawings in which.

DETAILED DESCRIPTION OF THE INVENTION

Definitions

Figure 1:
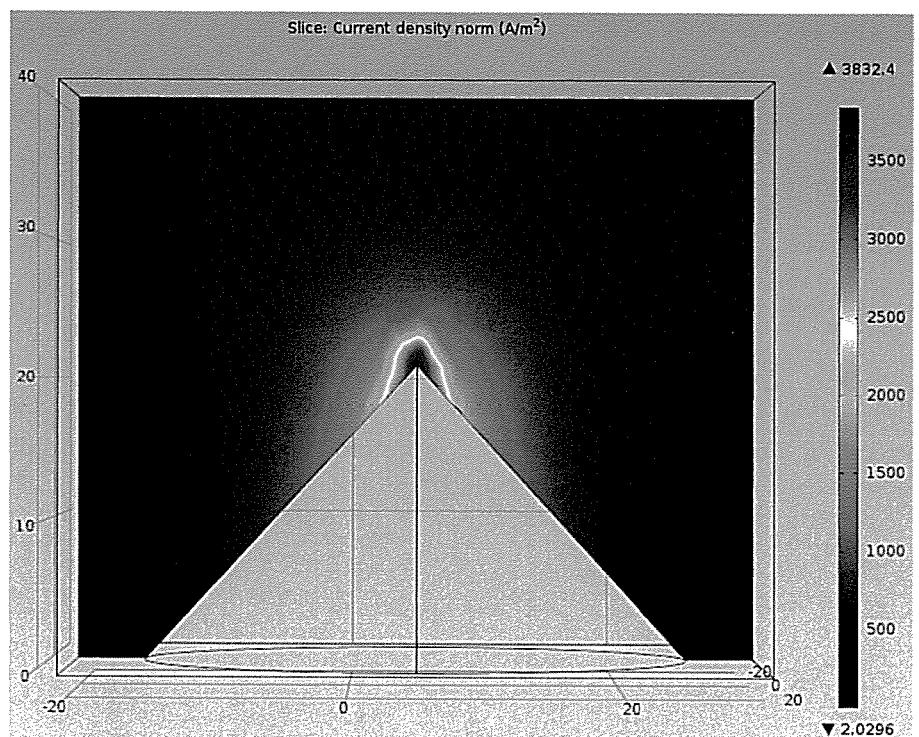
FIG. 1 shows a computer model of current density when passed through a surface structure with a triangular cross-section. The darker colour at the apex of the structure indicates a higher distribution of current density. The same figures are shown in colour (A) and black and white (B).
Figure 1:
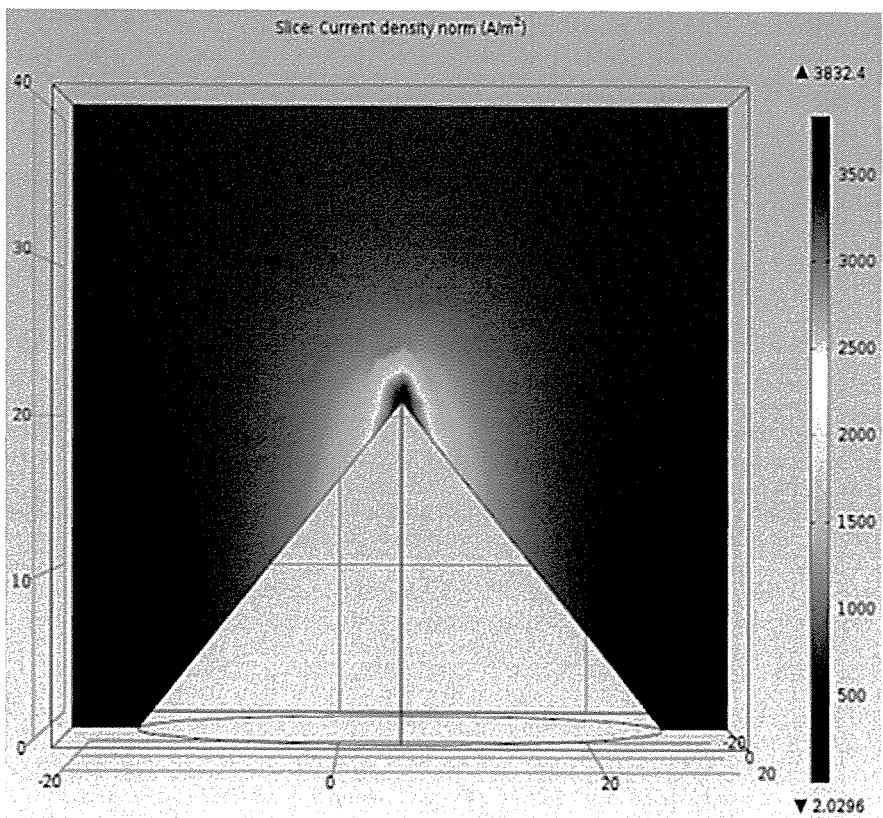

"Attach" or "bind" means covalent bonding, electrostatic bonding or some other bonding mode where the species is bound in some way to the support. Attachment may be direct or via another species.

"Tapered" means moving from a wider surface structure to a narrower surface structure.

"Smooth" means substantially no changes in the rate of change of angles of a surface.

"Deposited" means formed on a surface and may refer to any form of formation, layering or production.

In one embodiment, the deposition is achieved by sputtering, e-beam or thermal evaporation. Preferably the deposited layer has some degree of adherence to the layer on which it is deposited. This adherence may be covalent, electrostatic or include Van der Waals forces.

"Substantially constant thickness" in relation to the electrode layer means that the electrode layer does not vary significantly over the extent of its coverage of the support substrate or binding layer.

Unintentional variations in the thickness of the layer that have substantially no effect on function of the sensor are intended to be incorporated by the term substantially constant thickness.

"Comprise", "comprising", and the like, are, unless the context clearly requires otherwise, to be construed in an inclusive sense as opposed to an exclusive or exhaustive sense, that is to say, in the sense of "including, but not limited to".

The terms "Surface structure" and "functional surface" as referred to herein are intended to refer to singular or plural structure/surfaces.

"Width" of a surface structure is measured by the greatest distance across a cross-sectional area of the surface structure where the cross-section is taken along a plane substantially parallel to an upper surface of the support substrate. Where width is referred to, the point on the surface structure at which the parallel plane occurs is also described (e.g. at the joint between the support substrate and the surface structure).

"Catalyst" refers to the species that increases the rate of a chemical reaction.

"Electrochemically modified" in relation to an active species means that the active species undergoes reduction or oxidation i.e. gain or loss of electrons.

"Solute reactant" means a reactant found in the solution which takes part in a reaction catalysed by a catalyst active species. The solute reactant will preferably be in another conductive solution (i.e. different to the conductive solution comprising the active species) or may be in the same solution and will once reacted with the active species serve to bind/react with a target molecule to be detected by the sensor (refer "attached product" below).

"Binding layer" comprises a layer of molecules attached to a surface of the electrode array. The binding layer may be formed from a cross-linked polymer, a photo-resist or a self-assembled mono-layer (SAM).

Preferably the cross-linked polymer is an epoxy-based negative photoresist such as SU-8. The binding layer may be deposited onto the surface of the electrode array by means known to those of skill in the art, for example by spin-coating, spray-coating, dip-coating, wiping or painting. In alternative embodiments, the binding layer is attached to a surface of the electrode array by electrochemical modification of a precursor to a binding layer (i.e. an active species), preferably according to the methods described herein.

"Attached product" is the product of a reaction between a solute reactant and a binding layer, wherein a catalyst catalyses said reaction. In other words, it is the bond/linger that forms upon binding occurring.

"Detection moiety" comprises a component capable of attachment (directly or via another functional group) to a binding layer and which is capable of detection using detection techniques known to those of skill in the art. For example such techniques selected from the group consisting of protein detection, colorimetric detection, electrochemical, chemiluminescence detection, fluorescence detection, bioluminescence, chemifluorescence or radiographic detection. Where detection moieties are employed, they may be detected by standard methods known to those of skill in the art, for example fluorescence, optical or colourimetric measurements may be carried out.

"Focussed" in relation to an electrical current or voltage means that the charge density (voltage or current) is stronger in a focused position on a surface compared to another position on a surface. Charge density (voltage or current) on a surface can be measured according to methods known to those of skill in the art. However, in one embodiment, the charge density (voltage or current) is measured by modelling, and then directed attachment of a fluorophore, or platinum deposition on the surface.

"Counter electrode" the counter electrode may be any conductive entity that facilitates a current flow from the electrode layer through the solution. In one embodiment, the counter electrode comprises a wire or other form of electrode structure held within the solution. Preferably the counter electrode is formed from a material selected from the group consisting of a metal, Pt, Gold, nickel, copper, iron, carbon, graphite, graphene, carbon fibre, carbon nanotubes, Bucky Balls, conducting polymer PPy, PA, Polycetylene, stainless steel. The counter electrode may be made of a solid layer or the conducting layer deposited onto a suitable support e.g. polymer glass, metal. The counter electrode may also be a a bare metal (Au, Pt, Stainless steel, copper) or an Au or Pt plated substrate (metal, polymer or glass), and may have 3D surface features which are configured in such a way as to promote the location of the charge density (voltage or current) on the 3D working electrode. For example, it may be a series of tips that reflects the tips of the working electrode.

"Activating" or "activate" means to convert an active species from an inactive form to a reactive form. Thus, "electrochemical activation" means to convert the active species into a reactive form by oxidising or reducing it by applying a current at an electrode.

"Activating potential" means the voltage (oxidative or reductive in the typical range between +2V and −2V) required to initiate a coupling/attachment/modification reaction. Typically a reductive activating potential for click is from −500 mV to −100 mV.

"Inactivating potential" means the voltage required to stop a coupling/attachment/modification reaction "Active species" means an entity present in the solution which has the potential to undergo electrochemical modification. In one embodiment, the active species is a catalyst or a catalyst precursor. In another embodiment, the active species is a component of a binding layer. In another embodiment, the active species is a charged particle capable of attachment to a functional surface. In another embodiment, the active species is a binding agent capable of detecting a target analyte in the solution.

"Oxidation" means a chemical reaction involving the loss of electrons. Therefore, "oxidative" means facilitating the loss of electrons in a chemical reaction.

"Reduction" means a chemical reaction involving the gaining of electrons. Therefore, "reductive" means facilitating the gaining of electrons in a chemical reaction.

"Pulsed" or "pulsing" means to modulate a voltage or current from an activating potential to an inactivating potential. Pulsing may be regular or intermittent.

"Self-assembled monolayer (SAM)" means molecular assemblies comprising head groups linked to a tail group which terminates with a functional group.

"Selective removal" in reference to removal of an entity from a functional surface means that the removal is enhanced when compared to another surface on the array at which current is not focussed.

For example the removal of a SAM will occur at a faster rate, or a greater concentration of the entity will be removed when compared to those other surfaces. This wording does not imply that removal is complete or that removal does not occur to a lesser degree on other surfaces.

"Selective deposition" in reference to deposition of an entity on a functional surface means that deposition is enhanced when compared to another surface on the array at which current is not focused. For example the deposition of a SAM will occur at a faster rate, or a greater concentration or density of the entity will be deposited compared to those other surfaces. This wording does not preclude the possibility that deposition occurs to a lesser degree on other surfaces.

"Functionality" means any feature capable of attachment to a surface which has a function. For example binding layers, binding agents, active species, detection moieties, charged particles and attached products are all functionalities.

"Solvation" (or solvated) is an interaction of a solute with the solvent, which leads to stabilization of the solute species in the solution.

DESCRIPTION

Applications involving modification and functionalisation of surfaces suffer from a lack of options to position functional groups, binding layers or ionic substances. The lack of options to date has meant that the sensitivity and selectivity of sensors and catalytic arrays has been limited. The inventors have found that when current or voltage is passed through an electrode array exposed to an electrolyte solution, charge density (voltage or current) can be focussed towards the top of surface structures. They have advanced this concept to develop an electrode array with a functional surface which can be selectively functionalised by deposition or removal of binding layers, binding agents, active species or other functionality at or about an apex of each surface structure.

Figure 2:
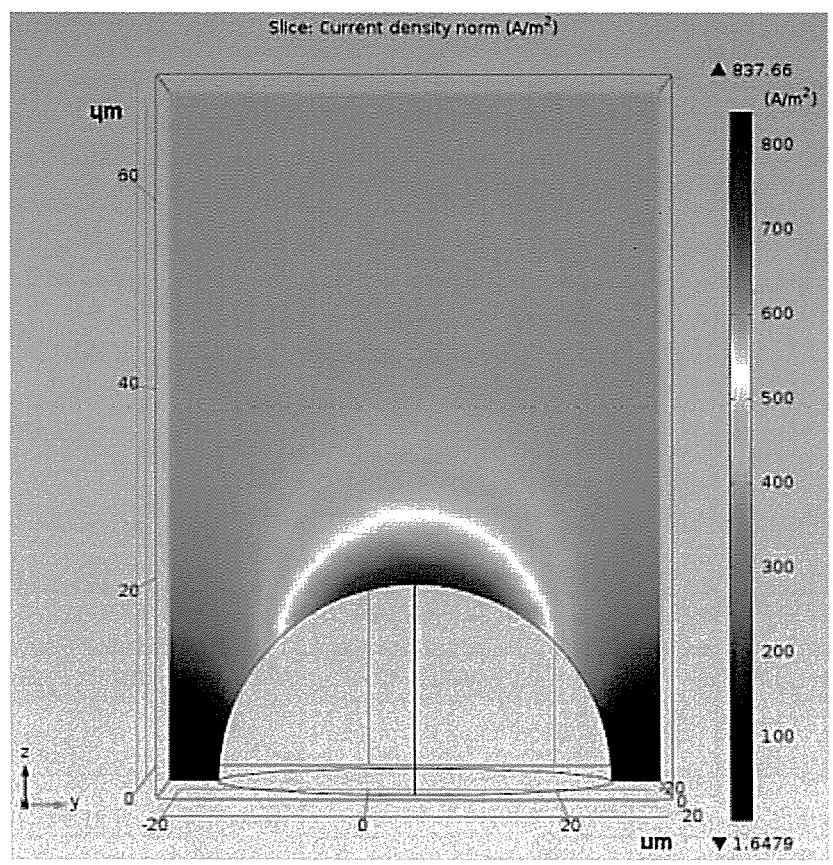
FIG. 2 shows a computer model of current density when passed through a surface structure with a semi-circular cross-section. The darker colour at the apex of the structure indicates a higher distribution of current density. The same figures are shown in colour (A) and black and white (B).
Figure 2:
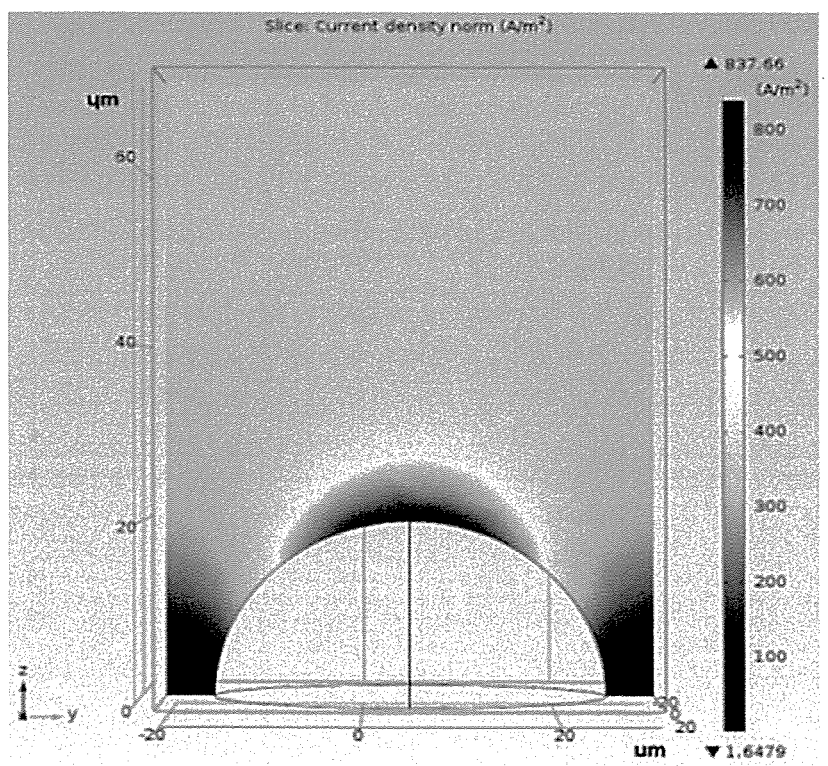

FIGS. 1 and 2 illustrate a computer model (COMSOL) of current passing from a surface structure on a flat base into a solution. This indicates that the charge density (voltage or current is highest at or about the apex of the structure. The modelling also suggests that the aspect ratio (sharpness) and the shape of the structure affect the distribution of charge density (voltage or current). The inventors have found that active species in a solution can be electrochemically modified via contact with the functional surface at which charge density (voltage or current) is focussed to enable precise location and deposition of functional groups, binding layers, ionic substances or other functionalities on a surface. The inventors have also shown that the same effect of focussing charge density (voltage or current) at the surface can be used to selectively remove functional groups, binding layers, ionic substances or other functionalities from a surface. While the sharper the point at the apex of the surface feature is the more precise deposition is (as the charge density is more focussed at the tip, more rounded options may also be used should that be desired.)

This invention is directed to the application of three dimensionality for catalysis and sensing. Features/results include:

Kinetic enhancement, i.e. a dramatic increase in the rate of catalysis and the rate of binding of a capture agent. This kinetic effect is obvious to anyone in the field when observing the results herein (see Example 6 and 8 and the Tables below).

Thermodynamic enhancement, i.e. a dramatic decrease in the energy required to drive a redox catalytic reaction for both metallic and organometallic electrocatalysts. The enhancements achieved are in the order shown in Examples 6 and 8, and the Tables below.

Metallic Catalyst

| | $O_2$ reduction | | $H_2$ production | |
| --- | --- | --- | --- | --- |
| | Voltage shift rel. to flat | Power gained at peak rel. to flat | Voltage shift rel. to flat | Power gained rel. to flat |
| Pt (Nano) | 200 mV | 1500% | — | — |
| Au (Nano) | 60 mV | 850% | — | — |
| Ni (Nano) | — | — | 100 mV | 770% |
| Pt (Pyramid) | — | — | 65 mV | 250% |

Organometallic Catalyst (Comparison of Pyramid Vs Flat Only)

| | Ascorbic acid oxidation | |
| --- | --- | --- |
| | Voltage shift rel. to flat | Power gained rel. to flat |
| Ferrocene (pyramid) | 59 mV | 152% |

The invention is based on one or more of the following non-limiting concepts:

1. Selective functionalization using a redox process at a predefined location on a surface using either voltage or current density distribution localised at the apex of a structure (tip or a line).

The sharper the tip, the more focused the functionalisation.

The higher the frequency, the more focused the functionalisation. (for example see example 7) Examples include:

Selective attachment using a redox mediated reaction

Selective metal deposition

Selective desorption of a self-assembled monolayer (could be applied to non-specific binding of matrix proteins)

2. Enhancement of an electro-catalytic process, by reducing the thermodynamic energy cost and increasing the kinetic turn-over.

The invention has particular application in the fields of biosensors, electrochemical sensing, optical sensing, electrocatalysis or selective deposition of material. Further applications could also include displays, signs, active surfaces and other applications requiring attachment of functionalities onto a surface.

Figure 3:
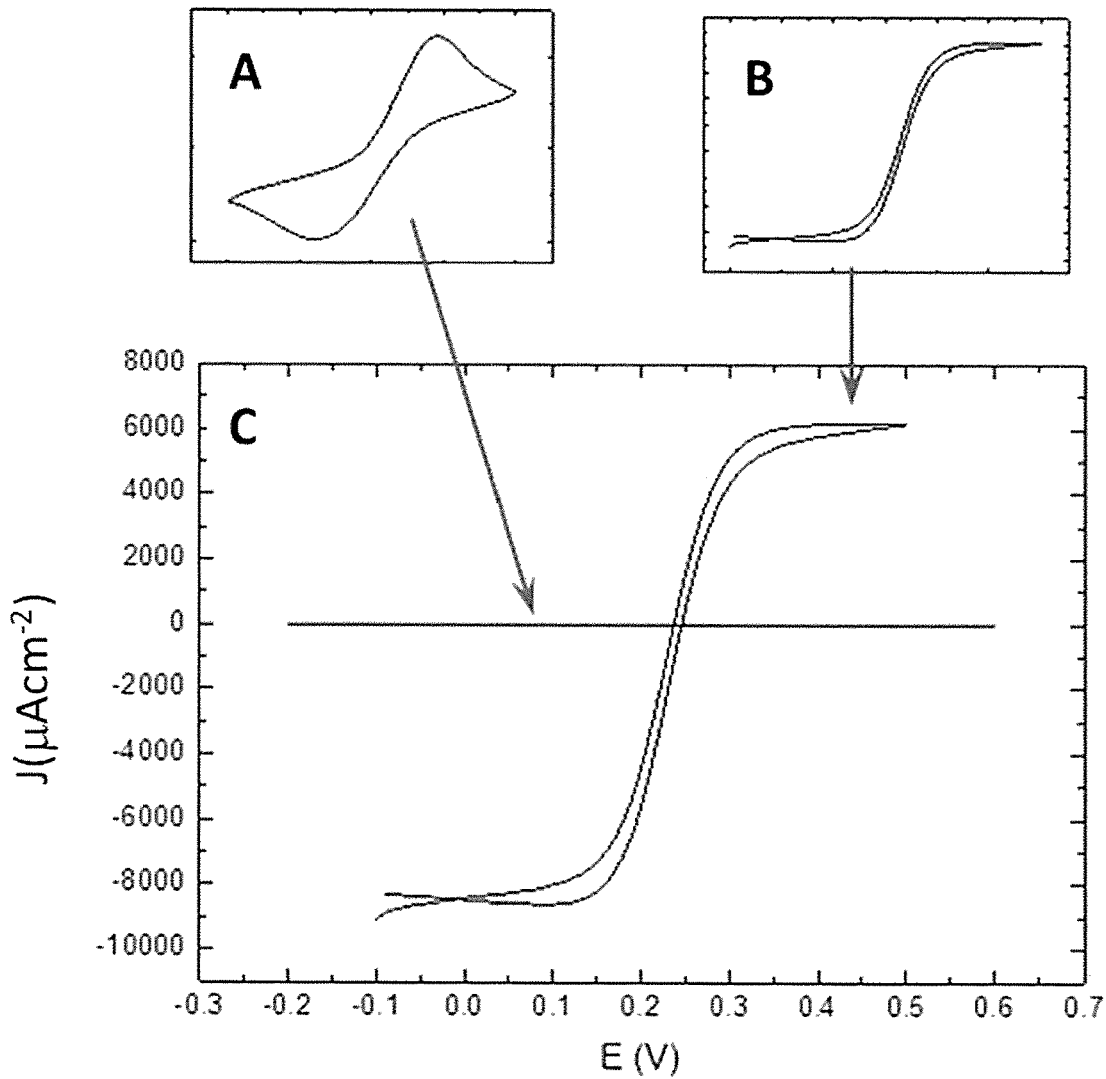
FIG. 3 shows a comparison between the charge density (voltage or current) ranges observed for a flat sensing surface versus an array of sensing surfaces on tips.

FIG. 3 shows the separate (A and B) and overlapped (C) cyclic voltammograms for both flat (A) and tip (B) electrodes for Ferrocyanide (0.1 mol) in phosphate buffer relative to a Ag/AgCl reference electrode. The cyclic voltammetry traces shown take into account the relative area of the electrodes and demonstrates the dramatic increase in the signal, and hence signal to noise obtained for an array of 7 μm tips verses a flat electrode. The inset figure A shows a response range of approximately 2 μAcm$^2$. In contrast, the inset figure B shows a response range nearly 8000 times larger at 16000 μAcm$^2$ for the same surface area. This effect occurs in microelectrodes due to spherical diffusion towards the tips, rather than planar diffusion which is seen for a flat electrode.

Selective functionalisation of the upper portion of the surface structures enables electrode arrays to be produced with diversity of attached functionalities on the same electrode surface. For example, an electrode surface with positionally distinct functionalities may be prepared by electrochemically depositing a functionality A at or about the apex of a surface structure and a different functionality B bound to the remainder of the electrode surface (i.e. on the surface between the functional surfaces of the surface structures).

The present invention has a number of applications including:
digital sensing (high resolution pixilation for optical sensing);
detection of generated analytes as a consequence of the high surface area of the electrode array;
mass producing high aspect ratio conducting polymer forest/grass for sensing application; and
catalysis.
Photovoltaics The invention therefore provides a method of focussing charge density (voltage or current) at a functional surface on an electrode array, the method comprising the steps of:
a. providing an electrode array comprising:
 i. a support substrate;
 ii. at least one surface structure protruding from an upper surface of the support substrate wherein the surface structure includes an electrode layer;
 iii. a functional surface on the electrode layer, wherein the functional surface is on an upper portion of the at least one surface structure and wherein the functional surface is adapted to contact an active species in a solution;
b. exposing the surface structure to a conductive solution containing an active species in which a counter electrode is positioned; and
c. establishing a current or voltage between the functional surface on the electrode layer and the counter electrode such that the charge density is focussed at the functional surface on the electrode layer.

Preferably the functional surface is at or about an apex of the surface structure of the array.

In a more preferred form, the functional surface is at or about an apex of the surface structure and the apex is tapered to an apex and/or has a substantially triangular cross-section along a plane parallel to a top surface of the support substrate.

It is also preferred that the functional surface is at or about an apex of the surface structure and wherein the width of the apex of each surface structure is between about 1 nm to about 5000 micron.

Further options of use are described herein but would be apparent to a skilled reader.

It is also preferred that the functional surface is at or about an apex of the surface structure and wherein the width of the surface structure where it joins the support substrate is between about 20 nm to about 5000 μm (further options of use are described herein but would be apparent to a skilled reader) and wherein the width at the apex of the surface structure is less than the width of the surface structure where it joins the support substrate.

It is also preferred that the functional surface is at or about an apex of the surface structure and wherein the apexes of the surface structures are separated from each other by about 50 nm to about 1000 μm apex to apex (further options of use are described herein but would be apparent to a skilled reader).

While the surface structures may be of any form as is described herein, it is preferred that they are pyramidal, conical, ridges, or combinations thereof, and it is also preferred that the counter electrode structure is also flat, pyramidal, conical, or ridged.

In a preferred form, the shape of the counter electrode reflects that of the surface structures and, in a more preferred form, the counter electrode is parallel to the surface structures.

The functional surface will preferably comprise a catalyst capable of electrochemical activation.

In a preferred form the functional surface is formed of a catalytic material (e.g. Pt, Au, Ni) which is activated via electrochemical modification via the current or voltage between the electrode layer and the counter electrode.

When the functional surface comprises a catalyst (including when it is formed of a catalytic material), it is preferred that the catalyst is activated via application of a current or voltage to yield an activated catalyst and the catalytic turnover rates (thermodynamic and kinetic) compared to the same material on a flat surface are improved.

The catalyst will preferably be selected from metallic and organometallic materials, and the metallic materials are preferably selected from one or more of Pt, Au and Ni, and the organometallic material is selected from one or more of Ferrocene, and Porphyrin, or Phenanthroline, Porphyrin, Imidazole, tris pyridyl amine, and triazole, with a transition metal. Preferably the transition metal is selected from any one or more of Ru, Fe, Mn, Mg, Cu, Ir, Co, Pt, Pd, Au, Ag, Mg. (Ferrocene already including a transition metal and Porphyrin may optionally include a transition metal).

It is also preferred that the active species is electrochemically modified following contact with the functional surface.

Preferably the active species is electrochemically modified following contact with the functional surface and the thermodynamic efficiency and kinetic efficiency of the electrochemical modification is improved compared to a corresponding flat electrode.

The electrode array of the invention also preferably comprises a binding layer which is either present on the functional surface at a significantly increased density than at a non-functional surface on the electrode array; or present on a non-functional surface of the electrode array at a significantly increased density than at a position on the functional surface on the surface structure.

The binding layer will preferably comprise a self-assembled monolayer (SAM) as is described in more depth herein.

In another preferred option, the array includes a catalyst at the apex of the surface structure and a co-catalyst in the valleys between the surface structures, wherein the catalysts are selected as described above, and the co-catalysts are selected from any one or more oxides of a metal (e.g. ruthenium, nickel, aluminum, calcium, cerium, gallium, hafnium, iron, lanthanum, magnesium, strontium, titanium, zirconium, or zinc).

The method also achieves an increase in the rate of catalysis compared with a flat electrode (Kinetic efficiency—i.e. the speed at which catalysis occurs, and relating primarily to the speed at which the reactants and the products diffuse to and away from the catalytic surface.). The method also achieves a decrease in the energy required to drive a redox catalytic reaction for both metallic and organometallic electrocatalysts (Thermodynamic efficiency—i.e. the energy required to drive the electrocatalytic reaction)

Preferably the method achieves increases in both Kinetic and Thermodynamic efficiency compared to an electrode with a flat surface.

In another aspect, the invention provides a method of focussing charge density (voltage or current) at a functional surface on an electrode array, the method comprising the steps of:
a) providing an electrode array comprising
  i) a support substrate;
  ii) at least one surface structure protruding from an upper surface of the support substrate wherein the surface structure includes an electrode layer;
  iii) a functional surface on the electrode layer, wherein the functional surface is on an upper portion of the at least one surface structure and wherein the functional surface is adapted to contact an active species in a solution;
b) exposing the surface structure to a solution comprising both an active species and a counter electrode that is positioned therein; and
c) establishing a current or voltage between the electrode layer and the counter electrode such that the charge density is focussed at the functional surface and the active species is electrochemically modified following contact with the functional surface.

Preferably the functional surface is at or about an apex of the surface structure. It will be appreciated by those of skill in the art that surface structures with an apex are likely to be substantially flat when viewed at very high magnification. Accordingly, the shapes and measurements provided herein are intended to refer to the overall shape of the surfaces structure rather than being precise geometric descriptions.

In this aspect, charge density (voltage or current) is focussed on the upper portion of the surface structure—referred to as the functional surface. The inventors have shown that this effect, when put into effect with appropriately shaped surface structures, can be used to selectively functionalise or de-functionalise the upper portion of the surface structures where they contact a solution.

Figure 4:
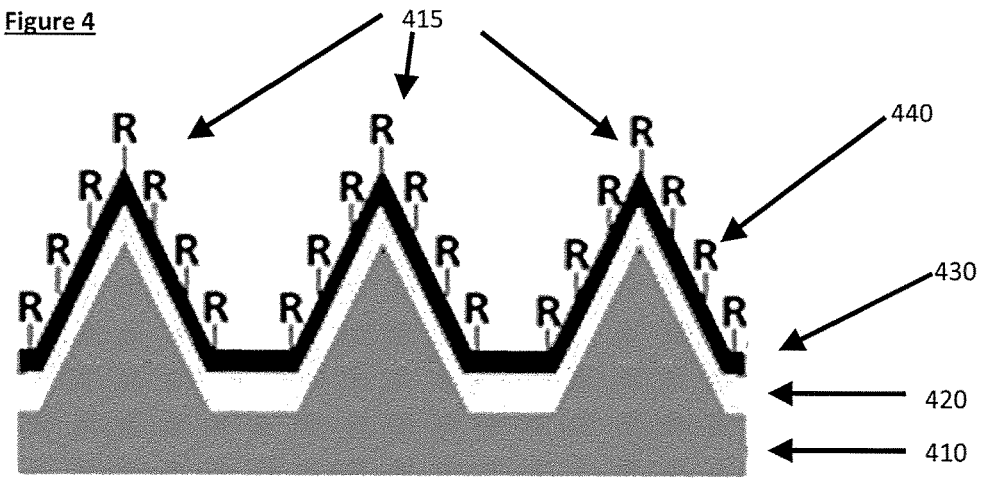
FIG. 4 shows a cross-sectional view of an electrode array according to the invention with a triangular cross-section.

In a first embodiment, the active species comprises a catalyst, wherein the catalyst is activated via electrochemical modification following contact with the functional surface to yield an activated catalyst. FIG. 4 shows an embodiment of the invention in which the electrode array 400 comprises a support substrate 410, surface structures 415 and an electrode layer 420. The electrode layer is overlaid with a binding layer 430 onto which are attached terminal functional groups 440. In another embodiment, the functional surface is formed of a catalytic material (e.g. Pt, Au, Ni) which is activated via electrochemical modification via the current or voltage between the electrode layer and the counter electrode.

Figure 5:
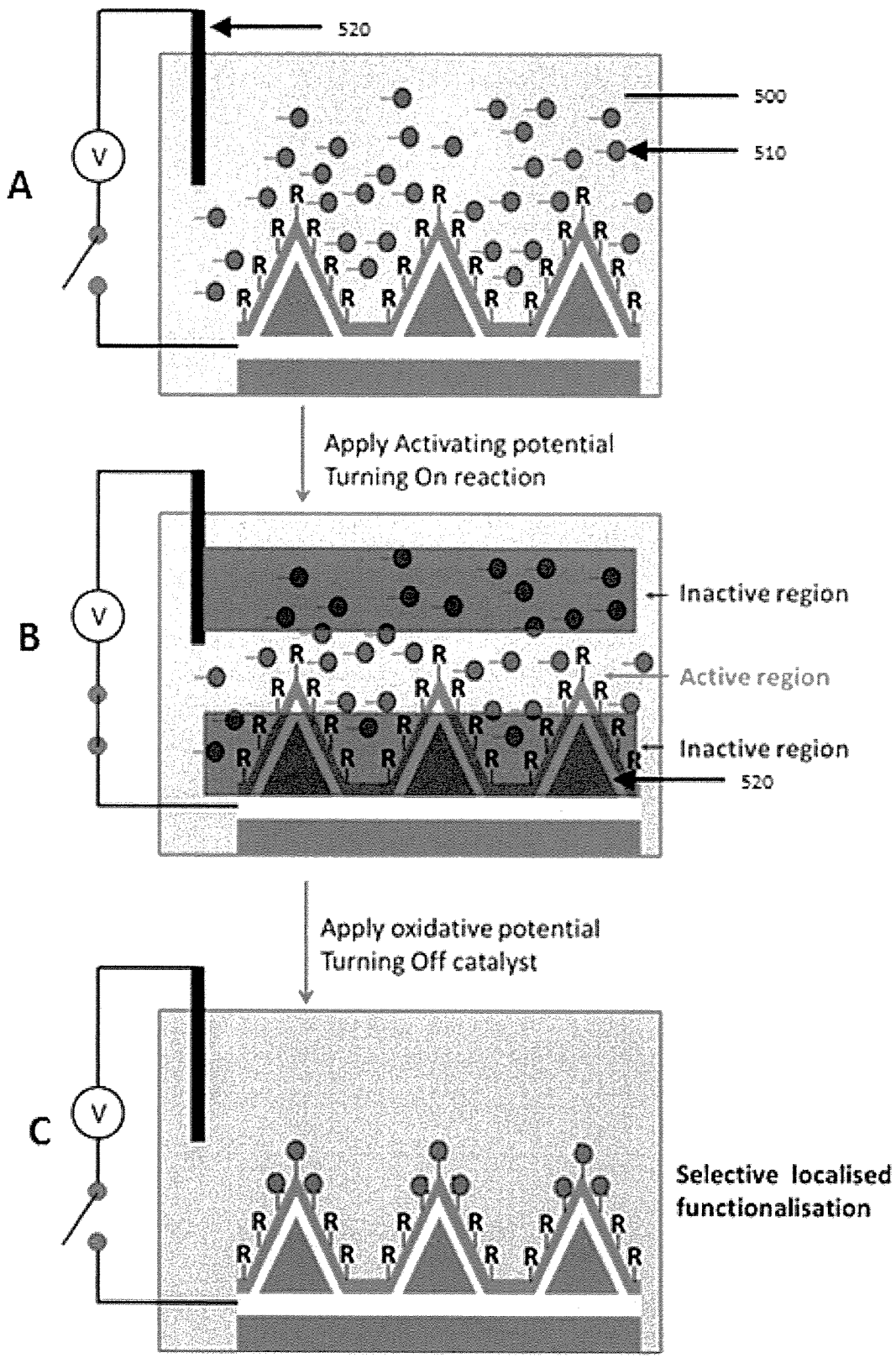
FIG. 5 shows an embodiment of the invention in which the active species comprises a catalyst, wherein the catalyst is activated via electrochemical modification following contact with the functional surface to yield an activated catalyst.

The electrode array of FIG. 4 is shown in FIG. 5A submerged in an electrolyte solution 500 containing an active species (not shown), several solute reactant particles 510 and a counter electrode 520. When a current is established between the electrode layer 420 and the counter electrode (see FIG. 5B), the active species—a catalyst in solution—is activated and catalyses the reaction of the solute reactant with the functional groups R on the binding layer in an active region at or about the apex of the surface structures. The solute reactant may be in either the same or a different conductive solution to the active species. The active region being created by the interaction of the functional surface on the electrode layer and the positioning of the counter electrode. This is possible due to the focussing of the charge density at the top of the functional surface as has been previously been discussed (see FIGS. 1 and 2). FIG. 5C shows the selectively functionalised surface structures with the functionality localised at or about the apex of the surface structures.

As will be apparent to the skilled reader, where the description of the invention refers to a solution comprising both an active species and a counter electrode, this refers to the solution having the counter electrode position therein.

The catalyst may be any suitable catalyst which is activated by oxidation or reduction at a charged surface. In particular embodiments the catalyst comprises a charged metal species such as transition metals like copper, $Cr^{x+}$, $Ag^+$, $Pt^{2+}$, $Pd^{2+}$, $Fe^{2+}$, $Ir^{2+}$, $Ni^{2+}$, Rd, Co, Mn, Ru, Such catalysts will typically occur in two or more oxidation states and will be active in catalysing a reaction of a solute reactant with a binding layer in one state and inactive in at least one other oxidation state. The catalyst is preferentially activated at the area of charge focusing (voltage or current) (on the upper portion of the surface structures) as compared to other surfaces on the array, for example on the support substrate, the electrode layer on a lower portion of the surface structures, or on the binding layer on the lower portion or between surface structures. As such, electrochemical activation of the catalyst occurs at a substantially greater rate at the functional surface than activation would occur at another surface position on the electrode layer.

The effect described above enables the method of the first aspect to be extended to further comprise the step of electrochemically activating the active species in the solution to yield an activated catalyst. The further step of attaching a solute reactant to a binding layer on the functional surface can be achieved once the catalyst is activated.

In one embodiment, the current established between the electrode surface and the counter electrode activates (reduces) Cu(II) which contacts the functional surface to Cu(I).

Figure 6:
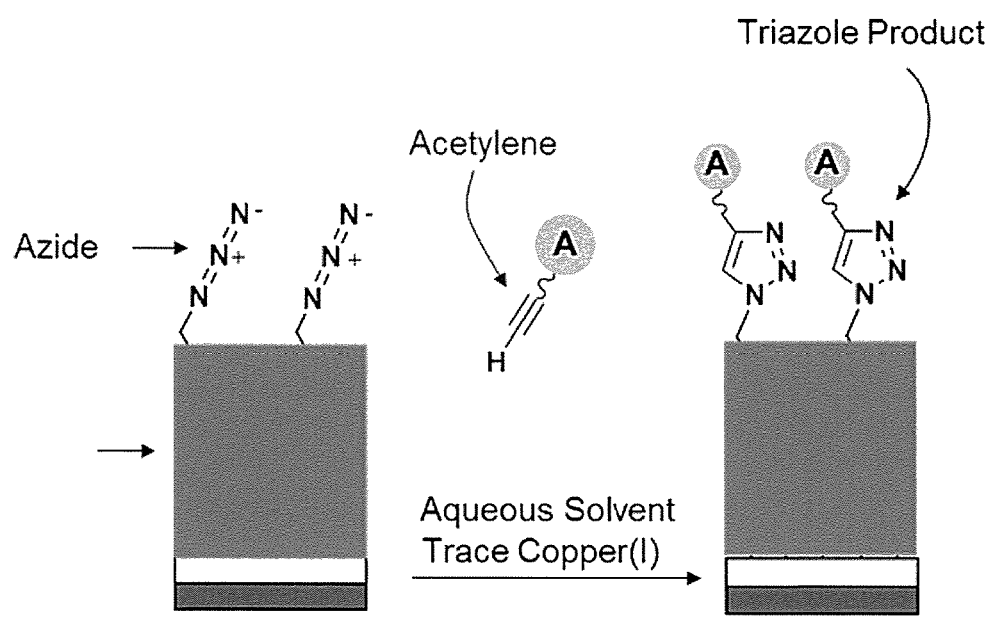
FIG. 6 shows a Cu(I) catalysed azide alkyne cycloaddition reaction with an ethynyl fluorophore (A)
Figure 7:
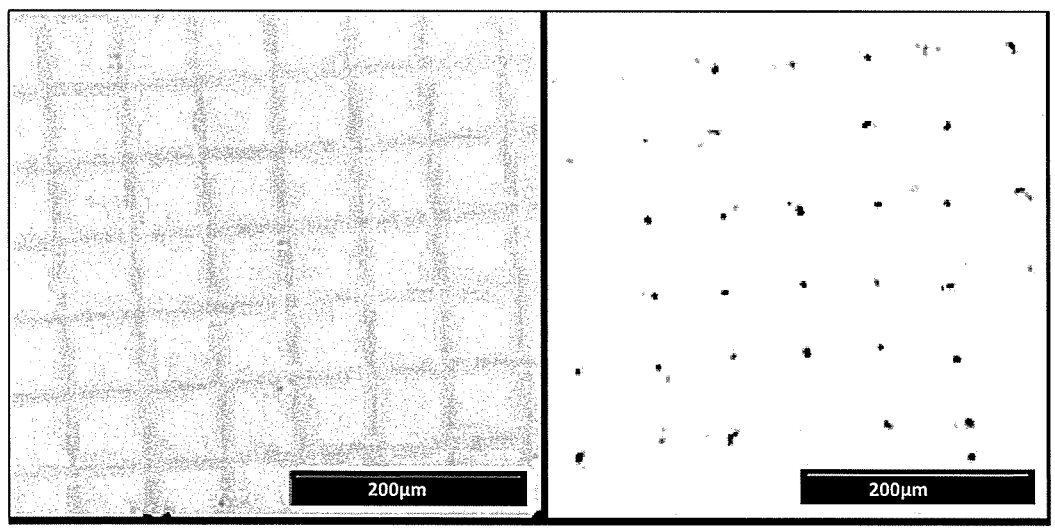
FIG. 7A shows a negative fluorescence image of an array with no potential applied and FIG. 7B shows a negative fluorescence image of an array with a reductive potential applied to activate the copper catalyst.

The Cu(I) catalyses the azide alkyne cycloaddition reaction shown in FIG. 6. FIG. 6 also shows an ethynyl fluorophore detection moiety (A) which is attached to the surface following cycloaddition. Example 2 provides experimental details of the Cu(I) catalysed azide alkyne cycloaddition reaction. FIG. 7A shows a negative fluorescence image of an array with no potential applied and FIG. 7B shows a negative fluorescence image of an array with a reductive potential applied to activate the copper. The dark patches are the fluorophores fluorescing. Negative images are used to more clearly represent the areas of fluorescence and enable clear representation in black and white. The attached fluorophores are visible on the upper portions of the surface structures in FIG. 7B but substantially absent from FIG. 7A (the control). Preferably, the activated catalyst catalyses a reaction of a solute reactant with a binding layer to yield an attached product on the functional surface. The Cu active species can be any other suitable catalyst that is activatable by redox type reactions at a charged surface, such as the metal and organometallic active species discussed herein.

Preferably the active species comprises copper (II) and the electrochemically activated catalyst comprises copper (I).

Preferably the reaction between the solute reactant and the binding layer is a copper (I) catalysed azide alkyne cycloaddition reaction.

Preferably the solution comprises a buffer solution with alkali metal chloride ions and copper$^{2+}$ ions.

Preferably the solute reactant comprises a compound with a reactant group that is able to couple to the surface and a functionality (e.g. for sensing, catalysis, optics, further attachment).

Preferably, the solute reactant is selected from the group consisting of but not limited to alkynes, alkenes, carboxylic acids, esters, ketones, aldehydes, alcohols and amines. Preferably the alkyne comprises acetylene.

Preferably the solute reactant comprises a detection moiety adapted to attach to the functional surface following reaction of the solute reactant with the binding layer.

Preferably the detection moiety is capable of detection using protein detection, electrochemical detection, amperiometric, current, voltage, capacitance, colorimetric detection, chemiluminescence detection, fluorescence detection, bioluminescence, chemifluorescence or radiographic detection.

Preferably, the solute reactant with detection moiety comprises an ethynyl functionalised fluorophore.

Preferably the binding layer to which a solute reactant binds comprises a self-assembled monolayer (SAM).

The SAM may be functionalised with a functional group to provide it with a desired functionality.

Preferably, the active species comprises a solute reactant capable of attachment to the binding layer.

Preferably the binding layer is present on at least one of:
the functional surface;
the surface structures;
the passivating layer; or
the support substrate.

Preferably the method of the first embodiment of the invention further comprises depositing a SAM on at least one of:
the functional surface;
the surface structures;
the passivating layer; or
the support substrate.

Preferably the step of depositing the SAM is carried out prior to electrochemically activating the active species following contact with the functional surface to yield an activated catalyst.

Preferably the step of depositing the SAM is carried out prior to attaching a solute reactant to a binding layer on the functional surface.

In a particular embodiment, the binding layer is selected from the group consisting of azides, carboxylic acid, amine, alcohol, ester, ketone, cyano and aldehyde.

Preferably the binding layer on the functional surface is substantially stable for the duration of the current flow between the electrode layer and the counter electrode. To maintain a stable binding layer the SAM preferably comprises a carbon chain of C6 to C16 (C6, 7, 8, 9, 10, 11, 12, 13, 14, 15, or 16). For better stability, the SAM preferably comprises a carbon chain of C11 to C16 (C11, 12, 13, 14, 15, or 16). The carbon chains can be an alkane, alkene, alkyne and aromatic structure. Mixtures of carbon chains as referred to above (of C6 to C16, preferably C11 to C16), of any structure may also be used.

Preferably the attached product is selected from the group consisting of:
a. a functional group, for example one selected from the group consisting of carboxylic acid, amine, alcohol, aldehyde, biotin, avidin, azide and ethynyl;
b. a binding agent adapted to bind to a target analyte in solution, for example one selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, atetylenic quinone, azides, tetrazine, large or small amine-containing molecules, sulfhydryl-containing molecules or proteins expressing glutathione S-transferase (GST), metals and metal salts (such as lead, lead phosphate, chromium, platinum, palladium, iridium, copper), ssDNA, ssRNA, miRNA, mRNA, aptamers, and small molecules with and without a spacer molecule;
c. a catalytic species which catalyses a reaction in solution, for example a catalyst selected from the group consisting of copper, a transition metal, an organometallic complex, an organometallic complex including transition metal, or an organic material that is able to be oxidised or reduced; and
d. a detection moiety, for example one selected from the group consisting of a fluorophore, an ethynyl functionalised fluorophore, a protein, an antibody, a nucleic acid, DNA, RNA, a small molecule, or a functional group, for example one selected from the group consisting of carboxylic acid, amine, alcohol, ester, ketone and aldehyde.

Preferably the attached product is selected from the group consisting of triazoles, amides, quinones and esters or mixtures thereof.

Preferably the attached product is selected from the group consisting of triazoles, amides, quinones and esters, or Pt, Ir, Au, Ag, Fe, and mixtures thereof.

It will be understood by those of skill in the art that removal of a binding layer such as a SAM is very difficult using manual means or other means described in the prior art. Even more challenging is the selective removal of a SAM from a specific location on a surface, to produce a regular patterned array of exposed surface for subsequent functionalisation or reaction. If high currents (for example greater than about 2V) are applied across the surface, electrolysis of the solution can occur yielding oxygen or hydrogen at the electrode layer. This is undesirable and can affect measurements and reactions which occur at the surface. Another problem is the undesirable stripping of the electrode layer from the surface. In this case, the electrode layer (often gold or another precious metal) can be lost to the solution. Preferably therefore the current applied is less than 2V and more preferably less than 1V, between 0 and 1V (0.1, 0.2, 0.3, 0.4, 0.5, 0.6, 0.7, 0.8, 0.9)

The inventors have shown that the focussing of charge density (voltage or current) at the functional surface on an upper portion of the surface structure can be used to selectively attach or remove binding layers to the functional surface, preferably without the electrolysis of water nor the removal of the electrode layer.

Accordingly, in one embodiment, the electrode array of the invention comprises a binding layer (preferably a SAM) covering the functional surface and at least part of other surfaces of the array, wherein the step of establishing a current between the electrode layer and the counter electrode results in selective removal of the binding layer from the functional surface compared to other positions on the electrode array. The inventors demonstrate in example 3 the selective removal (desorption) of a SAM from the upper portion of surface structures.

Preferably the method of the invention further comprises the step of selective removal of at least part of the binding layer from the functional surface as compared to other positions on the electrode array.

Preferably the method of the invention further comprises the step of selective deposition of a further binding layer on the functional surface which has undergone selective removal of the first binding layer.

Example 5 shows an example of the deposition of a first binding layer (SAM) on an electrode array, then selective removal of the binding layer from the functional surface at or about the apex of the surface structures of the array followed by deposition of a different binding layer (SAM) at or about the apex.

The removal of the binding layer from the upper portion of the surface structure enables a binding layer comprising functionalities to be selectively attached at or about the apex of the surface structure. This can be used for attachment of binding agents and/or detection moieties, for example for use as biosensors for testing of solutions for target analytes.

Removal of the binding layer at the functional surface is made possible by electrochemical modification of an active species in the solution where the active species is solvated within a charge carrying or ionic species, for example selected from the group consisting of a buffer, a salt species, and NaCl. The active species preferably acts as an electron donor and provides the binding layer, for example the sulphur on the SAM, with an electron thus liberating the SAM. The binding layer may comprise a number of different molecules or atoms which are susceptible to reduction or oxidation by the charged active species, for example S, O or N. The effect of the electrochemical modification of the active species is the oxidation or reduction of the functionality on the binding layer that binds to the functional surface (e.g. the S atom of the SAM).

Preferably the electrochemical modification of the active species comprises either a partial or full oxidation or reduction.

In one particular embodiment, the electrode array comprises a binding layer on a lower portion of the surface structure but absent from an upper portion of the surface structure, and the method further comprises the step of selective deposition of a further binding layer on the functional surface.

In this embodiment, an electrode array previously prepared with the binding layer removed from the upper portion is selectively functionalised at the functional surface—i.e. on the upper portion of the surface structure.

Preferably the electrode array defined in the first aspect further comprises a self-assembled monolayer (SAM).

Preferably the SAM is present on an upper surface of the electrode layer.

Preferably the SAM is present on an upper surface of the support substrate.

Preferably the SAM is present around the surface structures such that the surface structure or a portion thereof protrudes with an exposed functional surface thereon.

Preferably the SAM comprises long-chain molecules comprising a carbon chain of C6 to C24 (C6 7 8 9 10 11 12 13 14 15 16 17 18 19 20 21 22 23 or 24) in alkane, alkene, alkyne, or aromatic structures; or mixtures thereof. In this embodiment, the stability of the SAM is increased relative to a shorter carbon chain. In turn this requires a stronger current to destabilise and remove the SAM.

Preferably the SAM comprises short-chain molecules comprising a carbon chain of C5 to C1 (C1 2 3 4 5).

In this embodiment, the SAM is less stable and therefore requires a weaker current. It is therefore more susceptible to removal and this may be preferable for applications that require fast removal of the SAM.

Preferably the SAM is a mixed SAM comprising long and short chain molecules.

Preferably the mixed SAM comprises long-chain molecules comprising a carbon chain of C6 to C24 and short-chain molecules of C5 to C1 (all of which are referred to above).

Preferably the long-chain SAM comprises molecules selected from the group consisting of azides, amines, carboxylates or carboxylic acids.

Preferably the short-chain SAM comprises molecules selected from the group consisting of alkanes, azides, amines, hydroxyls, carboxylates or carboxylic acids.

In one particular embodiment, the SAM comprises a mixture of long chain molecules comprising carboxylic acid molecules of C6 to C24 (as defined above) and short chain molecules (as defined above) comprising hydroxyl molecules. In the above embodiments, the SAM long chain molecules are preferably selected from C6, C8, C10, C12, C14, C16, C18 or C20 molecules.

Preferably the SAM is present on the electrode array but is absent at the upper portion of the surface structure as defined above.

Preferably the SAM comprises long-chain molecules comprising a carbon chain of C6 or more (to C24 as defined above) or short-chain molecules C5 or less (to C1 as defined above) and wherein the upper portion of the surface structure(s) is either a. free of SAM, or b. comprises a SAM adapted to be removed by establishing a current between the electrode layer and the counter electrode.

Preferably the SAM comprises an long chain molecule with a carbon chain of between C6 to C24, and wherein the upper portion of the surface structure(s) is either a. free of SAM, or b. comprises a SAM adapted to be removed by establishing a current between the electrode layer and the counter electrode.

In one particular embodiment exemplified in example 5, the electrode array comprises a SAM binding layer on an upper and lower portion of the surface structure and contact of the active species with the functional surface results in selective removal of the SAM binding layer from the upper portion of the surface structure where charge density (voltage or current) is focussed. In this embodiment, the method further comprises the step of selective deposition of a further binding layer on the now exposed portion of the electrode layer at the functional surface.

Preferably the SAM is selected from the group consisting of alkane thiols with a terminal methyl, azide, thiol, aldehyde, cyano, diazonium, amines, alcohols, silanes, phosphonic acids and carboxylic acids.

In particular embodiments, the SAM comprises:
R—$(CH_2)_n$—SH, R—$(CH_2)_n$—$NH_2$, or
R—$(CH_2)_n$—$Si(OR')_3$
wherein R=alkyl, azide, quinone or tetrazine; and
R'=Me, Cl, Et; and
wherein n=1 to 50

The method of the invention may comprise selective deposition of a further binding layer on the functional surface as compared to other positions on the array. This step may be carried out on an array which has already undergone selective removal of a binding layer (e.g. a SAM) from the functional surface.

Preferably the further binding layer comprises a functional group selected from the group consisting of SAM-COOH, SAM-C—NH2, SAM-N3, wherein SAM comprises a self-assembled monolayer.

Preferably the step of deposition of a further binding layer comprises coupling of an active species to the binding layer on the functional surface. Preferably the coupling comprises a 1-Ethyl-3-(3-dimethylaminopropyl)-carbodiimide/N-hydroxysuccinimide (EDC/NHS) coupling reaction.

Preferably the binding layer further comprises a binding agent. The binding agent is preferably capable of binding to a target analyte within a solution. For example the binding agent is selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, atetylenic quinone, azides, tetrazine, large or small amine-containing molecules, sulfhydryl-containing molecules or proteins expressing glutathione S-transferase (GST), metals and metal salts (such as lead, lead phosphate, chromium, platinum, palladium, iridium, copper), ssDNA, ssRNA, miRNA, mRNA, aptamers, and small molecules with and without a spacer molecule.

Preferably, the active species comprises an entity with potential for electrochemical reduction or oxidation. Preferably the active species comprises a binding agent as described above or a functional group capable of attachment to the binding layer. Preferably the functional group is selected from the group consisting of avidin, cyano, aldehyde, ester, ketone, COOH, $NH_2$, azide, ethynyl, bioactive biotin, quinone and tetrazine or combinations thereof.

The inventors have also found that the focussing of charge density (current or voltage) on a functional surface can be used to attach particles to the functional surface following the electrochemical modification.

Accordingly, in a further embodiment of the invention, the active species comprises a species wherein the species is attached to the functional surface following the electrochemical modification.

Preferably the active species is a charged particle preferably selected from a metal ion(s). Preferably the metal ion comprises an ionic form of platinum, gold, palladium, Iron, Iridium, silver, copper, an alloy or a transition metal.

Preferably the ionic form is an oxidised form of the metal ion.

Preferably the ionic form is selected from the group consisting of $Ni^{2+}$, $Cr^{x+}$, $Cu^{2+}$, $Cu^+$, $Ag^+$, $Pt^{2+}$, $Pd^{2+}$, $Fe^{2+}$, $Ir^{2+}$ or other transition metal ions such as Sc, Ti, Vn, Cr, Mn, Co, Zn, Au, Tg, Yt, Mb In an alternative embodiment, the charged particle may be a binding agent for a biological sensor. Preferably the binding agent is selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, large or small amine-containing molecules, sulfhydryl-containing molecules or proteins expressing glutathione S-transferase (GST), metals and metal salts (such as lead, lead phosphate, chromium, platinum, palladium, iridium, copper).

It will be appreciated by those of skill in the art that the above binding agents need not be attached directly to the functional surface, they may be attached indirectly via a linker molecule and it may be the linker molecule which provides the charge necessary for attraction and binding to the functional surface. The linker molecule may be a monomer whereby monomers are attached to a binding agent and form a conducting polymer on the functional surface. For example applying an oxidative potential to a solution containing pyrroles would result in the pyrroles attaching to the surface and have the effect of attaching the binding agent to surface. Other linkers might include alkane, polyethyleneglycol, poly acetylene chains with various functional groups within the backbone including ethers, esters, amides.

Figure 9:
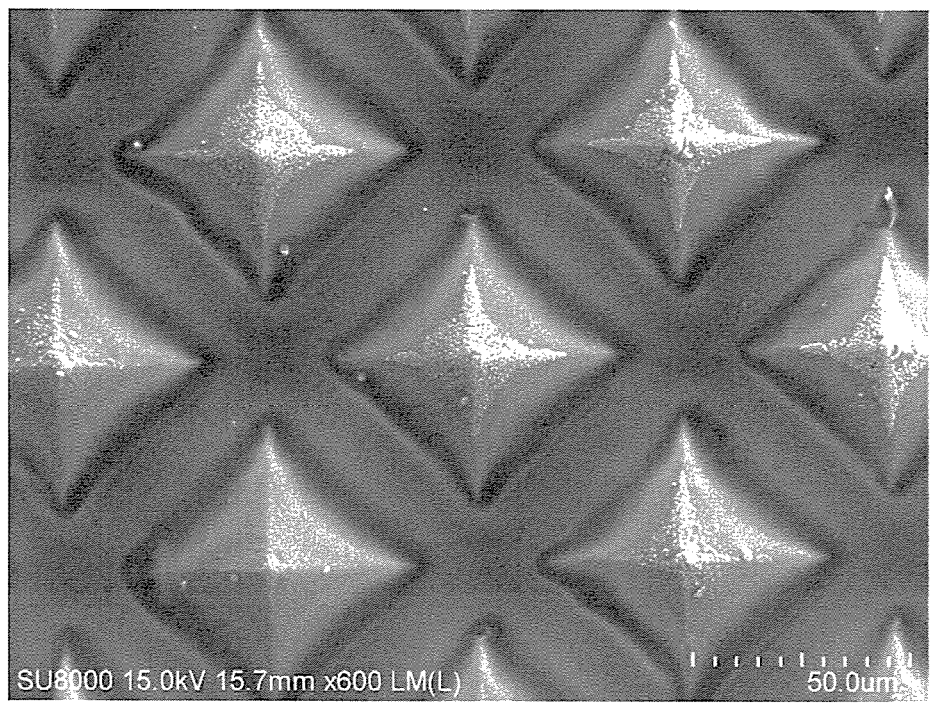
FIGS. 9 and 10 show SEM images illustrating the Pt deposition at the apex of a group of surface structures.
Figure 10:
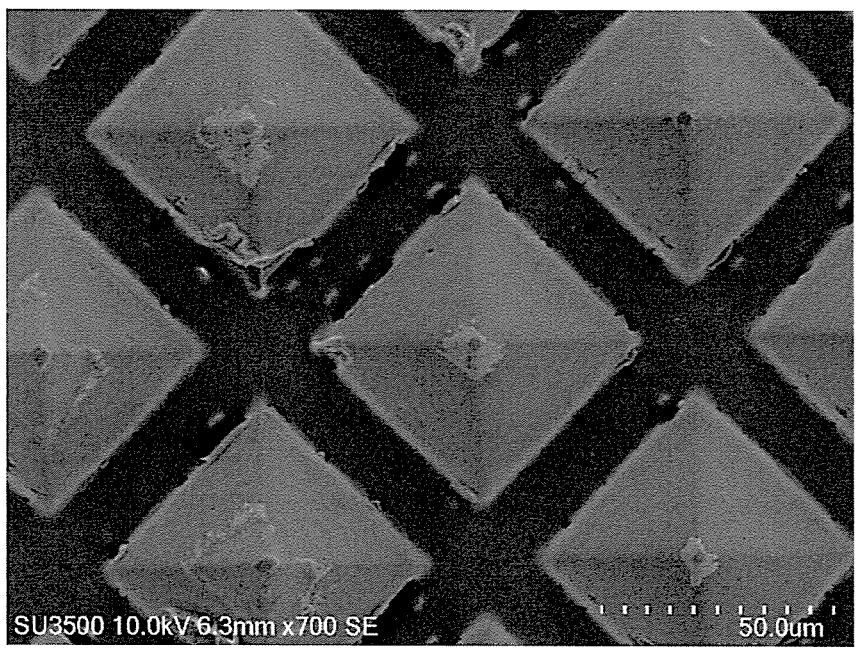

Example 4 describes an experiment to selectively deposit particles—platinum—on a surface structure by focussing of charge density (voltage or current) at the upper portion of said surface structures. FIGS. 9 and 10 show scanning electron microscope (SEM) micrographs with platinum particles selectively attached to the upper portion (at or about the apex) of pyramidal surface structures.

Preferably the charged particle comprises a metal ion or a conducting polymer (PPY, PA, PA).

Preferably the metal ion comprises an ionic form of platinum, gold, palladium, Iron, Iridium, Silver, Preferably the ionic form is an oxidised form of the metal ion.

Preferably the ionic form is selected from the group consisting of transition metals, for example $Ni^{2+}$, $Cu^{2+}$, $Pt^{2+}$, $Pd^{2+}$, $Fe^{2+}$, $Ir^{2+}$, Sc, Ti, Vn, Cr, Mn, Co, Zn, Au, Tg, Yt, Mb.

Preferably, the density of charged particle attached on the functional surface is greater than the density of charged particle attached on other exposed surfaces of the electrode layer.

The ability to selectively coat the upper portion of a surface structure can be used to minimise use of the charged particle to reduce cost during preparation of an array.

The functional surface of is an area found on the electrode layer at which charge density (voltage or current) is focussed. On contact with the functional surface, the active species undergo oxidation (loss of electrons) or reduction (gain of electrons) and undergoes electrochemical modification.

The surface area of the functional surface changes according to a number of factors including the shape of the surface structure and the strength of the current established. Where the surface structure comprises a sharp upper portion (for example with a triangular cross-section as shown in FIG. 1), the charge density (voltage or current) will be higher at a region close to the apex. For surfaces structures with a rounded upper portion (for example FIG. 2), the charge density (voltage or current) is more dispersed therefore the functional surface will extend further from the apex. While a surface structure having a sharp upper surface at the apex has advantages in terms of charge density focus, rounded apexes have the advantage of being easier, and therefore cheaper. to make. The choice of design is therefore dependent on the user's requirements.

It is preferred that the height of the surface structure that protrudes from an upper surface of the support substrate on the array (and that forms the 3 dimensional structure) is between about 1 nm to about 5 cm. More preferably 5 nm, 25 nm, 50 nm, 100 nm, 125 nm, 150 nm, 200 nm, 250 nm, 300 nm, 400 nm, 1 µm.

More preferably between about 5 nm to about 5 mm, about 1 micron to about 50 micron, about 100 nm to about 1 m, or about 25 nm to about 400 nm.

Preferably the functional surface of any embodiment of the invention is on an upper surface of the electrode layer.

Preferably the functional surface of any embodiment of the invention is on an upper surface of an electrode layer on a surface structure protruding from the support substrate or the passivating layer.

Preferably the functional surface of any embodiment of the invention is on an upper portion of the surface structure.

Preferably the functional surface of any embodiment of the invention is non-planar.

Preferably the surface structure of any embodiment of the invention comprises a functional surface defined by the extent of the passivating layer.

Preferably the functional surface of any embodiment of the invention is separated from other functional surfaces on other surface structures by the passivating layer or the support substrate.

Preferably a functional surface of any embodiment of the invention on one electrode layer is electrically connected to at least one further functional surface on the same electrode layer. Preferably the electrical connection to the at least one further functional surface is under the passivating layer.

It is preferred that the electrode array comprises a passivating layer between the surface structures wherein the passivating layer is selected from the group consisting of a cross-linked polymer, a photo-resist, a self-assembled mono-layer (SAM), an epoxy-based negative photoresist and SU-8.

Preferably the electrode array of any embodiment of the invention comprises a plurality of surface structures each with a functional surface on the electrode layer.

Preferably the plurality of functional surfaces are electrically connected via the electrode layer to form a functional grouping. In one embodiment, the array comprises two or more functional groupings where each functional grouping is electrically isolated from other groupings.

Preferably the functional surface of any embodiment of the invention comprises a protective coating.

Preferably the protective coating comprises a SAM (as defined previously) or a protein (such as ovalbumin or other blocking protein with no specific activity).

Preferably the extent of the functional surface of any embodiment of the invention is defined by the charge density (voltage or current) being greater than the charge density (voltage or current) measured on a flat surface of the electrode layer. Preferably the charge density (voltage or current) is at least 2, 3, 4, 5, 10, 20, 50, 100 or 1000 times greater on the functional surface as compared to the flat surface.

The support substrate forms a base of the electrode array and supports the surface structures and any other components of the array. Preferably the support substrate comprises a conducting or a non-conductive surface, polymer, silicon, metal, or glass. Where a polymer is used, it is typically amorphous but could be a semi-crystalline polymer. Preferably an extrudable polymer is used. Suitable forms of polymer will be known to those of skill in the art but include, for example polycarbonate and PMMA. It may be flexible or rigid and is preferably planar. As will be known to a skilled person in the art, the thickness of the substrate material is primarily governed by the thickness required to ensure proper handling. Therefore, preferably, the substrate material is between about 50 microns to about 5 mm thick, or between about 500 microns to about 2 mm thick, or between about 50 microns to about 100 microns thick.

In one embodiment, the support substrate is a conducting material. In another embodiment, the support substrate is a non-conducting material. Where the support substrate is a non-conducting material, it may also act as an insulating material. Examples of suitable flexible materials for use in the present invention include thermoplastic polyurethane, rubber, silicone rubber, and flexible epoxy.

Examples of suitable rigid support substrates for use in the present invention include glass, PMMA, PC, PS, ceramic, resin, composite materials, loaded polymers and rigid epoxy. The support substrate may also be formed from a metal such as gold, silver, nickel or the like, as discussed in more detail below.

The surface structures may be joined to one another where they meet the support substrate, or they may be situated apart from one another such that a substantially planar upper surface of the support substrate is present between the base of each surface structure.

In one embodiment, the surface structure(s) are integral with the support substrate. This means the surface structures are formed from the same material as the support substrate and protrude from it. In this embodiment, the upper surface of the support substrate may comprise an array of surface structures arranged in an ordered or random configuration. In this embodiment, the electrode layer may be formed on the upper surface of the surface structures (and support substrate where it is exposed). The support substrate with integrated surface structure(s) may be formed by known methods, for example hot embossing, CFT processing, injection moulding, stamping, electroforming or lithographic techniques.

In an alternative embodiment, the surface structures are formed from a different material than the support substrate and are deposited on or attached to the support substrate. In this embodiment, the surface structures may be integral to the electrode layer. This means that the surface structures are part of the electrode layer and are formed from the same material as the electrode layer.

Alternatively, an electrode layer may be deposited or otherwise formed on the surface structures, and said surface structures are deposited on, integral with or otherwise formed on the support substrate. The support substrate with surface structure(s) formed from different materials may be formed by known methods, for example hot embossing, CFT processing, lasering of a photoresist, stamping or lithographic techniques.

Preferably the support substrate of any embodiment of the invention comprises a single layer or multiple layers.

Preferably the support substrate of any embodiment of the invention is non-conductive (polymer, glass, Si and TiO2) or (conducting polymer, metals, metallic surfaces (Ni, Al, Ag,) doped Si, stainless steel).

The surface structures effectively provide a channel to enable the focussing of charge density at the upper portion of the structure. The surface structures may be any suitable shape that protrudes outward from the support substrate and enables diffusion to the functional surface to occur from a greater angle than if the surface was flat. The effect of this "spherical diffusion" to the functional surface is to enable the active species in the solution to diffuse to and away from the charged surface at a greater rate than would be possible at a flat surface or a "well" or "channel".

Preferably the surface structure of any embodiment of the invention protrudes through the passivating layer.

Preferably the surface structure of any embodiment of the invention comprises an apex at the top of the surface structure.

Preferably the apex is on a surface structure that has an upper section with a contoured surface and at least one lower section with a differently contoured surface. In some embodiments, the surface structure or the upper section thereof is dome-shaped, cone-shaped, pyramid-shaped, papilliform, a ridge or polyhedron-shaped.

Preferably the surface structure of any embodiment of the invention comprises an upper section with a convex upper surface.

Preferably the surface of the upper section is tapered to an apex or rounded to an apex.

Preferably the surface structure of any embodiment of the invention has a triangular, convex, semi-circular or papilliform cross-section along a plane orthogonal to a top surface of the support substrate.

Preferably the surface structure of any embodiment of the invention has a substantially triangular, substantially circular or substantially square cross-section along a plane parallel to a top surface of the support substrate.

Preferably a cross-sectional area of the surface structure of any embodiment of the invention diminishes along an axis that is orthogonal to a top surface of the support substrate.

Preferably the surface structures of any embodiment of the invention are uniformly arranged on the support substrate. Preferably the surface structures are randomly arranged on the support substrate.

Preferably, the surface structures of any embodiment of the invention have at least one line of symmetry.

Preferably, the surface structures of any embodiment of the invention are uniformly separated from each other by about 5 nm to about 2000 µm. More preferably, about 15 nm to about 1500 µm; about nm to about 1000 µm; about 55 nm to about 750 µm; about 100 nm to about 1000 µm; about 250 nm to about 1500 µm about 5 nm to about 1500 µm; about 5 nm to about 1000 µm; about 5 nm to about 750 µm; about 15 nm to about 2000 µm; about 35 nm to about 2000 µm; about 55 nm to about 2000 µm.

Preferably, the width of the surface structure of any embodiment of the invention where it joins the support substrate is between about 20 nm to about 5000 µm. More preferably, about 40 nm to about 4000 µm; about 55 nm to about 3000 µm; about 75 nm to about 2500 µm; about 100 nm to about 4000 µm; about 250 nm to about 3500 µm about 20 nm to about 3500 µm; about 2 nm to about 4000 µm; about nm to about 2500 µm; about 20 nm to about 4000 µm; about 20 nm to about 3000 µm; about 20 nm to about 2000 µm.

Preferably, the apex of each surface structure of any embodiment of the invention is located at the top of the upper portion of each surface structure.

Preferably, the upper portion of each surface structure of any embodiment of the invention comprises a tip or a point, or is convex, papilliform, tapered, conical, hemispherical or polyhedral.

Preferably, the surface structure of any embodiment of the invention comprises a ridge with an apex extending along an axis generally parallel to a top surface of the support substrate.

Preferably the width of the apex of each surface structure is as defined previously herein and preferably between about 1 nm to about 5000 micron, more preferably between about 10 nm to about 10 micron, or about 20 nm to about 2 micron, or about 30 nm to about 1 micron. The width of the apex of each surface structure being less than where it joins the support substrate, for example for an apex of width of about 1 nm, the width where it joins the support substrate could be great than about 20 nm.

Preferably, the ridge has a convex, papilliform, tapered, triangular or polygonal cross-section along a plane orthogonal to a top surface of the support substrate.

Preferably the surface structures are separated from each other by about 5 nm to about 1000 µm apex to apex. As will be apparent from FIGS. 13 and 17 (which shows a separation of about 250 nm apex to apex), and Example 1 (apex to apex spacing of 70 µm) the distance apex to apex between the surface structures is preferably substantially uniform although this could vary if desired. Uniformity is preferred as this results in more predictable behaviours and results. As will be very apparent to a skilled addressee, a variety a ranges and options fall within this range of options and could be selected by the user. About 50 nm to about 1000 µm; about 100 nm to about 1000 µm; about 250 nm to about 1000 µm; about 5 nm to about 750 µm; about 5 nm to about 500 µm; about 5 nm to about 100 µm.

As will be apparent, the surface structures protruding from an upper surface of the support substrate create a 3 dimensional (3D) structure on the array.

In an alternative embodiment, the invention may therefore be seen to be a method of focussing charge density (voltage or current) at a functional surface on an electrode array, the method comprising the steps of:
 a) providing an electrode array comprising
  i) a support substrate;
  ii) at least one surface structure protruding from an upper surface of the support substrate wherein the surface structure includes an electrode layer;
  iii) a functional surface on the electrode layer, wherein the functional surface is on an upper portion of the at least one surface structure and wherein the functional surface is adapted to contact an active species in a solution;
  iv) wherein the surface structures are separated from each other by about 5 nm to about 1000 µm apex to apex and wherein this separation is preferably but optionally substantially uniform;
 b) exposing the surface structure to a solution comprising an active species and having a counter electrode therein; and
 c) establishing a current or voltage between the electrode layer and the counter electrode such that the charge density is focussed at the functional surface and the active species is electrochemically modified following contact with the functional surface.

Preferably, the surface structures are separated from each other by about 50 nm to about 1000 µm; about 100 nm to about 1000 µm; about 250 nm to about 1000 µm; about 5 nm to about 750 µm; about 5 nm to about 500 µm; about 5 nm to about 100 µm, apex to apex.

The electrode layer comprises any suitable conducting material. Preferably the electrode layer comprises a conductive material selected from the group consisting of a conductive metal, carbon, glassy carbon, carbonaceous materials, graphene, carbon nanotubes, conducting ink, loaded polymers, a conducting polymer, gold, silver, nickel, platinum, fluoride doped tinoxide (FTO), indium tinoxide (ITO), doped silicon, titanium dioxide or a layered structure. Preferably the conducting metal comprises gold, silver, nickel or platinum. Preferably the layered structure comprises titanium with gold, chromium with gold, or gold with a conducting polymer.

Preferably the electrode layer is deposited on the surface structures by a technique selected from the group consisting of a sputtering technique, preferably magnetron sputtering, evaporation, painting, spray-coating or spin coating.

Preferably the electrode layer comprises a layer of substantially constant thickness that covers the surface structure(s) and optionally the support substrate.

The electrode layer may be functionalised by the attachment of a binding layer as described herein and/or binding agents. Preferably the binding agent is selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, atetylenic quinone, azides, tetrazine, large or small amine-containing molecules, sulfhydryl-containing molecules or proteins expressing glutathione S-transferase (GST), metals and metal salts (such as lead, lead phosphate, chromium, platinum, palladium, iridium, copper).

The electrode layer is deposited on the surface structure(s) and optionally the support substrate between the structures. In this embodiment, any flat support substrate surface that is exposed will also be covered by the electrode layer, subject to the bounds of the electrode layer. Preferably the electrode layer comprises a layer of substantially constant thickness. Where the electrode layer is deposited on an upper surface of the surface structures, the upper surface topology of the electrode layer will preferably correspond to the topology of the underlying surface structure(s) and optionally support substrate.

This correspondence in surface topologies can be seen in FIG. 4 in which the electrode layer 420 is deposited on the support substrate 410.

Although the thickness of the electrode layer may be any suitable thickness, it is preferably between about 5 nm and 5 µm thick, more preferably between 5 nm and 10 µm, 15 nm and 50 nm, 20 and 500 nm or between 50 and 100 nm thick. The inventors have found that using a layer that is less than about 5 nm is less desirable due to problems with conductivity of electrical charge. In addition, layers greater than 500 nm thick provide an economic disadvantage due to the cost of the material used to make the electrode layer which is typically gold.

Preferably the electrode layer comprises one or more terminal connection means adapted to electrically connect the electrode layer to a measurement electrode. Preferably the terminal connection means is adapted to engage a connector such as a slot connector. Preferably the terminal connection means comprises a region of the support substrate with surface structures protruding above the surface of the support substrate.

In a particular embodiment, the electrode layer is less than 5 µm thick.

The inventors have found that having multiple functional surfaces all electrically connected to form a functional grouping enables a greater signal response to be detected. In addition, the inventors have found that minimising the surface area of the functional surfaces increases the sensitivity of each surface. This means that the signal to noise ratio of a surface increases as the surface area decreases.

Electrical noise is present in any circuit, and becomes more evident at very small currents. As such, it is important to minimise the noise and to maximise the signal to noise ratio.

As such, in one embodiment, the electrode array of the present invention comprises a functional surface on one electrode layer electrically connected to at least one further functional surface on the same electrode layer. Preferably the electrical connection to the at least one further functional surface is under the passivating layer.

Preferably the array comprises a plurality of surface structures each with a functional surface on the electrode layer.

Preferably a plurality of functional surfaces are electrically connected via the electrode layer to form a functional grouping. In one embodiment, the array comprises two or more functional groupings where each functional grouping is electrically isolated from other groupings.

Preferably the electrode array comprises a passivating layer on the support substrate and a lower portion of the surface structure. Preferably the passivating layer is absent from the upper portion of the surface structure. The passivating layer is present to minimise or prevent non-specific binding of components of the solution. It also acts to minimise the electrical noise generated where the solution contacts the electrode surface.

Preferably the electrode array provided in step a) of the invention comprises a passivating layer deposited on the support substrate and covering the upper portion of the surface structure.

Preferably the step of applying a current to focus charge density (voltage or current) results in removal of the passivating layer on the functional surface on the upper portion of the surface structures.

Preferably the passivating layer comprises a functional group to attach to the electrode surface. In one embodiment, the passivating layer comprises a binding layer as described and defined herein. In one embodiment, the passivating layer comprises a SAM. Preferably the SAM is attached to the electrode surface by a sulphur atom. Preferably the electrode surface is gold. Preferably the SAM further comprises a functional group, for example an alkyl chain, and preferably further comprises a carboxylic acid coupled to an amine on the functional group.

In another embodiment, the passivating layer comprises a cross-linked polymer or a photo-resist. Preferably the cross-linked polymer is an epoxy-based negative photoresist such as SU-8, AZ40XT, AZ4620, OSTE Polymers, SPR 3612, LOL2000.

Preferably the passivating layer is removed by establishing a current between the counter electrode and the electrode surface. Preferably the potential of the current is between, −2V and +2V, and preferably −200 mV and −1V, and preferably −400 mV, preferably 0 and −1 mV relative to a silver/silver chloride reference electrode.

Methods of application of the SAM will be known to those of skill in the art. In one embodiment, the SAM is applied by dissolving the SAM in ethanol then applying the SAM/ethanol mixture to the sensor surface for a period, for example 10 minutes to 1 hour. The excess is then washed off. The SAM can then be removed from the sensing surface by the application of a reductive potential of −400 mV relative to Ag/AgCl. If the protective coating is a protein such as avidin or BSA or even the antibody capture agent, it may not be removed prior to measurement, but it does not impede the electrical measurement.

In one embodiment, a protective coating is applied to the sensing surface prior to application of the binding agent. Preferably the protective coating is a SAM made from an alkanethiol ($HS(CH_2)_xCH_3$ where X=0 to 16, and deposited from an ethanol solution. Preferably the removal of the protective coating is carried out prior to the final measurement of the electroactive species (e.g. TMB).

In another embodiment, the protective coating is applied as a binding layer to minimise or prevent non-specific binding of binding agents and sample components to the electrode layer. In this embodiment, the functionality of the tips to concentrate charge density is utilised to enable deprotection of the sensing surfaces prior to conducting the sensing assay.

Preferably the protective coating is removed by applying a reductive potential of between −200 mV and −1V, and preferably −400 mV relative to a silver/silver chloride reference electrode. The application of the −400 mV also generates $H_2O_2$ which is preferable to regenerate the ligand catalyst (e.g. HRP).

The reaction used to immobilise the active species onto a SAM functionalised electrode may be via either chemical or electrochemical attachment. Chemical immobilisation is typically achieved by chemical activation of either the reactive functional groups of the SAM (e.g., COOH activation with EDC/NHS) or the active species (e.g. or Cu(I) catalysed Azide Alkyne cycloaddition). Chemical activation does not allow the position of deposition to be defined, and results in even coverage of the SAM surface. Thus, there is no selectivity in the attachment location of the active species.

A SAM may be functionalised with known functional groups. Preferably the SAM is functionalised with a functional group selected from the group consisting of azides, amines, carboxylates, aldehydes, ketones, esters or carboxylic acids.

It will be appreciated by those of skill in the art that functional groups attached to the binding layer may alternatively be attached to the solute reactant to achieve the same ultimate effect of a functionalised SAM. In one particular embodiment, an azide functional group may be present on a SAM binding layer or attached to the solute reactant.

Preferably the solution of any embodiment of the invention comprises an electrolyte. Preferably the medium is water but can also be an organic solvent such as alcohol, ether, acetone and DMSO.

Preferably the electrolyte comprises a standard buffer(s) used in biology, including non-buffered salt solutions such as NaCl, or acid and base solutions H2SO4, HNO3, NaOH.

Preferably the solution of any embodiment of the invention is selected from the group consisting of fresh water, sea water, blood, urine, milk or saliva.

In one embodiment, the solution of any embodiment of the invention further comprises a reference electrode.

Preferably the solution comprises a buffer solution with alkali metal chloride ions and copper$^{2+}$ ions.

Preferably the electrode array comprises part of an array system. The array system contains suitable wiring, electrodes and solutions to enable a sample to contact the functional surface and electrochemical modification of the active species to occur. The array system preferably comprises a container to retain the sample on the functional surface. The array system also preferably further comprises a reference electrode and a counter electrode configured so as to contact the sample during electrochemical modification. Preferably the reference and/or counter electrode are stationary and at a fixed distance from the functional surface. Suitable systems and configurations would be known to those of skill in the art.

Preferably the counter electrode of any embodiment of the invention comprises a substantially inert conductive material. In this instance the term inert means that the counter electrode is substantially unchanged in mass and state following the establishment and passing of the current from the electrode layer to the counter electrode. Therefore an "inert" counter electrode is substantially unreactive with respect to the components of the solution. Preferably the counter electrode is formed from a material selected from the group consisting of a metal, Pt, Gold, nickel, copper, iron, carbon, graphite, graphene, carbon fibre, carbon nano-tubes, Bucky Balls, conducting polymer PPy, PA, Polycetylene, stainless steel. The counter electrode may be made of a solid layer or the conducting layer deposited onto a suitable support e.g. polymer glass, metal. The counter electrode may be made of a solid layer or the conducting layer deposited onto a suitable support e.g. polymer glass, metal. Preferably the counter electrode is a bare metal (such as Au, Pt, Stainless steel, and/or copper), or an Au or Pt plated substrate (such as metal, polymer and/or glass). Preferably the counter electrode of any embodiment of the invention is in a fixed orientation with respect to the surface structure.

Preferably the counter electrode of any embodiment of the invention is attached to the electrode array.

Preferably the counter electrode is held in an orientation to minimise differential in distance between each of the surface structures of the array. Preferably the orientation of the counter electrode is above an upper surface of the array. In these embodiments, the distance from the counter electrode to the apex of each surface structure is substantially equidistant. This minimises detection noise caused by the placement of the counter electrode.

It is therefore preferred that the counter electrode is (a) in a fixed orientation with respect to the surface structure, (b) attached to the electrode array, (c) held in an orientation to minimise differential in distance between each of the surface structures of the array, or (d) above an upper surface of the array.

In one embodiment, the solution further comprises a reference electrode. The reference electrode assists with and measurement and control of the voltage while current is flowing, for example during the deposition process. Properties and positioning of the reference electrode will be known to those of skill in the art.

Preferably the electrode array further comprises a reference electrode in contact with the solution. Preferably the reference electrode comprises an electrode formed from Ag/AgCl. Other options will include: Standard hydrogen electrode (SHE); Normal hydrogen electrode (NHE); Reversible hydrogen electrode (RHE); Dynamic hydrogen electrode (DHE); Standard calomel electrode (SCE); Copper-copper(II) sulfate electrode (CSE); Mercury-mercurous sulfate electrode; Pt, Stainless steel, Au Preferably, the current established between the electrode layer and the counter electrode as measured at the electrode layer is an oxidising or reducing current. This facilitates electrochemical modification of the active species following contact with the functional surface of each surface structure.

Preferably the current comprises a reductive or oxidative potential between the counter electrode and the electrode surface. Preferably the potential is between about −2V and +2V, between about −200 mV and −1V, or about −400 mV relative to a silver/silver chloride reference electrode.

Preferably, the current of any embodiment of the invention is pulsed between an activating potential and an inactivating potential. This pulsing enables the reaction taking place at the functional surface to be localised. Pulsing also minimises the diffusion of active species away from the apex of each surface structure. The frequency of pulsing, and its duty cycle defines the extent of localisation on the function surface. The regular on/off cycling results in deactivation of the active species therefore the spread of the activated active species from the functional surface to other positions on the array is minimised. Before a current is applied, the sensory agents remain inactive and the active species present within a solution cannot bind to the sensory agents. Upon application of an activating potential, the charge density (voltage or current) at the functional surface is increased thus activating any active species which diffuse to the functional surface.

Accordingly, the current of any embodiment of the invention is pulsed between an activating potential and an inactivating potential. Preferably when attachment is via click chemistry the activating potential comprises a reductive potential of between about −100 mV to −2V, more preferably about −400 mV to −600 mV, preferably 0 to −1 mV. Preferably the inactivating potential comprises an oxidative potential of between about 100 mV and 2V, more preferably about 200 mV to 500 mV. In an alternative embodiment, the inactivating potential is open circuit "off". When the attachment proceeds via click chemistry, it is preferred that the functional surface on the array is formed of a catalytic material (e.g. Pt, Au, Ni) which is activated via electrochemical modification via the current or voltage between the electrode layer and the counter electrode. The activated functional surface will, for example, electrochemically modify $Cu^{2+}$ to $Cu^+$ as referred to below re CUAAC.

As would be known to the skilled addressee, in chemical synthesis, "click" chemistry is a class of biocompatible small molecule reactions commonly used in bioconjugation, allowing the joining substrates of choice with specific biomolecules. Click chemistry is not a single specific reaction, but describes a way of generating products that follow examples in nature, which also generates substances by joining small modular units. In general, click reactions usually join a biomolecule and a reporter molecule. Click chemistry is not limited to biological conditions: the concept of a "click" reaction has been used in pharmacological and various biomimetic applications. However, they have been made notably useful in the detection, localization and qualification of biomolecules. One example of this is Cu catalysed azide alkyne cycloaddition reaction (CUAAC).

It will be understood by those of skill in the art that removal of a binding layer such as a SAM is very difficult using manual means or other means described in the prior art. As such, the voltage applied is kept to a level where electrolysis of water is avoided or minimised. Additionally, the removal of the electrode layer is undesirable so the voltage is minimised to avoid this occurrence. Accordingly, in particular embodiments which substantially achieve these two objectives, the voltage is less than +/−1.5V. Preferably the voltage is less than +/−1V.

Preferably, the electrochemical modification of the active species of any embodiment of the invention results in the elicitation of a detectable response. Preferably the detectable response comprises a change in current, voltage, capacitance, resistance, conductance, impedance, magnetic flux or electric field.

Preferably the detectable response is measured at a measurement electrode. Preferably the measurement electrode is connected to a measuring means which measures a change in one or more of current, impedance, voltage, capacitance, resistance, conductance, magnetic flux or electric field.

Preferably the detectable response comprises an electrochemical detectable response comprising a change in current, impedance, voltage, capacitance, impedance, resistance or conductance. Measurement of such response using electrodes will be known to those of skill in the art.

In a further aspect, the invention provides an electrode array comprising:
  a) a support substrate;
  b) at least one surface structure protruding from an upper surface of the support substrate, wherein the surface structure includes an electrode layer;
  c) a functional surface on the electrode layer, wherein the functional surface is on an upper portion of the at least one surface structure and wherein the functional surface is adapted to contact an active species in a solution;
  d) a binding layer wherein the binding layer is either:
    i) present on the functional surface at a significantly increased density than at a non-functional surface on the electrode array; or
    ii) present on a non-functional surface of the electrode array at a significantly increased density than at a position on the functional surface on the surface structure,
  wherein the functional surface is at or about an apex of the surface structure.

In a further aspect, the invention provides an electrode array comprising:
  a) a support substrate;
  b) at least one surface structure protruding from an upper surface of the support substrate, wherein the surface structure includes an electrode layer;
  c) a functional surface on the electrode layer, wherein the functional surface is on an upper portion of the at least one surface structure and wherein the functional surface is adapted to contact an active species in a solution;
  d) a binding layer wherein the binding layer is either:
    i) present on the functional surface at a significantly increased density than at a non-functional surface on the electrode array; or
    ii) present on a non-functional surface of the electrode array at a significantly increased density than at a position on the functional surface on the surface structure;
    wherein the functional surface is at or about an apex of the surface structure and
    wherein the surface structures are separated from each other by about 5 nm to about 1000 μm apex to apex and wherein this separation is preferably but optionally substantially uniform.

Preferably, the surface structures are separated from each other by about 50 nm to about 1000 μm; about 100 nm to about 1000 μm; about 250 nm to about 1000 μm; about 5 nm to about 750 µm; about 5 nm to about 500 µm; about 5 nm to about 100 µm, apex to apex.

In this embodiment, the inventors have produced an electrode array with surface structures and a pre-prepared functional surface characterised in that the upper portion of the surface structure is differentially functionalised when compared to the rest of the electrode array surface. The array can be prepared according to the methods described herein, and in particular in example 2, 3, 4 or 5. The resultant array has a functional surface which is functionalised in a different manner to the rest of the array thus allowing for measurement, catalysis or binding at or about the apex of the surface structures.

The size of the functional surface on an array of this type will be variable depending on a number of factors including the current/voltage applied, the concentration of active species in solution and the shape of the surface structures. However, a clear differentiator between this invention and other arrays is the characteristic that when a current is established between the electrode layer and the counter electrode in a solution contacting the electrode layer, the charge density (voltage or current) will be at least two times greater on the functional surface than the charge density (voltage or current) measured under equivalent conditions on a flat surface of the electrode layer.

The characteristics of the support substrate, surface structures, binding layer and functional surface of the electrode array are all as described earlier in this specification.

In particular embodiments, the binding layer comprises a self-assembled monolayer (SAM), or a charged particle as defined above.

The non-functional surface described above comprises a flat surface of the electrode layer that when the array is in use is exposed in the same way as the functional surface to the solution. It would be expected that the charge density (voltage or current) on the non-functional surfaces is least two times less than the charge density (voltage or current) on the functional surface.

The entire disclosures of all applications, patents and publications cited above and below, if any, are herein incorporated by reference.

Reference to any prior art in the specification is not, and should not be taken as, an acknowledgement or any form of suggestion that the prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

The word "comprises" is used in a non-limited sense, that is synonymously with "including" or "includes", unless the context clearly requires otherwise.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications will be included within the scope of the invention.

EXAMPLES

Example 1: Modelling

Aim:
To use COMSOL computational analysis to illustrate the charge density (voltage or current) distribution on an electrode layer with surface structures.

Result:
As shown in FIGS. 1 and 2 COMSOL modelling predicts higher charge density (voltage or current) profile at or about the apex of the structure as shown by the darker colour at the apex.

Conclusion:
Modelling indicates that charge density (voltage or current) is localised at or about the apex of the surface structure, and the sharper the tip the greater the extent of localisation.

Experimental

Materials
PBS pallets, $K_3FeCN_6$, $K_4FeCN_6$, NHS, EDC, $Cu(NO_3)_2$, $K_2PtCl_4$, 5-Hexynoic acid and thiols where purchased from Sigma Aldrich and were used as received. Cu(II)(NO3)2-1, 1',1"-Tris(1H-1,2,3-triazol-4-yl-1-acetic acid ethyl ester) trimethylamine (CU(II)TTMA) was prepared using known methods. The ethynyl functionalised fluorophores were purchased from Lumiprobe and was used as received.

The electrodes used in these experiments were gold coated polycarbonate. The electrode array was made from polycarbonate into which a series of pyramids were embossed. The pyramidal structures had tip to tip (apex to apex) spacing of 70 µm and a base of 50 µm×50 µm.

Olympus BX51flourecence microscope was used to obtain fluorescence images. Hitachi SEM was used to take SEM images General Methodology
Self-Assembled Monolayer (SAM) Formation onto Gold:
The electrodes were cleaned using reactive ion etching (RIE) with an $O_2$ plasma (2 min) and were immediately immersed into the desired thiol solution (0.1M in ethanol) for 60 minutes. The surface was then rinsed with ethanol and then deionized water.

Fabrication of Polymer Electrodes with Surface Structures
Inverse pyramid structures were prepared using NaOH etching of Silicon, and transferring the pattern onto a nickel stamper via electroplating. Inverse domes were fabricated by melting lithographically patterned photoresist on a silicon wafer, followed by electroplating of the nickel stamper.

The dome and pyramid patterned polymer surfaces were prepared by hot-embossing of the nickel stampers onto 2 mm Polyethylene Terephthalate Glycol (PETG) film using standard procedures. Gold (30 nm) was deposited onto both flat and embossed polymer substrates using a NANO 36 Magnetron sputter (300 W for 2 mins at 3 mTorr of Ar).

Gold Cleaning and Characterisation by CV
Cleaning of the gold electrodes was performed by cycling the electrodes in a 0.5 M HNO3 solution 0 to 1.650 V until a stable gold reductive wave was observed at 0.850 V.

Electrochemical Studies
Electrochemical studies were carried out by using a Pine E-chem bipotentiostat station via a three electrode setup with platinum as the counter electrode. All electrochemical potentials presented in this work are measured and reported using a leakless Ag/AgCl miniature reference electrode (eDAQ). The electrochemical cell was confined by a cylindrically bore Teflon cone (4 mm inner diameter) pressed against the sample. All measurements were performed at room temperature without exclusion of air.

Self-Assembled Monolayer (SAM) Formation

Deposition solutions were made by dissolving the desired amount of alkane thiol in ethanol. The total thiol concentration was kept between 0.1 and 1 mM. Freshly prepared gold substrates were immersed in the deposition solution for 24 H. Deposition took place in the absence of light as to eliminate any photon-oxidation on the thiol monolayers. The substrates were then rinsed with ethanol and deionised water to remove excess adsorbate, and then dried with N2 to remove residual solvent.

Example 2: Activation of a Redox Species

Aim

The active species Cu(I) was used as the redox mediator to catalyse the azide-alkyne cycloaddition reaction, whereas Cu(II) is inactive. The aim was to use the higher charge density (voltage or current) distribution at or about the apex of a surface structure on an electrode array surface to selectively reduce $Cu^{2+}$ to $Cu^{1+}$ at or about the apex, and thereby catalyse the attachment of an ethynyl-fluorophore to an azide functionalised SAM. Fluorescence microscopy was used to verify attachment of the fluorophore exclusively at the tips.

Method

A solution containing Cu(II)TTMA (100 µM) and 10 µM ethynyl-fluorophore in acetate buffer (pH 4.4) (10 ml) was exposed to the azide terminated SAM coated electrode with surface structures. A square wave potential was applied as follow; +0.65 V for 5 s to maintain an inactive $Cu^{2+}$, followed by −0.150 V for 30 s to produce activated $Cu^{2+}$ Catalyst (which initiates the cycloaddition reaction to occur), followed by +0.65 V for 25 s to inactivate the catalyst and stop the reaction. This process was repeated 4 times to give a total reaction time of 2 mins. The surface was cleaned with ethanol and water and dried using nitrogen and the fluorescent images were taken immediately.

Results:

After stepped chronoamperometry, fluorescence is only observed only at the apex of the surface as shown in FIGS. 7A and 7B. In FIG. 7A no potential was applied. In FIG. 7B, the potential was applied.

Conclusion:

The higher charge density (voltage or current) distribution at or about the apex of the surface structure results in the activation by reduction of the Cu catalyst selectively at the apex where the azide-alkyne cycloaddition reaction occurs.

Example 3—SAM Removal at the Tip

Aim:

To demonstrate that charge density (voltage or current) distribution of an electrode array with surface structures can be used to selectively remove the self-assembled monolayer from the apex of surface structures.

Method:

Azide terminated SAM coated electrodes were immersed in PBS solution. Desorption was carried out by chronoamperometry by applying a reductive potential (−1.1 v for cumulative duration of 0 s, 2.5 s, 5 s, 10 s, 20 s, 40 s, 80 s, 160 s, 320 s, 640 s, and 900 s), and the desorption rate was monitored using cyclic voltammetry in Fe(CN)6 at 20 mV/s.

Figure 8:
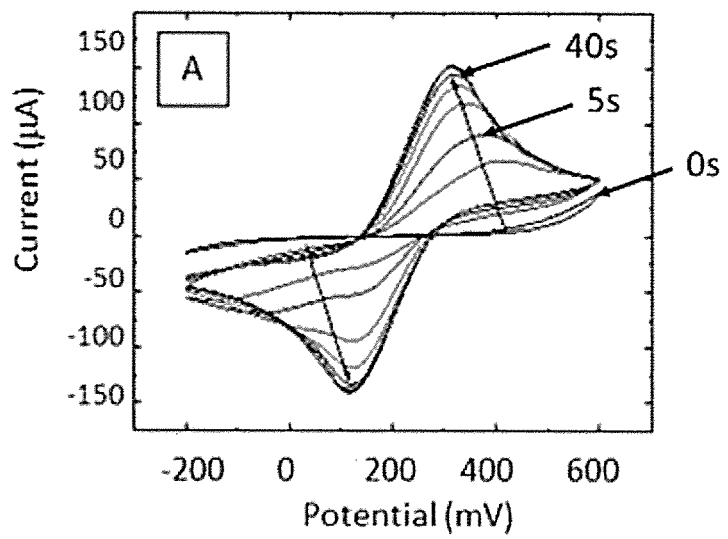
FIG. 8 shows the desorption profile of a SAM attached to an electrode layer for (A) pyramidal surface structures and (B) a flat surface.
Figure 8:
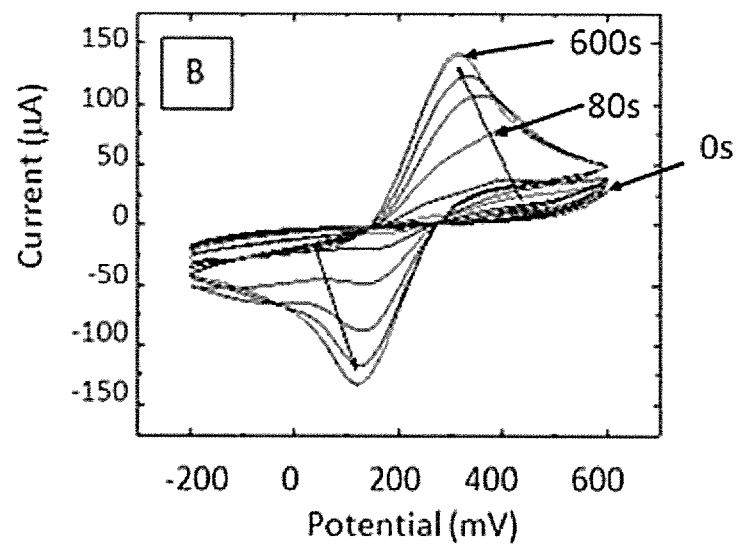

Results:

The gold coated surface structures on the electrode arrays demonstrated a faster desorption profile (FIG. 8A) with a maximum oxidation peak occurring after approximately 10 seconds relative to the flat electrode (FIG. 8B) with a maximum oxidative peak being seen after approximately 20-30 minutes To confirm that desorption occurred from the tip of the 3D electrodes ethynyl-fluorophore was attached to the SAM layer using chemical click. Fluorescence microscopy confirmed the SAM was predominantly at the base.

Conclusion:

Differential charge density (voltage or current) distribution of a three dimensional surface resulted in a significantly faster desorption of SAM from the tips of the surface structures compared to a flat surface. This occurred due to the concentration of charge density (voltage or current) at or about the apex of the surface structures.

Example 4: Pt Functionalization at the Tip

Aim:

To demonstrate differential charge density (voltage or current) distribution of an electrode array with surface structures can be used to selectively deposit metals at the apex of the structures.

Method:

Surface structures with a gold electrode layer were cleaned using reactive ion etching (RIE) with O2 plasma (2 min) and immersed into a Platinum (IV) chloride (1 mM) solution in PBS. The growth of Pt meso-particles was carried out using a square wave potential as follow; a reductive potential (−500 mV) was applied to reduce Pt(II) to Pt (0) on the surface for 15 s, followed an oxidative potential (300 mV) to stop the process. This cycle was continued until the desired amount of deposited Pt was obtained.

Results:

The Pt deposition occurred predominantly at or about the apex of the surface structures as shown in FIGS. 9 and 10.

Conclusion:

Due to the higher charge density (voltage or current) distribution at or about the apex of the surface structure, Pt is deposited at a higher density there than on other surfaces.

Example 5

Aim:

To illustrate how charge density (voltage or current) in combination with an electrode array with surface structures can be used to selectively functionalise the tips or the base of the electrode.

Method

1. The entire electrode surface of (A) an electrode array with surface structures, and (B) an electrode array without surface structures, will be coated with SAM-X, where X is the final desired functionality for the base of the electrode. Current is applied and results in the removal of the SAM-X layer from the electrode surface. The removal process follows that is represented in the cyclic voltammogram shown in FIG. 8, in which successive cycles will increasingly remove more SAM-X from the electrode surface. Each cycle is represented by a trace labelled with the time of application of current. For the electrode array with surface structures (8A), the SAM-X is removed starting from the region of highest charge density (voltage or current)

at the very top and slowly increasing down. It can be seen that after about 40 seconds, the electrode array with surface structures shows minimal further change in signal intensity indicating that the SAM-X has been totally removed from the functional surface at or about the apex of the surface structures. FIG. 8B shows that 600 seconds is required to achieve the same effect of removing the SAM-X from the flat surface.

2. Once the desired level of removal has been achieved, the now bare gold portion of the electrode at the top of the tip (A) can be coated with SAM-Y, where Y is the new desired functionality. The advantage of the process is that it allows precise control of where SAM-Y is located on the electrode surface, and hence control of the location of a binding layer/active species.

Example 6—Nano-Scale Catalysis with Transition Metals

As the size of a particle reaches below submicron, quantum effects become increasing prevalent. This results from a combination of both a dramatic increase in diffusion rates within the solution surrounding the particle, and interaction rates with the surface of the particle. These effects are applicable to both sensing (resulting in faster response rates and reduced signal to noise) and catalysis (resulting in dramatically increased turnover rates). In addition to these known diffusion effects, the inventors have demonstrated that quantum effects also influence the catalytic mechanism as observed by a decrease in the energy cost.

Figure 11:
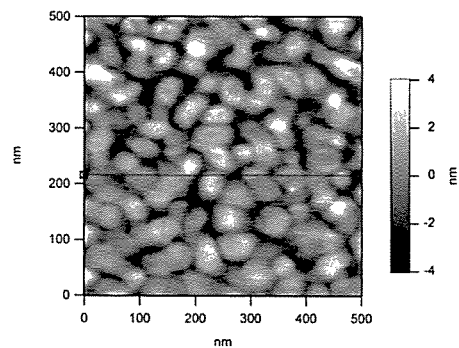
FIG. 11 shows an AFM analysis of a typical 'flat' surface showing particle sizes of <100 nm in a closely packed formation.
Figure 12:
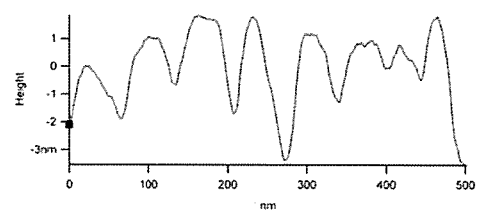
FIG. 12 shows a graph associated with FIG. 11 showing the topography, and the relative height of the particles.

A sputter coated 'flat' electrode is not actually flat but made up of closely packed, even overlapping, nano-sized particles typically in the size range of 5-100 nm. The actual size and range being dependant on the deposition technique employed as previously discussed (e.g. e-beam evaporation, thermal evaporation, and magnetron sputtering) and the conditions used as would be known to the skilled person (e.g. voltage, temperature, vacuum, power, frequency). FIG. 11 shows an AFM image and FIG. 12 an associated line scan for a 'Flat' gold electrode in which the individual nanoparticles are evident.

While it may be thought that if a flat surface is made up of nanometre sized particles that this implies that quantum effects will play a dominant role in the observed catalytic activity of the surface, the inventors have found that this is not the case, and have observed that flat overlapping nanoparticles experience planar diffusion which eclipses any quantum effects on catalytic activity. This effect of planar diffusion has been previously shown with reference to FIG. 3 and in particular FIG. 3A. However, the inventors have also found that the influence of planer diffusion from flat closely packed/overlapping nanoparticles can be overcome by controlling the 3D spacing between adjacent nanoparticles. This can be achieved by using a nanoscale 3D surface to control the distance (about 5 nm to about 1000 µm apex to apex as previously discussed herein) between and the location of the particles.

Figure 13:
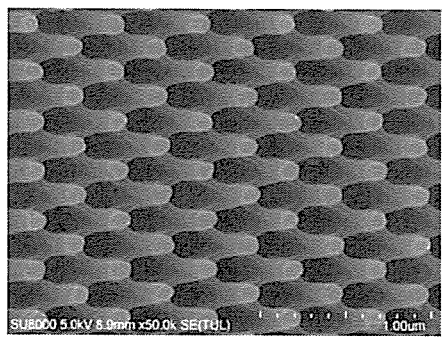
FIG. 13 shows an SEM image of an array of approximately 100 nm tips in polymer.
Figure 13:
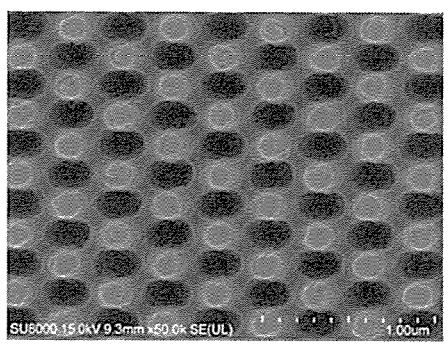

To do this, the particles are fabricated as either discrete particles of a first material selectively deposited onto the tops of a tip of a surface structure (such as shown in FIG. 13) using a method as described previously herein.

The structures were prepared in several metals, metal coated polymers, and with co-catalysts, as shown in Table 1 below. The structures used in Table 1 were constructed as follows:

(i) A nickel nano-structure master was prepared by electroplating onto a silicon wafer using standard plating conditions.

(ii) A nickel nano-structure master was prepared by electroplating onto a silicon wafer using standard plating conditions. This nickel master was sputter coated with 50 nm gold. SEM with X-ray analysis showed that the gold resided mainly on the tips and the base of the valleys and the side walls was free of gold. This was confirmed by cyclic voltammetry which indicated the presence of both gold and nickel.

(iii) A nickel nano-structure master was prepared by electroplating onto a silicon wafer using standard plating conditions. This nickel master was embossed into a polycarbonate substrate, which was sputter coated with 50 nm gold. Pt nano-particle were deposited according to Example 4.

TABLE 1

| | | Oxygen reduction | | Hydrogen production | |
|---|---|---|---|---|---|
| | | Flat | Nano | Flat | Nano |
| Nickel | onset | — | — | −730 mV | −613 mV |
| | current | — | — | 0.065 mA (@−840 mV) | 0.5 mA (@−840 mV) |
| Nickel with sputtered gold on the tips | onset | −100 mV | −40 mV | — | — |
| | current | 3 µA @ −175 mV | 40 µA @ −175 mV | — | — |
| Gold coated polymer with electro deposited Pt on the tips | onset | 560 mV | 710 mV | | |
| | current | 1.2 µA @520 mV | 111 µA @520 mV | | |

Figure 14:
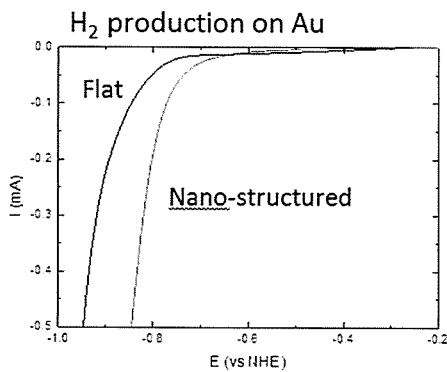
FIGS. 14-16 show the comparison in the activity for typical flat vs nano-structured electrodes for both Hydrogen production and Oxygen reduction by an Au electrode and Pt electrode using a 3D surface to control the distance between and the location of the particles.
Figure 15:
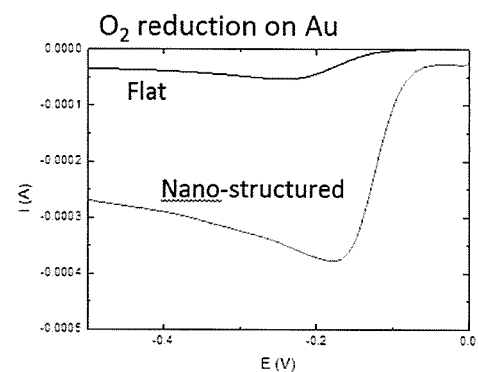
Figure 16:
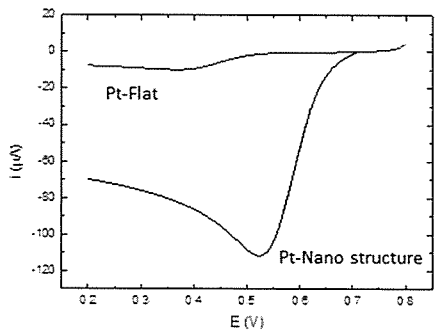
Figure 17:
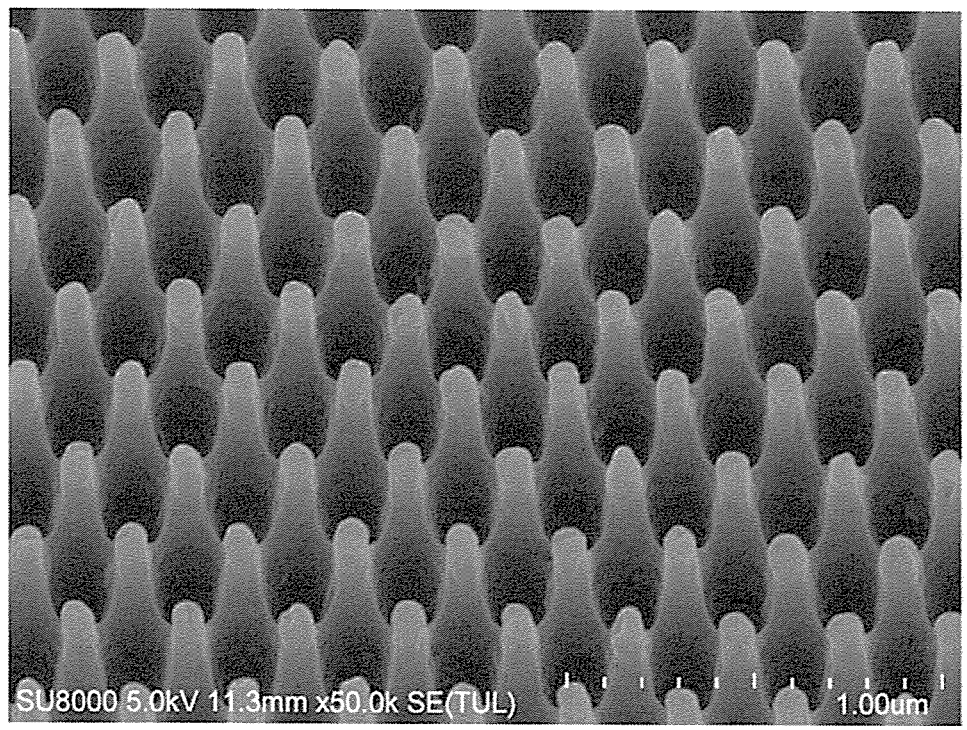
FIG. 17 shows an SEM of the surface of the pure nickel structure from Table 1.

FIGS. 14-16 show the comparison in the activity for typical flat vs nano-structured electrodes for both Hydrogen production and Oxygen reduction by an Au electrode (Nickel with sputtered gold on the tips—see Table 1) and Pt electrode (Gold coated polymer with electro deposited Pt on the tips—see Table 1). Spacing between all the tips (the apex of the surface structure) is approximately 250 nm. The height of the surface structures is also approximately 250 nm. The size of the tips (the apex of the surface structure) is approximately 10 nm. This can be seen from the SEM of the pure nickel structure from Table 1 as is shown in FIG. 17. The effects in both Hydrogen production and Oxygen reduction when using nano-structured electrodes that control the distance between and the location of the Au and Pt particles are seen (FIGS. 14-16) as a substantial decrease in the voltage required to initiate the reduction process, and an order of magnitude increase in the catalytic performance of the nano-structured surface over the flat surface.

Further, the configuration as shown in FIGS. 13 and 17 allows the valleys between the tips of the surface structures to be filled with a co-catalyst to replicate what is reported in the article "Enhancing Hydrogen Evolution Activity in Water Splitting by Tailoring Li+—Ni(OH)$_2$—Pt Interfaces" Ram Subbaraman et. al., Science 2011 VOL 334, page 1256-1260. This article teaches the use of a combination of nickel hydroxide (Ni(OH)2) and Pt, where the nickel hydroxide is placed onto the surface of a flat platinum electrode without surface structures as required by the present invention. The present invention would allow use of the same combination of nickel hydroxide co-catalyst and Pt, but in the present instance the nickel hydroxide would be placed in the valleys (by spin coating or oxidation of the nickel base) and the Pt would be placed on the tips at the apex of the surface structures (such as taught by Example 4).

As is proposed in the article, the Pt at the tips would do the final water splitting, and the nickel hydroxide co-catalyst would assist the process by doing an initial binding of the water. Various combinations of catalyst and co-catalyst would of course be possible using the methods and structures according to the present invention as has been discussed previously herein. For example, these options would include the use of (i) catalyst(s) selected from any one or more of the transition metals, e.g. Ni, Cr, Cu, Ag, Pt, Pd, Fe, and Ir, together with (ii) co-catalyst(s) selected from any one or more oxides of a metal, for example of aluminum, calcium, cerium, gallium, hafnium, iron, lanthanum, magnesium, strontium, titanium, ruthenium, nickel, zirconium, or zinc. Combinations of Ni with any one or more of an oxide of aluminum, calcium, cerium, gallium, hafnium, iron, lanthanum, magnesium, strontium, titanium, zirconium, or zinc; Cr with any one or more of an oxide of aluminum, calcium, cerium, gallium, hafnium, iron, lanthanum, magnesium, strontium, titanium, ruthenium, zirconium, or zinc; Cu with any one or more of an oxide of aluminum, calcium, cerium, gallium, hafnium, iron, lanthanum, magnesium, strontium, titanium, ruthenium, nickel, zirconium, or zinc; Ag with any one or more of an oxide of aluminum, calcium, cerium, gallium, hafnium, iron, lanthanum, magnesium, strontium, titanium, ruthenium, nickel, zirconium, or zinc; Pt with any one or more of an oxide of aluminum, calcium, cerium, gallium, hafnium, iron, lanthanum, magnesium, strontium, titanium, ruthenium, nickel, zirconium, or zinc; Pd with any one or more of an oxide of aluminum, calcium, cerium, gallium, hafnium, iron, lanthanum, magnesium, strontium, titanium, ruthenium, nickel, zirconium, or zinc; Fe with any one or more of an oxide of aluminum, calcium, cerium, gallium, hafnium, iron, lanthanum, magnesium, strontium, titanium, ruthenium, nickel, zirconium, or zinc; Ir with any one or more of an oxide of aluminum, calcium, cerium, gallium, hafnium, iron, lanthanum, magnesium, strontium, titanium, ruthenium, nickel, zirconium, or zinc; are all options.

Therefore, the surprising conclusion is that the 3D shape electrochemically differentiates the activity of the tip from the base even though it is the same material (here metallic).

Figure 18:
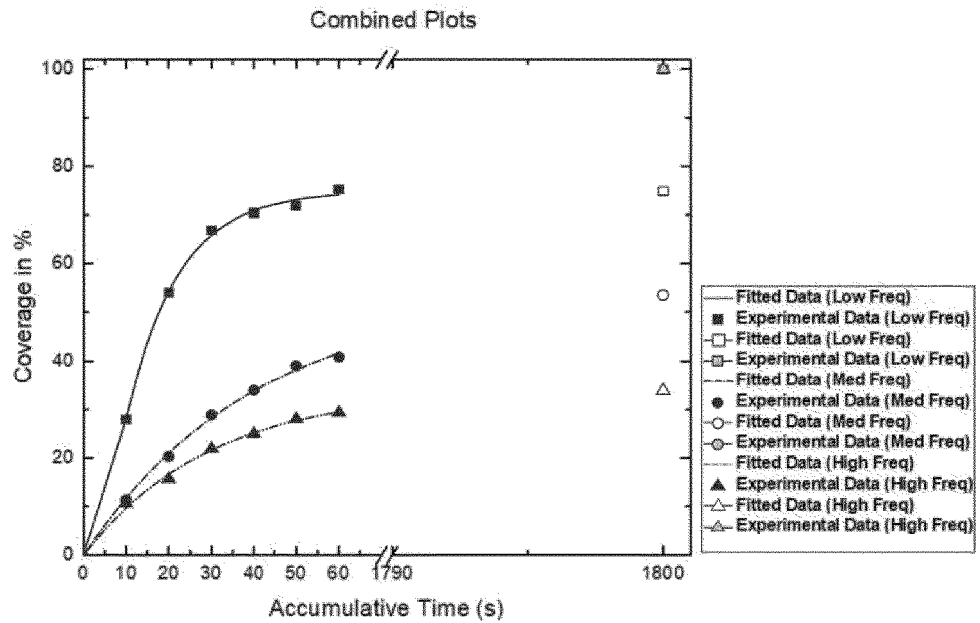
FIG. 18 shows the effect of changing the pulse frequency of the electrochemical "Click" reaction on the ferrocene surface coverage, (triangles high, circle medium and squares low frequencies).
Figure 19:
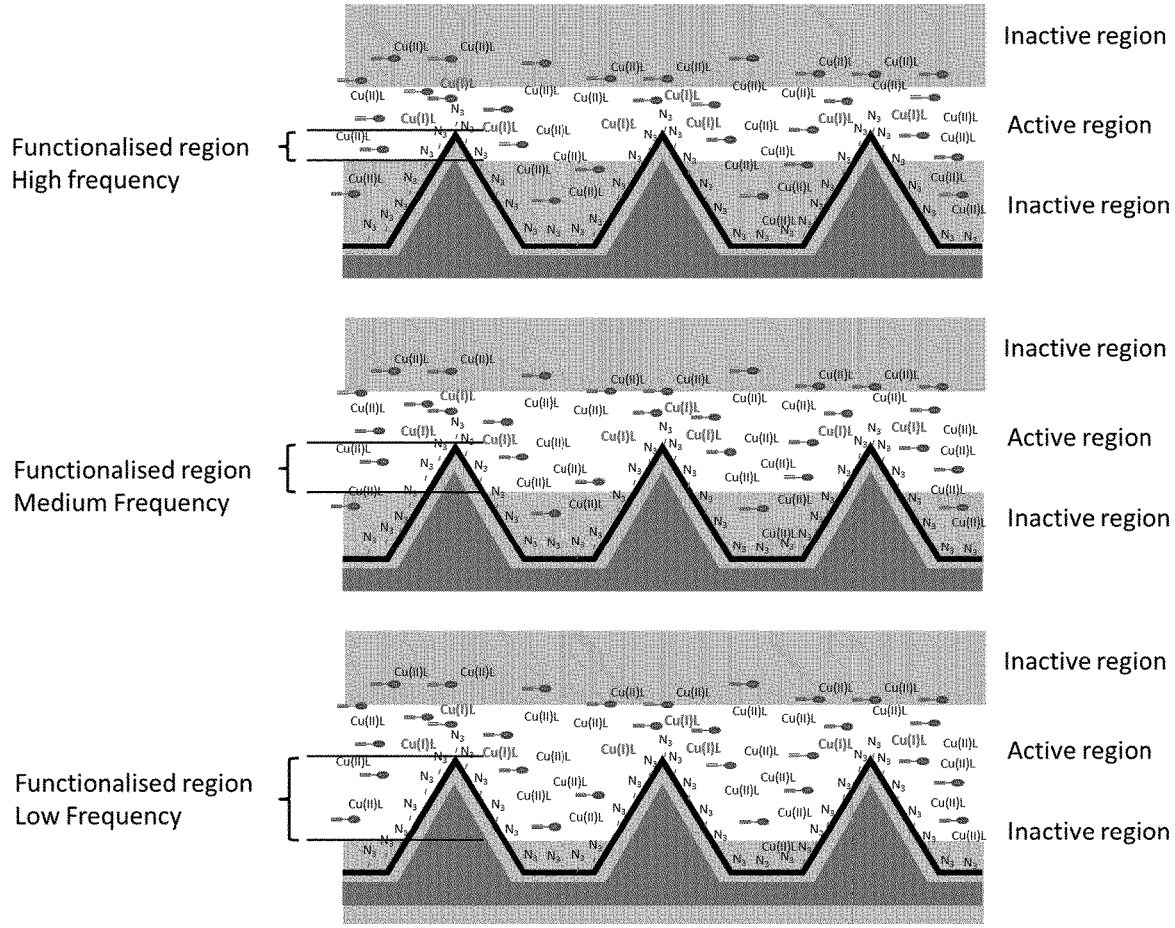
FIG. 19 shows the pictorial representation of the control on the extent of surface functionalization at the apex at different frequencies

Example 7: Effect of Frequency on Surface Modification at the Apex aim: to control the extent of surface attachment that is localized on the apexes of the pyramidal array electrode. (FIG. 18-19)

Method:

To covalently attach ferrocene to the SAM, was carried out as per example 2, stock solution was added to the cell with ethynyl Ferrocene. The reaction was then activated electrochemically via chronoamperometry, by using a series of voltage pulses alternating between an activating voltage of −300 mV (versus Ag/AgCl) and a deactivating voltage of +500 mV. Three different pulsing frequencies were used (1.6 Hz, 10 Hz and 160 Hz), in each case maintaining the duty cycle at 20% (that is, the deactivation time was always four times longer than the activation time). After every 10 seconds of pulsing, the cell was washed with deionised water and a 1 M aqueous solution of perchloric acid was added. To determine the ferrocene surface coverage, a cyclic voltammogram was run between +200 mV and +700 mV (versus Ag/AgCl), at a scan rate of 300 mV/s. The cell was then washed with deionised water, a fresh a fresh aliquot of the ethynylferrocene plus Cu(NO3)2 and TTMA solution was added, and the electrochemical reaction was repeated until it there were no further changes in ferrocene surface coverage.

Results:

As the pulse frequency increases, the ferrocene surface coverage decreases. This trend suggests that ferrocene attachment becomes more focused at the apex with increased pulse frequency. This is consistent with localized reduction of Cu(II) TTMA to Cu(I) TTMA due to higher current density at the apex and a diffusion-controlled reaction.

With increased pulse frequency, there is less time for the Cu(I)TTMA catalyst generated at the apex to diffuse to the electrode surface, and thus the electrode sites that maximize diffusion react preferentially. For the pyramidal electrodes explored in this work, the very tips of the pyramid apexes have maximum diffusion rates and by exhibiting spherical-like diffusion akin to that observed on standard microelectrodes Conclusions:

Using pulse frequency, surface modification can be achieved at the apex with high precision (FIG. 19)

Figure 20:
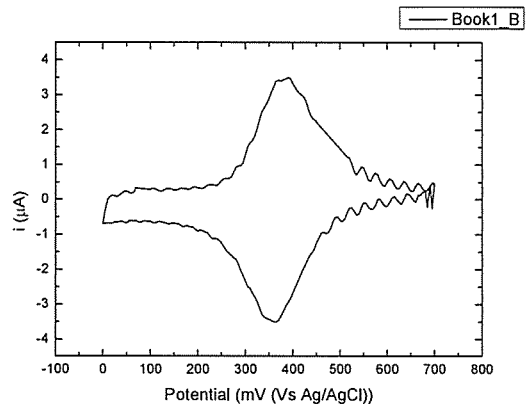
FIG. 20 shows cyclic voltammetry of immobilised ferrocene on Pyramidal electrode

Example 8: Nano-scale Catalysis with Organometallic Catalyst Immobilised at the Apex To demonstrate that charge density (voltage or current) distribution of an electrode array with surface structures can be used to enhance the activity of the immobilised organometallic catalyst Method:

Ferrocene is immobilised as per example 7 on both flat and pyramidal electrode using electrochemical surface modification. The experiment was carried out such that surface coverage of Ferrocene on both flat and pyramid were comparable (FIG. 20, 21). Electrochemical conversion of 1 (FIG. 23) and 100 mM (FIG. 22) sodium ascorbate were carried out in PBS.

Figure 21:
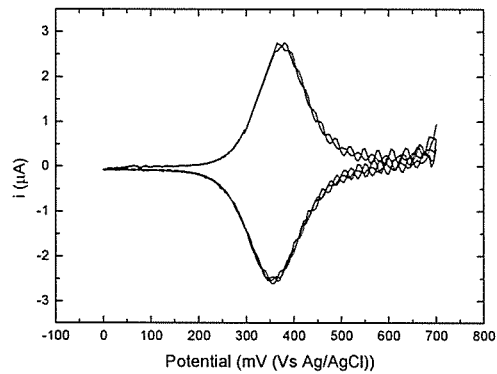
FIG. 21 shows cyclic voltammetry of immobilised ferrocene on flat electrode
Figure 22:
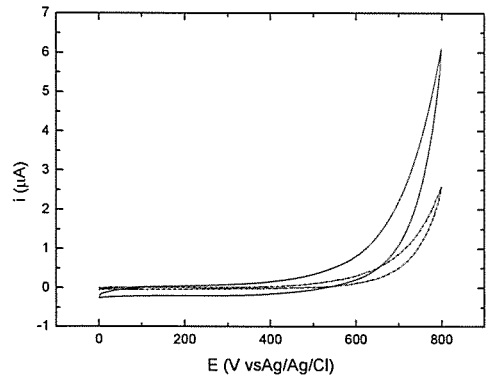
FIG. 22 shows the ascorbic acid oxidation in the absence of ferrocene on SAM coated Pyramid (solid line) and flat (dashed line)
Figure 23:
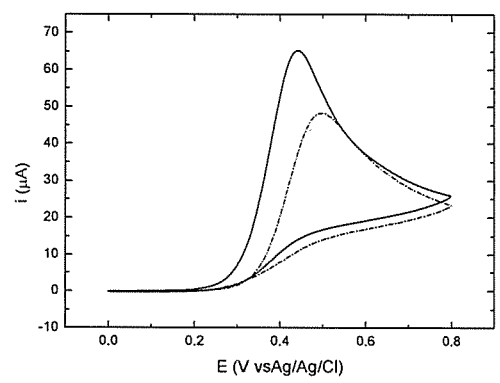
FIG. 23 shows the ascorbic acid (1 mM) oxidation by ferrocene immobilised on pyramid (solid line) and flat (dashed line)
Figure 24:
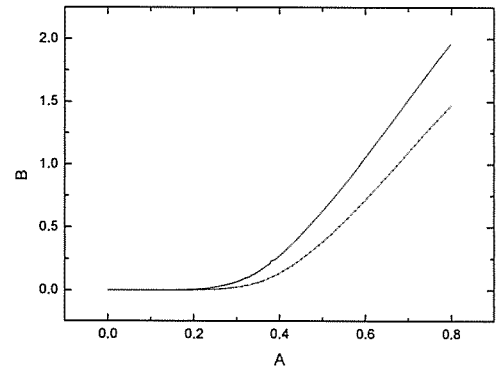
FIG. 24 shows the ascorbic acid (100 mM) oxidation by ferrocene immobilised on pyramid (solid line) and flat (dashed line)

Results:

Ferrocene is known to facilitate the oxidation of ascorbate when incorporated into a SAM-modified gold electrode (FIGS. 20 and 21). It is known that oxidation of ascorbic acid is a two-electron two-proton oxidation process that yields a single product. With ferrocene attached to N3-C11SH/C10SH, the current rises, peaks, and decreases showing a diffusion limited process. FIG. 22 shows the comparison in the ferrocene activity on a typical flat vs Pyramid-structured electrodes ascorbic acid oxidation. Similar to the hydrogen production and oxygen reduction when using a substantial decrease in the voltage required to initiate the oxidation process was observed with increased catalytic performance

| | Ascorbic acid oxidation | |
|---|---|---|
| | Voltage shift rel. to flat | Power gained rel. to flat |
| Ferrocene (pyramid) | 59 mV | 152% |

Conclusion:

Again, the surprising conclusion is that the 3D shape electrochemically differentiates the activity of the tip from the base even though it is the same material (here organometallic). Catalysis is improved by reducing the energy cost for the transformation and the rate that reaction occurs.

The efficiency of a heterogeneous electrocatalytic process is determined in two ways:
  Kinetic efficiency, namely the speed at which catalysis occurs, and relating primarily to the seed at which the reactants and the products diffuse to and away from the catalytic surface.
  Thermodynamic efficiency, namely the energy required to drive the electrocatalytic reaction.

The results obtained on the 3D surfaces (e.g. Example 8) show conclusively that the surface structure plays an important role in the catalytic process, something which has not been recognised up until the present invention. It can be seen that the method achieves increases in both Kinetic and Thermodynamic efficiency compared to an electrode with a flat surface. A flat electrode is in fact wavy at best with high and low points, as opposed to the electrode sensor array of the present invention which is an array of controlled tips. Although two electrodes (flat and array of controlled tips) may be identical in terms of the material makeup, the use of an array of tips (as taught by the present invention) has the effect of not only making catalytic turnover increase a million times faster, but the energy required to perform the catalytic conversion is also substantially lower. The benefits to the user are immediately apparent.

What is apparent is:

1. Catalytic elements located at the apex of a tip have dramatically enhanced catalytic turnover rates compared to the same material on a flat surface.

2. The effect is seen in both metallic (Pt, Au, Ni) and organometallic (ferrocene, and Porphyrin, Phenanthroline, Imidazole, tris pyridyl amine, and triazole, with a transition metal (e.g. Fe, Mn, Mg, Cu, Ir, Co, Pt, Pd, Au, Ag, Mg—in any suitable oxidative state)) catalysis, the latter in which the catalyst is held in a cage-like molecule attached to the electrode surface by a chemical bond. As such the process is applicable not only to non-biological catalysis, but also to complex biological catalytic processes.

The invention therefore may also be seen to include a method of focussing charge density (voltage or current) at a functional surface on an electrode array, the method comprising the steps of:
  a. providing an electrode array comprising:
    i. a support substrate;
    ii. at least one surface structure protruding from an upper surface of the support substrate to create a 3 dimensional structure wherein the surface structure includes an electrode layer;
    iii. a functional surface on the electrode layer, wherein the functional surface is on an upper portion of the at least one surface structure and wherein the functional surface is adapted to contact an active species in a solution;
  b. exposing the surface structure to a solution comprising both an active species and that includes a counter electrode positioned in the solution; and
  c. establishing a current or voltage between the electrode layer and the counter electrode such that the charge density is focussed at the functional surface and the active species is electrochemically modified following contact with the functional surface; and
  wherein, in use, electrochemical activity at the functional surface is differentiated from the upper surface of the support substrate irrespective of whether the functional surface and the upper surface of the support material are formed from the same material.

As will be apparent the functional surface and the upper surface of the support material may be formed from the same material and, in use, electrochemical activity is focussed at the at the functional surface and is found to be differentiated from the upper surface of the support substrate.

The differentiation in electrochemical activity between the functional surface and the upper surface of the support substrate is induced by the application of the applied voltage or current that focusses the charge density (current or voltage) at the functional surface as has been described previously.

The materials forming the various components of the array and the methods of achieving the various functions are as described previously herein and are repeated (as will be clear to the reader).

The method of focussing charge density (voltage or current) at a functional surface on an electrode array as above also has the outcome of enhancing both kinetic and thermodynamic efficiency in comparison to a method using a flat electrode.

What the invention may be seen to be directed to and may include the following potential claims:

1. A method of focussing charge density (voltage or current) at a functional surface on an electrode array, the method comprising the steps of:
  a. providing an electrode array comprising:
    i. a support substrate;
    ii. at least one surface structure protruding from an upper surface of the support substrate wherein the surface structure includes an electrode layer;
    iii. a functional surface on the electrode layer, wherein the functional surface is on an upper portion of the at least one surface structure and wherein the functional surface is adapted to contact an active species in a solution;
  b. exposing the surface structure to a solution comprising both an active species and a counter electrode; and
  c. establishing a current (charge density (voltage or current) between the electrode layer and the counter electrode such that the current is focussed at the functional surface and the active species is electrochemically modified following contact with the functional surface.

2. A method as claimed in claim 1 wherein the functional surface is at or about an apex of the surface structure.

3. A method as claimed in claim 1 or 2 wherein the active species comprises a catalyst, wherein the catalyst is activated via electrochemical modification following contact with the functional surface to yield an activated catalyst.

4. A method as claimed in any one of claims 1 to 3 wherein the catalyst is capable of reduction or oxidation to form an activated catalyst.

5. A method as claimed in any one of claims 1 to 4 wherein the catalyst comprises copper, a transition metal, an organometallic complex, an organometallic complex including transition metal, or an organic material.

6. A method as claimed in any one of claims 1 to 5 wherein electrochemical activation of the catalyst occurs at a substantially greater rate at the functional surface than activation would occur at another surface position on the electrode layer.

7. A method as claimed in any one of claims 1 to 6 the method further comprises the step of:
   a. electrochemically activating the active species in the solution to yield an activated catalyst.

8. A method as claimed in claim 7 wherein the activated catalyst catalyses the reaction of a solute reactant with a binding layer and the method further comprises the step of:
   a. attaching the solute reactant to the binding layer on the functional surface.

9. A method as claimed in claim 7 or 8 wherein the activated catalyst catalyses reaction of a solute reactant with a binding layer to yield an attached product on the functional surface.

10. A method as claimed in claim 8 or 9 wherein the reaction between the solute reactant and the binding layer is a copper (I) catalysed azide alkyne cycloaddition reaction.

11. A method as claimed in any one of claims 7 to 10 wherein the active species comprises copper (II) and the electrochemically activated catalyst comprises copper (I).

12. A method as claimed in any one of claims 8 to 11 wherein the solute reactant comprises a compound with a functional group that when in the presence of the activated catalyst reacts with a functional group on the binding layer.

13. A method as claimed in any one of claims 8 to 12 wherein the solute reactant further comprises a detection moiety adapted to attach to the functional surface following reaction of the solute reactant with the binding layer.

14. A method as claimed in any one of claims 8 to 13 wherein the binding layer comprises a self-assembled monolayer.

15. A method as claimed in any one of claims 8 to 14 wherein the binding layer is present on at least one of:
   i. the functional surface;
   ii. the surface structures;
   iii. the passivating layer; or
   iv. the support substrate.

16. A method as claimed in any one of the preceding claims wherein the method further comprises depositing a SAM on at least one of:
   i. the functional surface;
   ii. the surface structures;
   iii. the passivating layer; or
   iv. the support substrate.

17. A method as claimed in claim 16 wherein the step of depositing the SAM is carried out either
   a. prior to electrochemically activating the active species following contact with the functional surface to yield an activated catalyst; or
   b. prior to attaching a solute reactant to a binding layer on the functional surface.

18. A method as claimed in any one of claims 9 to 17 wherein the attached product is selected from the group consisting of:
   a. a functional group, for example one selected from the group consisting of carboxylic acid, amine, alcohol, aldehyde, biotin, avidin, azide and ethynyl;
   b. a binding agent adapted to bind to a target analyte in solution, for example one selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, atetylenic quinone, azides, tetrazine, large or small amine-containing molecules, sulfhydryl-containing molecules or proteins expressing glutathione S-transferase (GST), metals and metal salts (such as lead, lead phosphate, chromium, platinum, palladium, iridium, copper), ssDNA, ssRNA, miRNA, mRNA, aptamers, and small molecules with and without a spacer molecule;
   c. a catalytic species which catalyses a reaction in solution, for example a catalyst selected from the group consisting of copper, a transition metal, an organometallic complex, an organometallic complex including transition metal, or an organic material that is able to be oxidised or reduced; and
   d. a detection moiety, for example one selected from the group consisting of a fluorophore, an ethynyl functionalised fluorophore, a protein, an antibody, a nucleic acid, DNA, RNA, a small molecule, or a functional group, for example one selected from the group consisting of carboxylic acid, amine, alcohol, ester, ketone and aldehyde.

19. A method as claimed in any one of claims 1 to 18 wherein the electrode array comprises a binding layer covering the functional surface and at least part of other surfaces of the array, wherein the step of establishing a current between the electrode layer and the counter electrode results in selective removal of the binding layer from the functional surface compared to other positions on the electrode array.

20. A method as claimed in any one of claims 1 to 19 further comprising the step of:
   a. selective removal of at least part of the binding layer from the functional surface as compared to other positions on the electrode array.

21. A method as claimed in claim 20 further comprising the step of:
   a. selective deposition of a further binding layer on the functional surface which has undergone selective removal of the first binding layer.

22. A method as claimed in claim 20 wherein the electrode array comprises a binding layer on a lower portion of the surface structure but absent from the upper portion of the surface structure, and the method further comprises the step of:
   a. selective deposition of a further binding layer on the functional surface.

23. A method as claimed in claim 22 wherein the step of deposition of a further binding layer comprises coupling of an active species to the binding layer on the functional surface.

24. A method as claimed in claim 23 wherein the coupling comprises a 1-Ethyl-3-(3-dimethylaminopropyl)-carbodiimide/N-hydroxysuccinimide (EDC/NHS) coupling reaction.

25. A method as claimed in any one of claims 19 to 24 wherein the active species is solvated within a charge carrying or ionic species.

26. A method as claimed in any one of claims 19 to 25 wherein the binding layer comprises a self-assembled monolayer (SAM).

27. A method as claimed in claim 26 wherein the SAM is present on an upper surface of the electrode layer.

28. A method as claimed in claim 26 or 27 wherein the SAM is present on an upper surface of the support substrate.

29. A method as claimed in any one of claims 26 to 28 wherein the SAM is selected from the group consisting of:
   a. long-chain molecules comprising a carbon chain of C6 or greater;
   b. short-chain molecules comprising a carbon chain of C5 or less;
   c. a mixed SAM comprising long-chain molecules comprising a carbon chain of C6 or greater and short-chain molecules of C5 or less.

30. A method as claimed in claim 29 wherein:
   a. the long-chain SAM comprises molecules selected from the group consisting of azides, amines, carboxylates, aldehydes, ketones, esters or carboxylic acids; and
   b. the short-chain SAM comprises molecules selected from the group consisting of alkanes, azides, amines, hydroxyls, carboxylates or carboxylic acids.

31. A method as claimed in any one of claims 26 to 30 wherein the SAM comprises short-chain molecules comprising a carbon chain of C5 or less and wherein the upper portion of the surface structure(s) is either
   a. free of SAM; or
   b. wherein the SAM is adapted to be removed by establishing a current between the electrode layer and the counter electrode.

32. A method as claimed in any one of claims 26 to 30 wherein the SAM comprises an alkane thiol with carbon chain of C1 to C50, and wherein the upper portion of the surface structure(s) is either:
   a. free of SAM; or
   b. wherein the SAM is adapted to be removed by establishing a current between the electrode layer and the counter electrode.

33. A method as claimed in any one of claims 26 to 32 wherein the electrode array comprises a SAM binding layer on an upper and lower portion of the surface structure and contact of the active species with the functional surface results in selective removal of the SAM binding layer from the upper portion of the surface structure where charge density (voltage or current) is focussed.

34. A method as claimed in any one of claims 26 to 33 further comprising the step of:
   a. selective deposition of a further binding layer on the now exposed portion of the electrode layer at the functional surface.

35. A method as claimed in any one of claims 8 to 33 wherein the binding layer further comprises a binding agent selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, atetylenic quinone, azides, tetrazine, large or small amine-containing molecules, sulfhydryl-containing molecules or proteins expressing glutathione S-transferase (GST), metals and metal salts, lead, lead phosphate, chromium, platinum, palladium, iridium and copper.

36. A method as claimed in claim 35 wherein the binding agent is capable of binding to a target analyte within a solution. Preferably the binding agent is selected from the group consisting of nucleic acids, ssDNA, ssRNA, miRNA, mRNA, Aptamers, Antibodies, small molecules with and without a spacer molecule.

37. A method as claimed in any one of the preceding claims wherein the electrode array comprises a passivating layer deposited on the support substrate and covering the upper portion of the surface structure.

38. A method as claimed in claim 37 wherein the step of applying a current to focus charge density (voltage or current) results in removal of the passivating layer on the functional surface on the upper portion of the surface structures.

39. A method as claimed in claim 37 or 38 wherein the passivating layer is removed by establishing a current between the counter electrode and the electrode surface.

40. A method as claimed in any one of the preceding claims wherein the active species comprises a charged particle wherein the charged particle is attached to the functional surface following the electrochemical modification.

41. A method as claimed in claim 40 wherein the charged particle comprises a metal ion.

42. A method as claimed in claim 41 wherein the metal ion comprises an ionic form of platinum, gold, palladium, Iron, Iridium, silver, copper, an alloy or a transition metal.

43. A method as claimed in any one of claims 40 to 42 wherein the charged particle comprises a binding agent for a biological sensor.

44. A method as claimed in claim 43 wherein the binding agent is selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, large or small amine-containing molecules, sulfhydryl-containing molecules or proteins expressing glutathione S-transferase (GST), metals, metal salts, lead, lead phosphate, chromium, platinum, palladium, iridium and copper.

45. A method as claimed in any one of claims 40 to 44 wherein the density of charged particle attached on the functional surface is greater than the density of charged particle attached on other exposed surfaces of the electrode layer.

46. A method as claimed in any one of the preceding claims wherein the functional surface is on an upper surface of the electrode layer.

47. A method as claimed in any one of the preceding claims wherein the functional surface is on an upper surface of an electrode layer on a surface structure protruding from the support substrate or the passivating layer.

48. A method as claimed in any one of the preceding claims wherein the functional surface is separated from other functional surfaces on other surface structures by the passivating layer or the support substrate.

49. A method as claimed in any one of the preceding claims wherein the functional surface on one electrode layer is electrically connected to at least one further functional surface on the same electrode layer.

50. A method as claimed in any one of the preceding claims wherein the extent of the functional surface is defined by the charge density (voltage or current) being greater than the charge density (voltage or current) measured on a flat surface of the electrode layer.

51. A method as claimed in any one of the preceding claims wherein the charge density (voltage or current) is at least 2 times greater on the functional surface as compared to the flat surface.

52. A method as claimed in any one of the preceding claims wherein the charge density (voltage or current) is at least 5 times greater on the functional surface as compared to the flat surface.

53. A method as claimed in any one of the preceding claims wherein the surface structure protrudes through the passivating layer.

54. A method as claimed in any one of the preceding claims wherein the surface structure comprises an apex at the top of the surface structure.

55. A method as claimed in any one of the preceding claims wherein the surface structure or an upper section thereof is selected from the group consisting of:
   a. dome-shaped;
   b. cone-shaped;
   c. pyramid-shaped;
   d. papilliform;
   e. a ridge;
   f. convex;
   g. polyhedron-shaped;
   h. tapered to an apex;
   i. rounded to an apex;
   j. has a triangular cross-section along a plane orthogonal to a top surface of the support substrate;
   k. has a convex cross-section along a plane orthogonal to a top surface of the support substrate;
   l. has a semi-circular cross-section along a plane orthogonal to a top surface of the support substrate;
   m. has a papilliform cross-section along a plane orthogonal to a top surface of the support substrate.

56. A method as claimed in any one of the preceding claims wherein the surface structure has a substantially triangular, substantially circular or substantially square cross-section along a plane parallel to a top surface of the support substrate.

57. A method as claimed in any one of the preceding claims wherein a cross-sectional area of the surface structure diminishes along an axis that is orthogonal to a top surface of the support substrate.

58. A method as claimed in any one of the preceding claims wherein the surface structure is integral with the support substrate.

59. A method as claimed in any one of the preceding claims wherein the electrode layer is deposited on an upper surface of the surface structure and optionally the support substrate.

60. A method as claimed in any one of the preceding claims wherein the electrode layer on the upper surface of two or more surface structures are electrically connected within the array.

61. A method as claimed in any one of the preceding claims wherein the electrode array comprises a passivating layer on the support substrate and a lower portion of the surface structure.

62. A method as claimed in claim 61 wherein the passivating layer is absent from the upper portion of the surface structure.

63. A method as claimed in any one of the preceding claims wherein the extent of the functional surface is defined by deposition of a passivating layer on the support substrate and a lower portion of the surface structure(s) such that the passivating layer is absent from the functional surface.

64. A method as claimed in any one of claims 61 to 63 wherein the passivating layer is selected from the group consisting of a cross-linked polymer, a photo-resist, a self-assembled mono-layer (SAM), an epoxy-based negative photoresist and SU-8.

65. A method as claimed in any one of the preceding claims wherein the solution comprises an electrolyte, an organic solvent, alcohol, ether, acetone, DMSO, NaCl, H2SO4, HNO3, NaOH, fresh water, sea water, blood, urine, milk, saliva or a buffer solution with alkali metal chloride ions and copper$^{2+}$ ions.

66. A method as claimed in any one of the preceding claims wherein the counter electrode is selected from the group consisting of an inert conductive material, a metal, Pt, Gold, carbon, graphite, graphene, carbon fibre, carbon nanotubes, Bucky Balls, conducting polymer PPy, PA, PAcetylene.

67. A method as claimed in any one of the preceding claims wherein the counter electrode is selected from the group consisting of in a fixed orientation with respect to the surface structure, attached to the electrode array, held in an orientation to minimise differential in distance between each of the surface structures of the array, and above an upper surface of the array.

68. A method as claimed in any one of the preceding claims wherein the current established between the electrode layer and the counter electrode as measured at the electrode layer is an oxidising or reducing current.

69. A method as claimed in claim 68 wherein potential difference established between the counter electrode and the electrode layer is between about −2V and +2V.

70. A method as claimed in claim 69 wherein the potential difference is between about −200 mV and −1V.

71. A method as claimed in any one of the preceding claims wherein the current is pulsed between an activating potential and an inactivating potential.

72. A method as claimed in any one of the preceding claims wherein the electrochemical modification of the active species results in the elicitation of a detectable response.

73. A method as claimed in claim 72 wherein the detectable response comprises a change in current, voltage, capacitance, resistance, conductance, impedance, magnetic flux or electric field.

74. An electrode array comprising:
   a. a support substrate;
   b. at least one surface structure protruding from an upper surface of the support substrate, wherein the surface structure includes an electrode layer;
   c. a functional surface on the electrode layer, wherein the functional surface is on an upper portion of the at least one surface structure and wherein the functional surface is adapted to contact an active species in a solution;
   d. a binding layer wherein the binding layer is either:
      i. present on the functional surface at a significantly increased density than at a non-functional surface on the electrode array; or
      ii. present on a non-functional surface of the electrode array at a significantly increased density than at a position on the functional surface on the surface structure,
   wherein the functional surface is at or about an apex of the surface structure.

75. An electrode array comprising:
   a) a support substrate;
   b) at least one surface structure protruding from an upper surface of the support substrate, wherein the surface structure includes an electrode layer;
   c) a functional surface on the electrode layer, wherein the functional surface is on an upper portion of the at least one surface structure and wherein the functional surface is adapted to contact an active species in a solution;
   d) a binding layer wherein the binding layer is either:
      i) present on the functional surface at a significantly increased density than at a non-functional surface on the electrode array; or ii) present on a non-functional surface of the electrode array at a significantly increased density than at a position on the functional surface on the surface structure;

wherein the functional surface is at or about an apex of the surface structure and wherein the surface structures are separated from each other by about 5 nm to about 1000 μm apex to apex and wherein this separation is preferably but optionally substantially uniform.

76. An electrode array of claim 74 wherein the surface structures are separated from each other by about 50 nm to about 1000 μm; about 100 nm to about 1000 μm; about 250 nm to about 1000 μm; about 5 nm to about 750 μm; about 5 nm to about 500 μm; about 5 nm to about 100 μm, apex to apex.

77. An electrode array as claimed in claim 74 to 76 wherein the functional surface comprises a portion of the electrode layer defined by the charge density (voltage or current) being at least two times greater than the charge density (voltage or current) measured under equivalent conditions on a flat surface of the electrode layer when a current is established between the electrode layer and a counter electrode in a solution contacting the electrode layer.

78. An electrode array as claimed in claim 74 to 77 wherein the binding layer comprises a self-assembled mono-layer (SAM) as defined in any one of claims 27 to 33 or 35, or a charged particle as defined in claims 41 to 44.

79. An electrode array as claimed in any one of claims 74 to 78 wherein the functional surface is on an upper surface of the electrode layer.

80. An electrode array as claimed in any one of claims 74 to 79 wherein the functional surface is on an upper surface of an electrode layer on a surface structure protruding from the support substrate or the passivating layer.

81. An electrode array as claimed in any one of claims 74 to 80 wherein the functional surface is separated from other functional surfaces on other surface structures by a passivating layer or the support substrate.

82. An electrode array as claimed in any one of claims 74 to 81 wherein the functional surface on one electrode layer is electrically connected to at least one further functional surface on the same electrode layer.

83. An electrode array as claimed in any one of claims 74 to 82 wherein the extent of the functional surface is defined by the charge density (voltage or current) being greater than the charge density (voltage or current) measured on a flat surface of the electrode layer when the array is in use.

84. An electrode array as claimed in any one of claims 74 to 83 wherein the surface structure protrudes through the passivating layer.

85. An electrode array as claimed in any one of claims 74 to 84 wherein the surface structure comprises an apex at the top of the surface structure.

86. An electrode array as claimed in any one of claims 74 to 85 wherein the surface structure or an upper section thereof is selected from the group consisting of:
a. dome-shaped;
b. cone-shaped;
c. pyramid-shaped;
d. papilliform;
e. a ridge;
f. convex;
g. polyhedron-shaped;
h. tapered to an apex;
i. rounded to an apex;
j. has a triangular cross-section along a plane orthogonal to a top surface of the support substrate;
k. has a convex cross-section along a plane orthogonal to a top surface of the support substrate;
l. has a semi-circular cross-section along a plane orthogonal to a top surface of the support substrate;
m. has a papilliform cross-section along a plane orthogonal to a top surface of the support substrate.

87. An electrode array as claimed in any one of claims 74 to 86 wherein the surface structure has a substantially triangular, substantially circular or substantially square cross-section along a plane parallel to a top surface of the support substrate.

88. An electrode array as claimed in any one of claims 74 to 87 wherein a cross-sectional area of the surface structure diminishes along an axis that is orthogonal to a top surface of the support substrate.

89. An electrode array as claimed in any one of claims 74 to 88 wherein the surface structure is integral with the support substrate.

90. An electrode array as claimed in any one of claims 74 to 89 wherein the electrode layer is deposited on an upper surface of the surface structure and optionally the support substrate.

91. An electrode array as claimed in any one of claims 74 to 90 wherein the electrode layer on the upper surface of two or more surface structures are electrically connected within the array.

92. An electrode array as claimed in any one of claims 74 to 91 wherein the electrode array comprises a passivating layer on the support substrate and a lower portion of the surface structure.

93. An electrode array as claimed in claim 92 wherein the passivating layer is absent from the upper portion of the surface structure.

94. An electrode array as claimed in any one of claims 74 to 93 wherein the extent of the functional surface is defined by deposition of a passivating layer on the support substrate and a lower portion of the surface structure(s) such that the passivating layer is absent from the functional surface.

95. An electrode array as claimed in any one of claims 92 to 94 wherein the passivating layer is selected from the group consisting of a cross-linked polymer, a photo-resist, a self-assembled mono-layer (SAM), an epoxy-based negative photoresist and SU-8.

96. An electrode array as claimed in any one of claims 74 to 95 wherein the electrode array further comprises a counter electrode selected from the group consisting of an inert conductive material, a metal, Pt, Gold, carbon, graphite, graphene, carbon fibre, carbon nano-tubes, Bucky Balls, conducting polymer PPy, PA, PAcetylene.

97. An electrode array as claimed in claim 96 wherein the counter electrode is in a fixed orientation with respect to the surface structure, attached to the electrode array, held in an orientation to minimise differential in distance between each of the surface structures of the array, and above an upper surface of the array; and/or includes 3D surface features which are configured in such a way as to promote the location of the charge density (voltage or current) on the 3D working electrode, such as a series of tips that reflects the tips of the working electrode.

98. A method of focussing charge density (voltage or current) at a functional surface on an electrode array, the method comprising the steps of:
  a) providing an electrode array comprising
    i) a support substrate;
    ii) at least one surface structure protruding from an upper surface of the support substrate wherein the surface structure includes an electrode layer;
    iii) a functional surface on the electrode layer, wherein the functional surface is on an upper portion of the at least one surface structure and wherein the functional surface is adapted to contact an active species in a solution;
  b) exposing the surface structure to a solution comprising an active species and including a counter electrode; and
  c) establishing a current or voltage between the electrode layer and the counter electrode such that the current (charge density (voltage or current)) is focussed at the functional surface and the active species is electrochemically modified following contact with the functional surface.

99. A method of focussing charge density (voltage or current) at a functional surface on an electrode array, the method comprising the steps of:
  a) providing an electrode array comprising
    i) a support substrate;
    ii) at least one surface structure protruding from an upper surface of the support substrate wherein the surface structure includes an electrode layer;
      (i) a functional surface on the electrode layer, wherein the functional surface is on an upper portion of the at least one surface structure and wherein the functional surface is adapted to contact an active species in a solution;
      (ii) wherein the surface structures are separated from each other by about 5 nm to about 1000 μm apex to apex and wherein this separation is preferably but optionally substantially uniform;
  b) exposing the surface structure to a solution comprising an active species and including a counter electrode; and
  c) establishing a current or voltage between the electrode layer and the counter electrode such that the current (charge density (voltage or current)) is focussed at the functional surface and the active species is electrochemically modified following contact with the functional surface.

100. The method or array of any one of the previous claims wherein the array includes a catalyst at the apex of the surface structure and a co-catalyst in the valleys between the surface structures, the catalysts selected from any one or more of the transition metals (e.g. Ni, Cr, Cu, Ag, Pt, Pd, Fe, and Ir), and the co-catalysts selected from any one or more oxides of a metal (e.g. aluminum, calcium, cerium, gallium, hafnium, iron, lanthanum, magnesium, strontium, titanium, zirconium, or zinc).

101. A method of focussing charge density (voltage or current) at a functional surface on an electrode array, the method comprising the steps of:
  a. providing an electrode array comprising:
    i. a support substrate;
    ii. at least one surface structure protruding from an upper surface of the support substrate to create a 3 dimensional structure wherein the surface structure includes an electrode layer;
    iii. a functional surface on the electrode layer, wherein the functional surface is on an upper portion of the at least one surface structure and wherein the functional surface is adapted to contact an active species in a solution;
  b. exposing the surface structure to a solution comprising both an active species and a counter electrode; and
  c. establishing a current or voltage between the electrode layer and the counter electrode such that the current (charge density (voltage or current)) is focussed at the functional surface and the active species is electrochemically modified following contact with the functional surface; and
  wherein the functional surface and the upper surface of the support material are formed from the same material and, in use, electrochemical activity is focussed at the at the functional surface and is differentiated from the upper surface of the support substrate.

The disclosure may further be seen to be directed to and may include the following embodiments:

Para. 1. A method of focussing charge density (voltage or current) at a functional surface on an electrode array, the method comprising the steps of:
  a. providing an electrode array comprising:
    i. a support substrate;
    ii. at least one surface structure protruding from an upper surface of the support substrate wherein the surface structure includes an electrode layer;
    iii. a functional surface on the electrode layer, wherein the functional surface is on an upper portion of the at least one surface structure and wherein the functional surface is adapted to contact an active species in a conductive solution;
  b. exposing the surface structure to the conductive solution comprising an active species, in which a counter electrode is positioned; and
  c. establishing a current or voltage between the functional surface on the electrode layer and the counter electrode such that the charge density is focussed at the functional surface on the electrode layer.

Para. 2. A method as claimed in Para. 1 or 2 wherein the functional surface is at or about an apex of the surface structure.

Para. 3. A method as claimed in any one of Paras. 1-2 wherein the functional surface is at or about an apex of the surface structure and the surface structure is tapered to an apex and/or has a substantially triangular cross-section along a plane parallel to a top surface of the support substrate.

Para. 4. A method as claimed in any one of Paras. 1-3 wherein the functional surface is at or about an apex of the surface structure and wherein the width of the apex of each surface structure(s) is between about 1 nm to about 50 micron and the width of the surface structure where it joins the support substrate is between about 20 nm to about 5000 μm and wherein the width at the apex of a surface structure is less than the width of that surface structure where it joins the support substrate.

Para. 5. A method as claimed in any one of Paras. 1-4 wherein the functional surface is at or about an apex of the surface structure and wherein the apexes of the surface structures are separated from each other by about 50 nm to about 1000 μm apex to apex.

Para. 6. A method as claimed in any one of Paras. 1-5 wherein the surface structures are pyramidical, conical, ridges, or combinations thereof.

Para. 7. A method as claimed in any one of Paras. 1-6 wherein the counter electrode structure is flat, pyramidical, conical, or ridged.

Para. 8. A method of focussing charge density (voltage or current) at a functional surface on an electrode array and electrochemically modifying an active species in a conductive solution exposed to the array, the method comprising the steps of:
 a. providing an electrode array comprising:
  i. a support substrate;
  ii. at least one surface structure protruding from an upper surface of the support substrate wherein the surface structure includes an electrode layer;
  iii. a functional surface on the electrode layer, wherein the functional surface is on an upper portion of the at least one surface structure and wherein the functional surface is adapted to contact an active species in a conductive solution;
 b. exposing the surface structure to a solution comprising an active species and including a counter electrode therein; and
 c. establishing a current or voltage between the electrode layer and the counter electrode such that the charge density is focussed at the functional surface and the active species is electrochemically modified following contact with the functional surface.

Para. 9. A method according to Para. 8 wherein the functional surface and the upper surface of the support material are formed from the same material and, in use, electrochemical activity is focussed at the at the functional surface and is differentiated from the upper surface of the support substrate.

Para. 10. A method according to Para. 8 or 9 wherein the functional surface is formed of a catalytic material which is activated via electrochemical modification via the current or voltage between the electrode layer and the counter electrode.

Para. 11. A method according to Para. 10 wherein the catalytic material is Pt, Au, Ni.

Para. 12. A method as claimed in Para. 8 or 9 wherein the active species in the conductive solution comprises a catalyst, wherein the catalyst is activated via electrochemical modification following contact with the functional surface to yield an activated catalyst.

Para. 13. A method as claimed in Para. 12 wherein the catalyst is selected from metallic and organometallic materials.

Para. 14. A method as claimed in Para. 13 wherein the metallic materials are selected from one or more of Pt, Au and Ni, and wherein the organometallic material is selected from one or more of Ferrocene and and Porphyrin or Phenanthroline, Porphyrin, Imidazole, tris pyridyl amine, and triazole, with a transition metal.

Para. 15. A method as claimed in Para. 14 wherein the transition metal is selected from one or more of Ru, Fe, Mn, Mg, Cu, Ir, Co, Pt, Pd, Au, Ag, Mg.

Para. 16. A method as claimed in any one of Paras. 8 to 15 wherein the thermodynamic efficiency and kinetic efficiency of the electrochemical modification in comparison to a flat electrode is improved.

Para. 17. A method as claimed in any one of Paras. 8 to 16 wherein the electrode array comprises a binding layer covering the functional surface and at least part of other surfaces of the array, wherein the step of establishing a current between the electrode layer and the counter electrode results in selective removal of the binding layer from the functional surface compared to other positions on the electrode array.

Para. 18. A method as claimed in Para. 17 further comprising the step of selective deposition of a further binding layer on the functional surface which has undergone selective removal of the first binding layer.

Para. 19. A method as claimed in Para. 18 wherein the electrode array comprises a binding layer and wherein the binding layer is either present on the functional surface on the surface structure at a significantly increased density than at a non-functional surface on the electrode array; or present on a non-functional surface of the electrode array at a significantly increased density than at a position on the functional surface on the surface structure; as a result of the selective deposition.

Para. 20. A method as claimed in any one of Paras. 17 to 19 wherein the binding layer comprises a self-assembled monolayer (SAM).

Para. 21. A method as claimed in any one of Paras. 8 to 20 wherein the array includes a catalyst at the apex of the surface structure and a co-catalyst between the surface structures.

Para. 22. A method as claimed in Para. 21 wherein the co-catalyst is selected from any one or more oxides of a metal (e.g. aluminum, calcium, cerium, gallium, hafnium, iron, lanthanum, magnesium, strontium, titanium, zirconium, ruthenium, nickel, and/or zinc).

Para. 23. A method as claimed in in any one of Paras. 17 to 22 wherein an activated catalyst on the electrode array catalyses the reaction of a solute reactant within another conductive solution or the same conductive solution with the binding layer and the method further comprises the step of attaching the solute reactant to the binding layer on the functional surface.

Para. 24. A method as claimed in Para. 23 wherein the solute reactant is selected from the group consisting of:
 a. a functional group, for example one selected from the group consisting of carboxylic acid, amine, alcohol, aldehyde, biotin, avidin, azide and ethynyl;
 b. a binding agent adapted to bind to a target analyte in solution, for example one selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, atetylenic quinone, azides, tetrazine, large or small amine-containing molecules, sulfhydryl-containing molecules or proteins expressing glutathione S-transferase (GST), metals and metal salts (such as lead, lead phosphate, chromium, platinum, palladium, iridium, copper), ssDNA, ssRNA, miRNA, mRNA, aptamers, and small molecules with and without a spacer molecule;
 c. a catalytic species which catalyses a reaction in solution, for example a catalyst selected from the group consisting of copper, a transition metal, an organometallic complex, an organometallic complex including transition metal, or an organic material that is able to be oxidised or reduced; and
 d. a detection moiety, for example one selected from the group consisting of a fluorophore, an ethynyl functionalised fluorophore, a protein, an antibody, a nucleic acid, DNA, RNA, a small molecule, or a functional group, for example one selected from the group consisting of carboxylic acid, amine, alcohol, ester, ketone and aldehyde.

Para. 25. A method as claimed in Para. 24 wherein the attachment of the solute reactant comprises a 1-Ethyl-3-(3-dimethylaminopropyl)-carbodiimide/N-hydroxysuccinimide (EDC/NHS) coupling reaction.

Para. 26. A method as claimed in any one of Paras. 1-24 wherein the active species is solvated within a charge carrying or ionic species in the conductive solution.

Para. 27. A method as claimed in any one of Paras. 20 to 26 wherein the SAM is selected from the group consisting of:
  a. long-chain molecules comprising a carbon chain of C6 to C24 or combinations thereof;
  b. short-chain molecules comprising a carbon chain of C5 to C1 or combinations thereof;
  c. a mixed SAM comprising long-chain molecules comprising a carbon chain of C6 to C24 and short-chain molecules of C5 to C1.

Para. 28. A method as claimed in Para. 27 wherein:
  a. the long-chain SAM also comprises molecules selected from the group consisting of azides, amines, carboxylates, aldehydes, ketones, esters or carboxylic acids; and
  b. the short-chain SAM also comprises molecules selected from the group consisting of alkanes, azides, amines, hydroxyls, carboxylates or carboxylic acids.

Para. 29. A method as claimed in any one of Paras. 20 to 28 wherein the SAM comprises short-chain molecules comprising a carbon chain of C5 to C1 and wherein the upper portion of the surface structure(s) is either
  a. free of SAM; or
  b. wherein the SAM is adapted to be removed by establishing a current between the electrode layer and the counter electrode.

Para. 30. A method as claimed in any one of Paras. 20 to 29 wherein the SAM comprises a long chain SAM with carbon chain of C6 to C24, and wherein the upper portion of the surface structure(s) is either
  a. free of SAM; or
  b. wherein the SAM is adapted to be removed by establishing a current between the electrode layer and the counter electrode.

Para. 31. A method as claimed in any one of Paras. 1-30 wherein the surface structure is integral with the support substrate.

Para. 32. A method as claimed in any one of Paras. 8-31 wherein the electrode array comprises a passivating layer between the surface structures selected from the group consisting of a cross-linked polymer, a photo-resist, a self-assembled mono-layer (SAM), an epoxy-based negative photoresist and SU-8.

Para. 33. A method as claimed in any one of Paras. 1-32 wherein the counter electrode is formed of a material selected from the group consisting of an inert conductive material, a metal, Pt, Gold, carbon, graphite, graphene, carbon fibre, carbon nano-tubes, Bucky Balls, conducting polymer PPy, PA, PAcetylene.

Para. 34. A method as claimed in any one of Paras. 1-33 wherein the counter electrode is (a) in a fixed orientation with respect to the surface structure, (b) attached to the electrode array, (c) held in an orientation to minimise differential in distance between each of the surface structures of the array, or (d) above an upper surface of the array.

Para. 35. A method as claimed in any one of Paras. 1-34 wherein the potential difference established between the counter electrode and the electrode layer is between about −2V and +2V.

Para. 36. A method as claimed in Para. 35 wherein the potential difference is between about −200 mV and −1V.

Para. 37. A method as claimed in any one of Paras. 1-36 wherein the current established between the electrode layer and the counter electrode is pulsed between an activating potential and an inactivating potential.

38. An electrode array comprising:
  a. a support substrate;
  b. at least one surface structure protruding from an upper surface of the support substrate, wherein the surface structure includes an electrode layer;
  c. a functional surface on the electrode layer, wherein the functional surface is on an upper portion of the at least one surface structure and wherein the functional surface is adapted to contact an active species in a conductive solution;
  d. a binding layer wherein the binding layer is either:
    i. present on the functional surface at a significantly increased density than at a non-functional surface on the electrode array; or
    ii. present on a non-functional surface of the electrode array at a significantly increased density than at a position on the functional surface on the surface structure,
  wherein the functional surface is at or about an apex of the surface structure.

Para. 39. An electrode array of Para. 38 wherein the surface structures are separated from each other by about 50 nm to about 1000 µm apex to apex.

Para. 40. An electrode array comprising:
  a. a support substrate;
  b. at least one surface structure protruding from an upper surface of the support substrate, wherein the surface structure includes an electrode layer;
  c. a functional surface on the electrode layer, wherein the functional surface is on an upper portion of the at least one surface structure and wherein the functional surface is adapted to contact an active species in a conductive solution;
  d. a binding layer wherein the binding layer is either:
    i. present on the functional surface at a significantly increased density than at a non-functional surface on the electrode array; or
    ii. present on a non-functional surface of the electrode array at a significantly increased density than at a position on the functional surface on the surface structure;
  wherein the functional surface is at or about an apex of the surface structure and wherein the surface structures are separated from each other by about 5 nm to about 1000 µm apex to apex and wherein this separation is preferably but optionally substantially uniform.

Para. 41. An electrode array as claimed in any one of Paras. 38 to 41 wherein the binding layer comprises a self-assembled monolayer (SAM).

Para. 42. An electrode array as claimed in any one of Paras. 38 to 42 wherein the functional surface is on an upper surface of the electrode layer.

Para. 43. An electrode array as claimed in any one of Paras. 38 to 42 wherein the functional surface is separated from other functional surfaces on other surface structures by a passivating layer on the support substrate.

Para. 44. An electrode array as claimed in any one of Paras. 38 to 43 wherein the surface structure or an upper section thereof is in the form of a cone, pyramid or ridge or combinations thereof.

Para. 45. An electrode array as claimed in any one of Paras. 38 to 44 wherein the surface structure is integral with the support substrate.

Para. 46. An electrode array as claimed in any one of Paras. 38 to 45 wherein the passivating layer is selected from the group consisting of a cross-linked polymer, a photoresist, a self-assembled mono-layer (SAM), an epoxy-based negative photoresist and SU-8.

Para. 47. An electrode array as claimed in any one of Paras. 38 to 46 wherein the electrode array further comprises a counter electrode.

Para. 48. An electrode array as claimed in Para. 47 wherein the counter electrode is formed from a material selected from the group consisting of an inert conductive material, a metal, Pt, Gold, carbon, graphite, graphene, carbon fibre, carbon nano-tubes, Bucky Balls, conducting polymer PPy, PA, PAcetylene.

Para. 49. A method of focussing charge density (voltage or current) at a functional surface on an electrode array, the method comprising the steps of:
   a. providing an electrode array comprising
      i. a support substrate;
      ii. at least one surface structure protruding from an upper surface of the support substrate wherein the surface structure includes an electrode layer;
      iii. a functional surface on the electrode layer, wherein the functional surface is on an upper portion of the at least one surface structure and wherein the functional surface is adapted to contact an active species in a conductive solution;
   b. exposing the surface structure to the conductive solution comprising an active species and having a counter electrode therein;
   c. establishing a current between the electrode layer and the counter electrode such that the current is focussed at the functional surface and the active species is electrochemically modified following contact with the functional surface; and
   d. wherein (i) the functional surface is at or about an apex of the surface structure and wherein the width of the apex of each surface structure is between about 1 nm to about 50 micron and the width of the surface structure where it joins the support substrate is between about 20 nm to about 5000 μm and wherein the width at the apex of the surface structure is less than the width of the surface structure where it joins the support substrate (ii) the surface structures are separated from each other by about 5 nm to about 1000 μm apex to apex and (iii) the height of the surface structure above the support surface is between about 5 nm and about 5 mm.

Para. 50. A method of focussing charge density (voltage or current) at a functional surface on an electrode array, the method comprising the steps of:
   a. providing an electrode array comprising
      i. a support substrate;
      ii. at least one surface structure protruding from an upper surface of the support substrate wherein the surface structure includes an electrode layer;
      iii. a functional surface on the electrode layer, wherein the functional surface is on an upper portion of the at least one surface structure and wherein the functional surface is adapted to contact an active species in a conductive solution;
      iv. wherein the surface structures are separated from each other by about 5 nm to about 1000 μm apex to apex and wherein this separation is preferably but optionally substantially uniform;
   b. exposing the surface structure to a solution comprising an active species and having a counter electrode positioned therein; and
   c. establishing a current between the electrode layer and the counter electrode such that the current is focussed at the functional surface and the active species is electrochemically modified following contact with the functional surface.

Para. 51. A method of focussing charge density (voltage or current) at a functional surface on an electrode array, the method comprising the steps of:
   a. providing an electrode array comprising:
      i. a support substrate;
      ii. at least one surface structure protruding from an upper surface of the support substrate to create a 3 dimensional structure wherein the surface structure includes an electrode layer;
      iii. a functional surface on the electrode layer, wherein the functional surface is on an upper portion of the at least one surface structure and wherein the functional surface is adapted to contact an active species in a conductive solution;
   b. exposing the surface structure to a solution comprising an active species and a having a counter electrode positioned therein; and
   c. establishing a current between the electrode layer and the counter electrode such that the current is focussed at the functional surface and the active species is electrochemically modified following contact with the functional surface; and
   wherein the functional surface and the upper surface of the support material are formed from the same material and, in use, electrochemical activity is focussed at the at the functional surface and is differentiated from the upper surface of the support substrate.

Para. 52. The method of any one of Paras. 49 to 51 wherein the array includes a catalyst at the apex of the surface structure and a co-catalyst in the valleys between the surface structures.

Para. 53. The method of Para. 52 wherein the catalyst is selected from any one or more of the transition metals (e.g. Ni, Cr, CuAg, Pt, Pd, Fe, or Ir), and wherein the co-catalyst is selected from any one or more oxides of a metal (e.g. aluminum, calcium, cerium, gallium, hafnium, iron, lanthanum, magnesium, strontium, titanium, zirconium, or zinc).

Para. 54. A method according to any one of Paras. 49 to 53 wherein the functional surface is formed of a catalytic material.

The invention claimed is:

1. A method of focusing charge density at a functional surface on an electrode array and electrochemically modifying an active species in a conductive solution exposed to the electrode array, the method comprising the steps of:
   a. providing an electrode array, wherein:
      i. the electrode array comprises a support substrate;
      ii. the electrode array comprises a plurality of surface structures protruding from an upper surface of the support substrate, wherein the plurality of surface structures include an electrode layer; and
      iii. the plurality of surface structures have a plurality of functional surfaces, each of the plurality of surface structures having a functional surface on the electrode layer, wherein each functional surface is on an upper portion of a surface structure of the plurality of surface structures, wherein each functional surface is adapted to contact an active species in a conductive solution, and wherein the plurality of functional surfaces are electrically connected via the electrode layer to form a functional grouping;
   b. exposing the plurality of surface structures to the conductive solution comprising an active species, in which a counter electrode is positioned; and c. establishing a current or voltage between the plurality of functional surfaces on the electrode layer and the counter electrode such that the charge density is focussed at the plurality of functional surfaces on the electrode layer and the active species is electrochemically modified following contact with the plurality of functional surfaces;

wherein the active species comprises a species and wherein the species is selectively attached to the plurality of functional surfaces following the electrochemical modification, the size of each functional surface being variable depending upon the focussed charge density, and each functional surface being a region where attachment occurs at a faster kinetic rate when compared to another surface on the electrode array at which charge density is not focused; and wherein the electrode array comprises a first binding layer covering the functional surface and at least part of the plurality of surface structures and the support substrate of the electrode array, wherein the step of establishing the current or voltage between the electrode layer and the counter electrode results in selective removal of the first binding layer from the functional surface compared to the plurality of surface structures and the support substrate of the electrode array.

2. The method of claim 1, wherein the functional surface is at or about an apex of each of the plurality of surface structures.

3. The method of claim 1, wherein the functional surface is at or about an apex of each of the plurality of surface structures, and wherein the width of the apex of each surface structure is between about 1 nm to about 50 μm and the width of each surface structure where it joins the support substrate is between about 20 nm to about 5000 μm and wherein the width at the apex of each surface structure is less than the width of that surface structure where it joins the support substrate.

4. The method of claim 1, wherein the functional surface is at or about an apex of each of the plurality of surface structures and wherein the apexes of the surface structures are separated from each other by about 50 nm to about 1000 μm apex to apex.

5. The method of claim 1, wherein the surface structures are pyramidical, conical, ridges, or combinations thereof.

6. The method of claim 1, wherein the counter electrode structure is flat, pyramidical, conical, or ridged.

7. The method of claim 1, wherein the functional surface and the upper surface of the support substrate are formed from the same material and, wherein when electrochemical activity of the electrochemical modification is focussed at the functional surface, the charge density is differentiated between the functional surface and the upper surface of the support substrate.

8. The method of claim 1, wherein the functional surface is formed of a catalytic material which is activated via electrochemical modification via the current or voltage between the electrode layer and the counter electrode.

9. The method of claim 8, wherein the catalytic material is Pt, Au, Ni, or a mixture of any two or more thereof.

10. The method of claim 1, wherein the active species in the conductive solution comprises a catalyst, wherein the catalyst is activated via electrochemical modification following contact with the functional surface to yield an activated catalyst.

11. The method of claim 10, wherein the catalyst is selected from metallic and/or organometallic materials.

12. The method of claim 11, wherein the metallic materials are one or more of Pt, Au and Ni, and wherein the organometallic material is one or more of ferrocene or phenanthroline, porphyrin, imidazole, tris pyridyl amine, or triazole, with a transition metal.

13. The method of claim 12, wherein the transition metal is Ru, Fe, Mn, Mg, Cu, Ir, Co, Pt, Pd, Au, Ag, Mg, or a mixture of any two or more thereof.

14. The method of claim 1, further comprising a step of selective deposition of a further binding layer on the functional surface which has undergone selective removal of the first binding layer.

15. The method of claim 1, wherein the active species is a charged particle.

16. The method of claim 15, wherein the charged particle is one or more metal ion(s).

17. The method of claim 1, wherein the electrode array comprises a passivating layer between the plurality of surface structures selected from the group consisting of a cross-linked polymer, a photo-resist, a self-assembled mono-layer (SAM), an epoxy-based negative photoresist, and SU-8.

18. The method of claim 1, wherein the counter electrode is in a fixed orientation with respect to the plurality of surface structures.

19. The method of claim 1, wherein the counter electrode is oriented above an upper surface of the electrode array such that a distance from the counter electrode to an apex of each of the plurality of surface structures is substantially equidistant.

20. The method of claim 1, further comprising pulsing the current or voltage established between the electrode layer and the counter electrode between an activating potential and an inactivating potential, wherein the activating potential is a first voltage that initiates a reaction, and wherein the inactivating potential is a second voltage that stops the reaction.

21. A method of focusing charge density at a functional surface on an electrode array and electrochemically modifying an active species in a conductive solution exposed to the electrode array, the method comprising the steps of:

a. providing an electrode array, wherein:
  i. the electrode array comprises a support substrate;
  ii. the electrode array comprises a plurality of surface structures protruding from an upper surface of the support substrate, wherein the plurality of surface structures include an electrode layer; and
  iii. the plurality of surface structures have a plurality of functional surfaces, each of the plurality of surface structures having a functional surface on the electrode layer, wherein each functional surface is on an upper portion of a surface structure of the plurality of surface structures, wherein each functional surface is adapted to contact an active species in a conductive solution, and wherein the plurality of functional surfaces are electrically connected via the electrode layer to form a functional grouping;

b. exposing the plurality of surface structures to the conductive solution comprising an active species, in which a counter electrode is positioned; and c. establishing a current or voltage between the plurality of functional surfaces on the electrode layer and the counter electrode such that the charge density is focussed at the plurality of functional surfaces on the electrode layer and the active species is electrochemically modified following contact with the plurality of functional surfaces;

wherein the active species comprises a species and wherein the species is selectively attached to the plurality of functional surfaces following the electrochemical modification, the size of each functional surface being variable depending upon the focussed charge density, and each functional surface being a region where attachment occurs at a faster kinetic rate when compared to another surface on the electrode array at which charge density is not focused; and wherein the electrode array comprises a binding layer and wherein the binding layer is either present on the functional surface on the surface structure at an increased density than at a non-functional surface on the electrode array; or present on a non-functional surface of the electrode array at a significantly increased density than at a position on the functional surface on the surface structure; as a result of the selective attachment of the species of the functional surface.

22. The method of claim 21, wherein the functional surface is at or about an apex of each of the plurality of surface structures.

23. The method of claim 21, wherein the functional surface is at or about an apex of each of the plurality of surface structures, and wherein the width of the apex of each surface structure is between about 1 nm to about 50 µm and the width of each surface structure where it joins the support substrate is between about 20 nm to about 5000 µm and wherein the width at the apex of each surface structure is less than the width of that surface structure where it joins the support substrate.

24. The method of claim 21, wherein the functional surface is at or about an apex of each of the plurality of surface structures and wherein the apexes of the surface structures are separated from each other by about 50 nm to about 1000 µm apex to apex.

25. The method of claim 21, wherein the surface structures are pyramidical, conical, ridges, or combinations thereof.

26. The method of claim 21, wherein the counter electrode structure is flat, pyramidical, conical, or ridged.

27. The method of claim 21, wherein the functional surface and the upper surface of the support substrate are formed from the same material and, wherein when electrochemical activity of the electrochemical modification is focussed at the functional surface, the charge density is differentiated between the functional surface and the upper surface of the support substrate.

28. The method of claim 21, wherein the functional surface is formed of a catalytic material which is activated via electrochemical modification via the current or voltage between the electrode layer and the counter electrode.

29. The method of claim 28, wherein the catalytic material is Pt, Au, Ni, or a mixture of any two or more thereof.

30. The method of claim 21, wherein the active species in the conductive solution comprises a catalyst, wherein the catalyst is activated via electrochemical modification following contact with the functional surface to yield an activated catalyst.

31. The method of claim 30, wherein the catalyst is selected from metallic and/or organometallic materials.

32. The method of claim 31, wherein the metallic materials are one or more of Pt, Au and Ni, and wherein the organometallic material is one or more of ferrocene or phenanthroline, porphyrin, imidazole, tris pyridyl amine, or triazole, with a transition metal.

33. The method of claim 32, wherein the transition metal is Ru, Fe, Mn, Mg, Cu, Ir, Co, Pt, Pd, Au, Ag, Mg, or a mixture of any two or more thereof.

34. The method of claim 21, further comprising a step of selective deposition of a further binding layer on the functional surface which has undergone selective removal of the first binding layer.

35. The method of claim 21, wherein the active species is a charged particle.

36. The method of claim 35, wherein the charged particle is one or more metal ion(s).

37. The method of claim 21, wherein the electrode array comprises a passivating layer between the plurality of surface structures selected from the group consisting of a cross-linked polymer, a photo-resist, a self-assembled mono-layer (SAM), an epoxy-based negative photoresist, and SU-8.

38. The method of claim 21, wherein the counter electrode is in a fixed orientation with respect to the plurality of surface structures.

39. The method of claim 21, wherein the counter electrode is oriented above an upper surface of the electrode array such that a distance from the counter electrode to the apex of each of the plurality of surface structures is substantially equidistant.

40. The method of claim 21, further comprising pulsing the current or voltage established between the electrode layer and the counter electrode between an activating potential and an inactivating potential, wherein the activating potential is a first voltage that initiates a reaction, and wherein the inactivating potential is a second voltage that stops the reaction.

* * * * *